US012540352B2

(12) United States Patent
Li et al.

(10) Patent No.: US 12,540,352 B2
(45) Date of Patent: Feb. 3, 2026

(54) METHOD FOR DETECTING NUCLEIC ACID

(71) Applicant: INSTITUTE OF ZOOLOGY, CHINESE ACADEMY OF SCIENCES, Beijing (CN)

(72) Inventors: Wei Li, Beijing (CN); Qi Zhou, Beijing (CN); Fei Teng, Beijing (CN)

(73) Assignee: INSTITUTE OF ZOOLOGY, CHINESE ACADEMY OF SCIENCES, Beijing (CN)

( * ) Notice: Subject to any disclaimer, the term of this patent is extended or adjusted under 35 U.S.C. 154(b) by 1238 days.

(21) Appl. No.: 17/278,201

(22) PCT Filed: Nov. 30, 2018

(86) PCT No.: PCT/CN2018/118457
§ 371 (c)(1),
(2) Date: Apr. 20, 2021

(87) PCT Pub. No.: WO2020/056924
PCT Pub. Date: Mar. 26, 2020

(65) Prior Publication Data
US 2021/0381038 A1     Dec. 9, 2021

(30) Foreign Application Priority Data

Sep. 20, 2018 (CN) .......................... 201811099146.0

(51) Int. Cl.
*C12Q 1/6844*     (2018.01)
*C12N 9/22*     (2006.01)
*C12Q 1/6806*     (2018.01)

(52) U.S. Cl.
CPC ............. *C12Q 1/6844* (2013.01); *C12N 9/22* (2013.01); *C12Q 1/6806* (2013.01)

(58) Field of Classification Search
CPC .. C12Q 1/2521; C12Q 1/6818; C12Q 1/6806; C12Q 1/2565
See application file for complete search history.

(56) References Cited

U.S. PATENT DOCUMENTS

| | | | | |
|---|---|---|---|---|
| 10,253,365 B1 * | 4/2019 | Doudna | ................ | C12N 15/11 |
| 11,060,115 B2 * | 7/2021 | Severinov | ............ | C12N 15/907 |
| 2021/0095271 A1 * | 4/2021 | Li | ........................ | A61K 38/465 |

FOREIGN PATENT DOCUMENTS

| | | | | |
|---|---|---|---|---|
| CN | 107488710 A | 12/2017 | | |
| CN | 108277231 A | 7/2018 | | |
| EP | 3653722 A1 | 5/2020 | | |
| EP | 3 805 403 | * 4/2021 | ............... | C12Q 1/68 |
| WO | WO 2018/112098 A1 | 6/2018 | | |

OTHER PUBLICATIONS

Sashital, D. "Pathogen detection in the CRISPR-Cas era" Genome Medicine, vol. 10 (Apr. 24, 2018), p. 32) (Year: 2018).*
Wang et al., "Systematic evaluation of CRISPR-Cas systems reveals design principles for genome editing in human cells" 19 Genome Biology 62 1=16 (Year: 2018).*
Chen et al., "Probing Cellular Molecules with PolyA-Based Engineered Aptamer Nanobeacon" 9 ACS Applied Materials & Interfaces 8014-8020 (Year: 2017).*
International Search Report and Written Opinion for PCT/CN2018/118457, mailed on May 10, 2019, ISA State Intellectual Property Office of the P.R. China. 10 pages (w/English translation International Search Report, 3 pages).
Li et al., "CRISPR-Cas12b-assisted nucleic acid detection platform," *bioRxiv 362889*: Jul. 1-12, 2018.
Teng et al., "Repurposing CRISPR-Cas12b for mammalian genome engineering," *Cell Discovery 4.63*: Nov. 1-15, 2018.
Joung et al., "Point-of-care testing for COVID-19 using Sherlock diagnostics," *medRxiv*, doi: https://doi.org/10.1101/2020.05.04.20091231, May 5, 2020 (21 pages).

* cited by examiner

*Primary Examiner* — Nancy J Leith
(74) *Attorney, Agent, or Firm* — Klarquist Sparkman, LLP

(57) ABSTRACT

A method for detecting the presence and/or amount of a target nucleic acid molecule in a biological sample and a related kit. The method comprises: (a) contacting the biological sample with: i) Cas12b protein, ii) a gRNA targeting a target sequence of the target nucleic acid molecule, and iii) a single-stranded DNA reporter molecule generating a detectable signal after being cleaved to form a reaction mixture; and (b) detecting the presence and/or level of the detectable signal generated in the reaction mixture.

19 Claims, 22 Drawing Sheets
Specification includes a Sequence Listing.

FIG. 8A
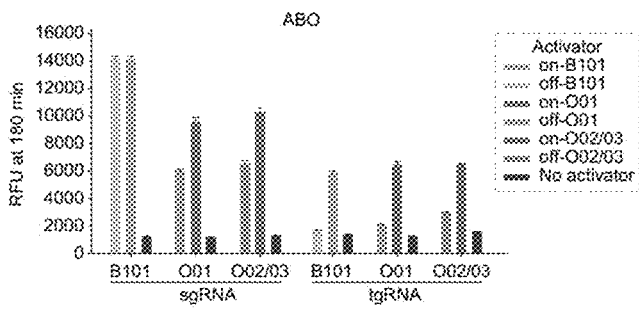
FIG. 8B
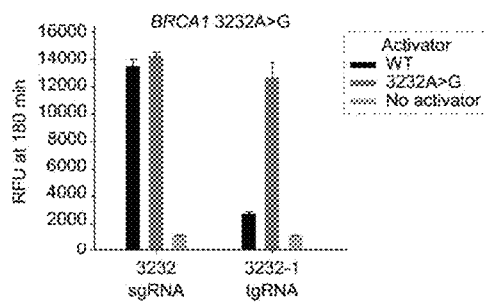
FIG. 8C
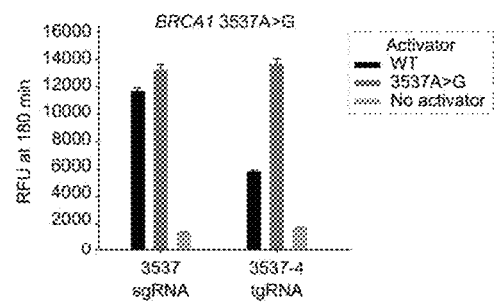
FIG. 8D

FIG. 11A
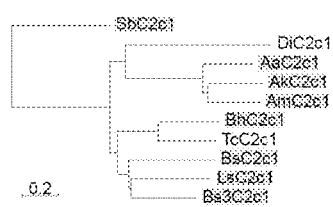
FIG. 11B
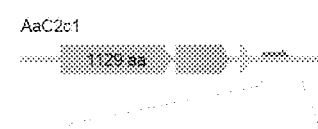 
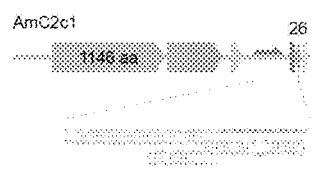 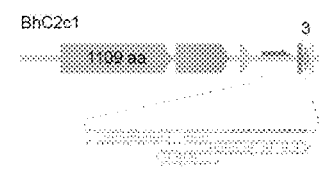 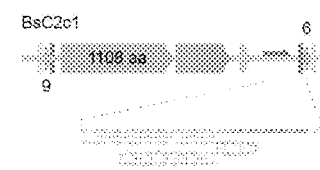
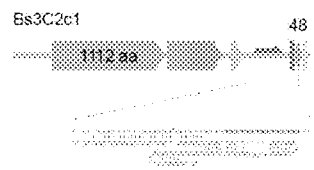 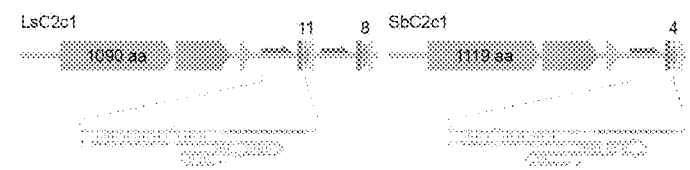

FIG. 13A
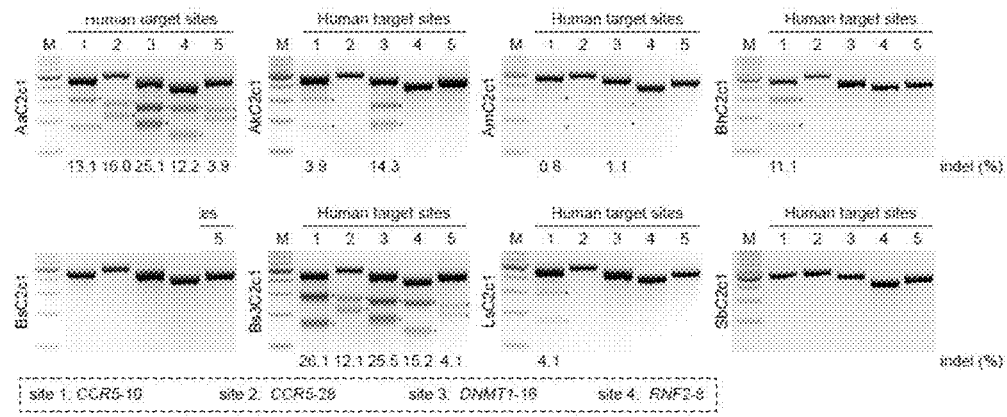
FIG. 13B
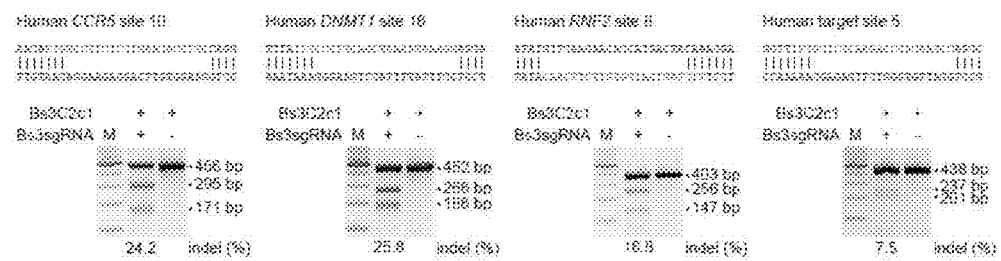
FIG. 13C

FIG. 14A
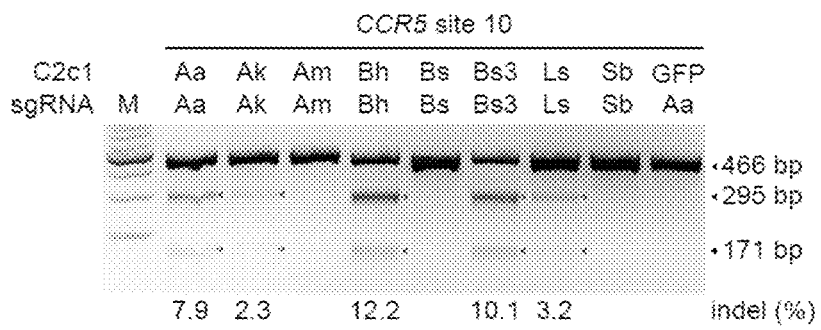
FIG. 14B
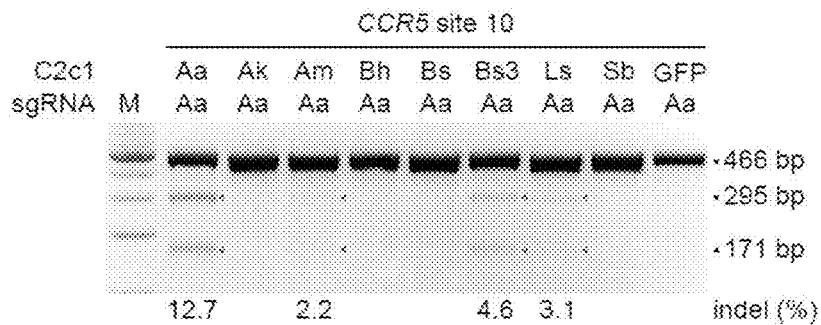
FIG. 14C
FIG. 14D
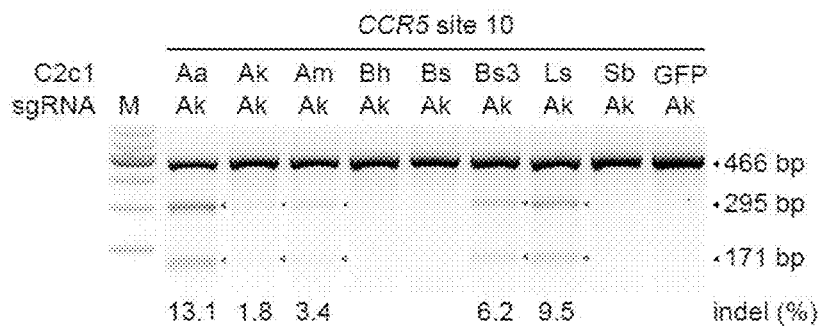

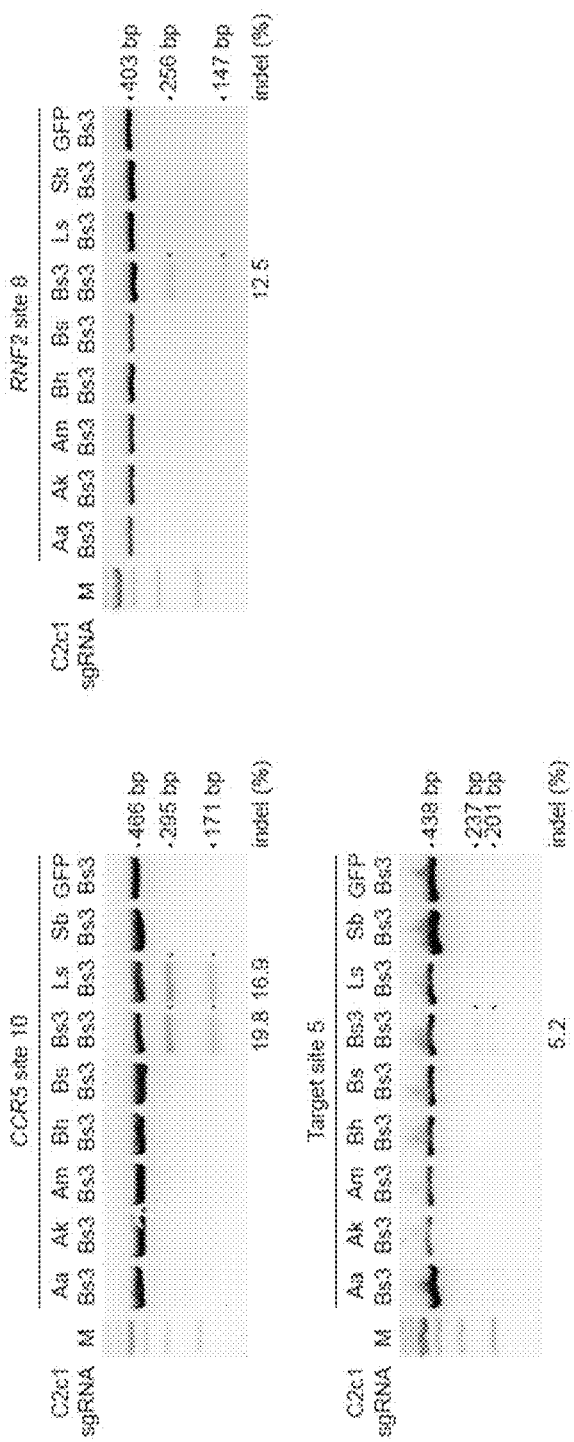
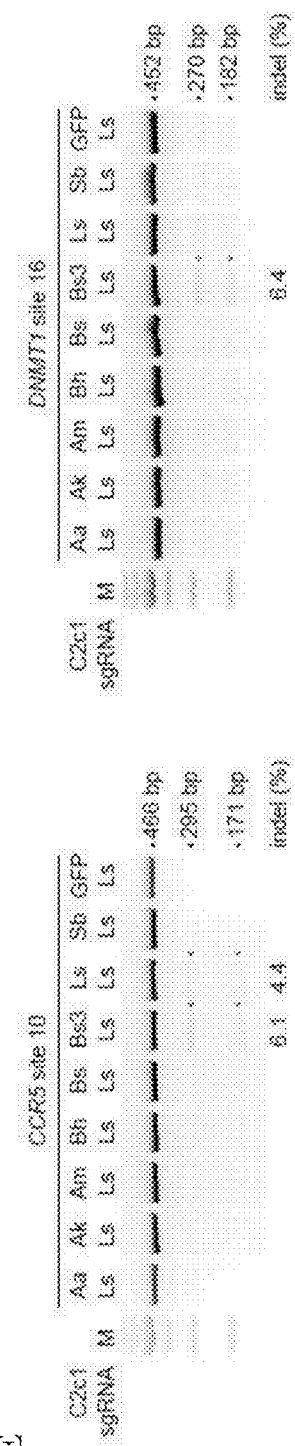
FIG. 16D
FIG. 16E

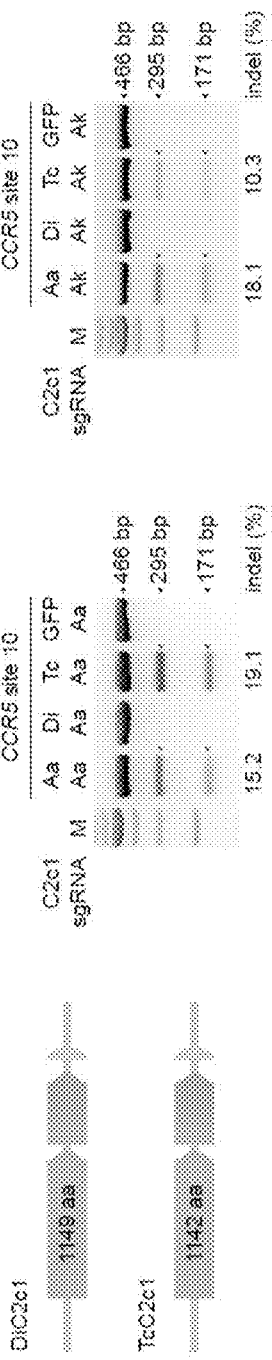
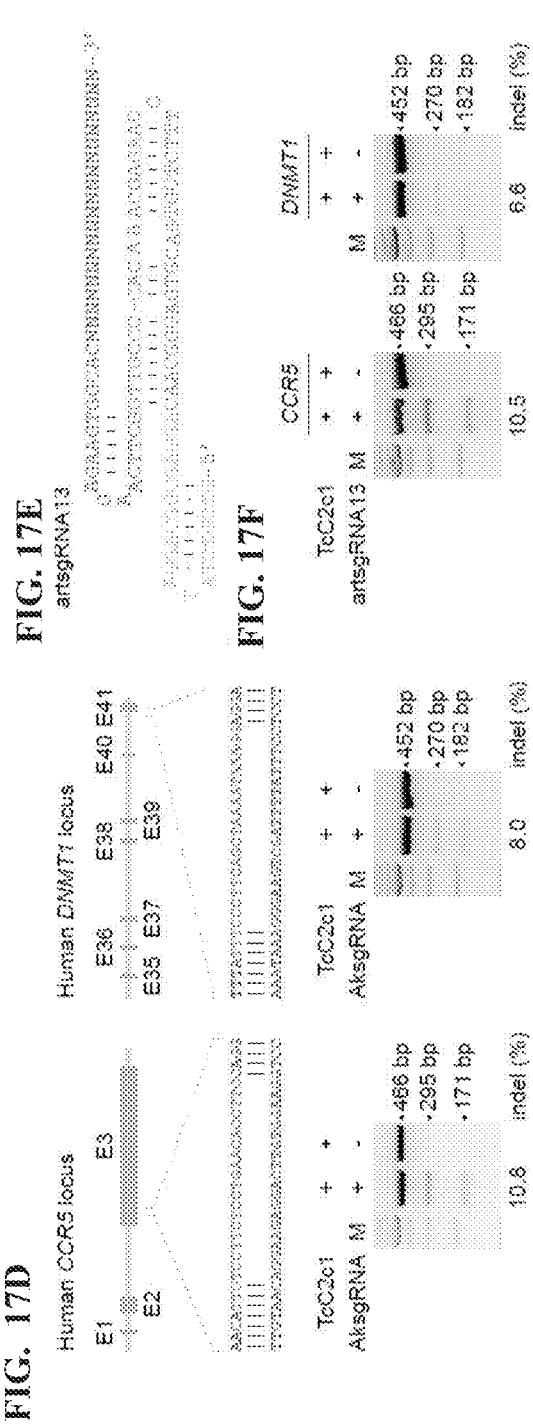

SEQUENCE LISTING

```
<160> NUMBER OF SEQ ID NOS: 66

<210> SEQ ID NO 1
<211> LENGTH: 1129
<212> TYPE: PRT
<213> ORGANISM: Alicyclobacillus acidiphilus

<400> SEQUENCE: 1

Met Ala Val Lys Ser Met Lys Val Lys Leu Arg Leu Asp Asn Met Pro
1               5                   10                  15

Glu Ile Arg Ala Gly Leu Trp Lys Leu His Thr Glu Val Asn Ala Gly
            20                  25                  30

Val Arg Tyr Tyr Thr Glu Trp Leu Ser Leu Leu Arg Gln Glu Asn Leu
        35                  40                  45
```

```
Tyr Arg Arg Ser Pro Asn Gly Asp Gly Glu Gln Glu Cys Tyr Lys Thr
    50              55                  60

Ala Glu Glu Cys Lys Ala Glu Leu Leu Glu Arg Leu Arg Ala Arg Gln
65              70                  75                  80

Val Glu Asn Gly His Cys Gly Pro Ala Gly Ser Asp Asp Glu Leu Leu
                85                  90                  95

Gln Leu Ala Arg Gln Leu Tyr Glu Leu Leu Val Pro Gln Ala Ile Gly
            100                 105                 110

Ala Lys Gly Asp Ala Gln Gln Ile Ala Arg Lys Phe Leu Ser Pro Leu
            115                 120                 125

Ala Asp Lys Asp Ala Val Gly Gly Leu Gly Ile Ala Lys Ala Gly Asn
130                 135                 140

Lys Pro Arg Trp Val Arg Met Arg Glu Ala Gly Glu Pro Gly Trp Glu
145                 150                 155                 160

Glu Glu Lys Ala Lys Ala Glu Ala Arg Lys Ser Thr Asp Arg Thr Ala
                165                 170                 175

Asp Val Leu Arg Ala Leu Ala Asp Phe Gly Leu Lys Pro Leu Met Arg
            180                 185                 190

Val Tyr Thr Asp Ser Asp Met Ser Ser Val Gln Trp Lys Pro Leu Arg
            195                 200                 205

Lys Gly Gln Ala Val Arg Thr Trp Asp Arg Asp Met Phe Gln Gln Ala
210                 215                 220

Ile Glu Arg Met Met Ser Trp Glu Ser Trp Asn Gln Arg Val Gly Glu
225                 230                 235                 240

Ala Tyr Ala Lys Leu Val Glu Gln Lys Ser Arg Phe Glu Gln Lys Asn
                245                 250                 255

Phe Val Gly Gln Glu His Leu Val Gln Leu Val Asn Gln Leu Gln Gln
            260                 265                 270

Asp Met Lys Glu Ala Ser His Gly Leu Glu Ser Lys Glu Gln Thr Ala
            275                 280                 285

His Tyr Leu Thr Gly Arg Ala Leu Arg Gly Ser Asp Lys Val Phe Glu
            290                 295                 300

Lys Trp Glu Lys Leu Asp Pro Asp Ala Pro Phe Asp Leu Tyr Asp Thr
305                 310                 315                 320

Glu Ile Lys Asn Val Gln Arg Arg Asn Thr Arg Arg Phe Gly Ser His
                325                 330                 335

Asp Leu Phe Ala Lys Leu Ala Glu Pro Lys Tyr Gln Ala Leu Trp Arg
            340                 345                 350

Glu Asp Ala Ser Phe Leu Thr Arg Tyr Ala Val Tyr Asn Ser Ile Val
            355                 360                 365

Arg Lys Leu Asn His Ala Lys Met Phe Ala Thr Phe Thr Leu Pro Asp
370                 375                 380

Ala Thr Ala His Pro Ile Trp Thr Arg Phe Asp Lys Leu Gly Gly Asn
385                 390                 395                 400

Leu His Gln Tyr Thr Phe Leu Phe Asn Glu Phe Gly Glu Gly Arg His
                405                 410                 415

Ala Ile Arg Phe Gln Lys Leu Leu Thr Val Glu Asp Gly Val Ala Lys
            420                 425                 430

Glu Val Asp Asp Val Thr Val Pro Ile Ser Met Ser Ala Gln Leu Asp
            435                 440                 445

Asp Leu Leu Pro Arg Asp Pro His Glu Leu Val Ala Leu Tyr Phe Gln
450                 455                 460

Asp Tyr Gly Ala Glu Gln His Leu Ala Gly Glu Phe Gly Gly Ala Lys
```

-continued

```
465                 470                 475                 480
Ile Gln Tyr Arg Arg Asp Gln Leu Asn His Leu His Ala Arg Arg Gly
                485                 490                 495

Ala Arg Asp Val Tyr Leu Asn Leu Ser Val Arg Val Gln Ser Gln Ser
                500                 505                 510

Glu Ala Arg Gly Glu Arg Pro Pro Tyr Ala Ala Val Phe Arg Leu
                515                 520                 525

Val Gly Asp Asn His Arg Ala Phe Val His Phe Asp Lys Leu Ser Asp
                530                 535                 540

Tyr Leu Ala Glu His Pro Asp Asp Gly Lys Leu Gly Ser Glu Gly Leu
545                 550                 555                 560

Leu Ser Gly Leu Arg Val Met Ser Val Asp Leu Gly Leu Arg Thr Ser
                565                 570                 575

Ala Ser Ile Ser Val Phe Arg Val Ala Arg Lys Asp Glu Leu Lys Pro
                580                 585                 590

Asn Ser Glu Gly Arg Val Pro Phe Cys Phe Pro Ile Glu Gly Asn Glu
                595                 600                 605

Asn Leu Val Ala Val His Glu Arg Ser Gln Leu Leu Lys Leu Pro Gly
                610                 615                 620

Glu Thr Glu Ser Lys Asp Leu Arg Ala Ile Arg Glu Arg Gln Arg
625                 630                 635                 640

Thr Leu Arg Gln Leu Arg Thr Gln Leu Ala Tyr Leu Arg Leu Leu Val
                645                 650                 655

Arg Cys Gly Ser Glu Asp Val Gly Arg Arg Glu Arg Ser Trp Ala Lys
                660                 665                 670

Leu Ile Glu Gln Pro Met Asp Ala Asn Gln Met Thr Pro Asp Trp Arg
                675                 680                 685

Glu Ala Phe Glu Asp Glu Leu Gln Lys Leu Lys Ser Leu Tyr Gly Ile
                690                 695                 700

Cys Gly Asp Arg Glu Trp Thr Glu Ala Val Tyr Glu Ser Val Arg Arg
705                 710                 715                 720

Val Trp Arg His Met Gly Lys Gln Val Arg Asp Trp Arg Lys Asp Val
                725                 730                 735

Arg Ser Gly Glu Arg Pro Lys Ile Arg Gly Tyr Gln Lys Asp Val Val
                740                 745                 750

Gly Gly Asn Ser Ile Glu Gln Ile Glu Tyr Leu Glu Arg Gln Tyr Lys
                755                 760                 765

Phe Leu Lys Ser Trp Ser Phe Phe Gly Lys Val Ser Gly Gln Val Ile
770                 775                 780

Arg Ala Glu Lys Gly Ser Arg Phe Ala Ile Thr Leu Arg Glu His Ile
785                 790                 795                 800

Asp His Ala Lys Glu Asp Arg Leu Lys Lys Leu Ala Asp Arg Ile Ile
                805                 810                 815

Met Glu Ala Leu Gly Tyr Val Tyr Ala Leu Asp Asp Glu Arg Gly Lys
                820                 825                 830

Gly Lys Trp Val Ala Lys Tyr Pro Pro Cys Gln Leu Ile Leu Leu Glu
                835                 840                 845

Glu Leu Ser Glu Tyr Gln Phe Asn Asn Asp Arg Pro Pro Ser Glu Asn
850                 855                 860

Asn Gln Leu Met Gln Trp Ser His Arg Gly Val Phe Gln Glu Leu Leu
865                 870                 875                 880

Asn Gln Ala Gln Val His Asp Leu Leu Val Gly Thr Met Tyr Ala Ala
                885                 890                 895
```

```
Phe Ser Ser Arg Phe Asp Ala Arg Thr Gly Ala Pro Gly Ile Arg Cys
                900                 905                 910
Arg Arg Val Pro Ala Arg Cys Ala Arg Glu Gln Asn Pro Glu Pro Phe
                915                 920                 925
Pro Trp Trp Leu Asn Lys Phe Ala Glu His Lys Leu Asp Gly Cys
                930                 935                 940
Pro Leu Arg Ala Asp Asp Leu Ile Pro Thr Gly Glu Gly Phe Phe
945                 950                 955                 960
Val Ser Pro Phe Ser Ala Glu Glu Gly Asp Phe His Gln Ile His Ala
                965                 970                 975
Asp Leu Asn Ala Ala Gln Asn Leu Gln Arg Arg Leu Trp Ser Asp Phe
                980                 985                 990
Asp Ile Ser Gln Ile Arg Leu Arg Cys Asp Trp Gly Glu Val Asp Gly
                995                1000                1005
Glu Pro Val Leu Ile Pro Arg Thr Thr Gly Lys Arg Thr Ala Asp
                1010                1015                1020
Ser Tyr Gly Asn Lys Val Phe Tyr Thr Lys Thr Gly Val Thr Tyr
                1025                1030                1035
Tyr Glu Arg Glu Arg Gly Lys Lys Arg Arg Lys Val Phe Ala Gln
                1040                1045                1050
Glu Glu Leu Ser Glu Glu Ala Glu Leu Leu Val Glu Ala Asp
                1055                1060                1065
Glu Ala Arg Glu Lys Ser Val Val Leu Met Arg Asp Pro Ser Gly
                1070                1075                1080
Ile Ile Asn Arg Gly Asp Trp Thr Arg Gln Lys Glu Phe Trp Ser
                1085                1090                1095
Met Val Asn Gln Arg Ile Glu Gly Tyr Leu Val Lys Gln Ile Arg
                1100                1105                1110
Ser Arg Val Arg Leu Gln Glu Ser Ala Cys Glu Asn Thr Gly Asp
                1115                1120                1125
Ile

<210> SEQ ID NO 2
<211> LENGTH: 1147
<212> TYPE: PRT
<213> ORGANISM: Alicyclobacillus kakegawensis

<400> SEQUENCE: 2

Met Ala Val Lys Ser Ile Lys Val Lys Leu Arg Leu Ser Glu Cys Pro
1               5                   10                  15
Asp Ile Leu Ala Gly Met Trp Gln Leu His Arg Ala Thr Asn Ala Gly
                20                  25                  30
Val Arg Tyr Tyr Thr Glu Trp Val Ser Leu Met Arg Gln Glu Ile Leu
                35                  40                  45
Tyr Ser Arg Gly Pro Asp Gly Gly Gln Gln Cys Tyr Met Thr Ala Glu
                50                  55                  60
Asp Cys Gln Arg Glu Leu Leu Arg Arg Leu Arg Asn Arg Gln Leu His
65                  70                  75                  80
Asn Gly Arg Gln Asp Gln Pro Gly Thr Asp Ala Asp Leu Leu Ala Ile
                85                  90                  95
Ser Arg Arg Leu Tyr Glu Ile Leu Val Leu Gln Ser Ile Gly Lys Arg
                100                 105                 110
Gly Asp Ala Gln Gln Ile Ala Ser Ser Phe Leu Ser Pro Leu Val Asp
                115                 120                 125
```

-continued

```
Pro Asn Ser Lys Gly Gly Arg Gly Glu Ala Lys Ser Gly Arg Lys Pro
    130                 135                 140

Ala Trp Gln Lys Met Arg Asp Gln Gly Asp Pro Arg Trp Val Ala Ala
145                 150                 155                 160

Arg Glu Lys Tyr Glu Gln Arg Lys Ala Val Asp Pro Ser Lys Glu Ile
                165                 170                 175

Leu Asn Ser Leu Asp Ala Leu Gly Leu Arg Pro Leu Phe Ala Val Phe
            180                 185                 190

Thr Glu Thr Tyr Arg Ser Gly Val Asp Trp Lys Pro Leu Gly Lys Ser
        195                 200                 205

Gln Gly Val Arg Thr Trp Asp Arg Asp Met Phe Gln Gln Ala Leu Glu
    210                 215                 220

Arg Leu Met Ser Trp Glu Ser Trp Asn Arg Arg Val Gly Glu Glu Tyr
225                 230                 235                 240

Ala Arg Leu Phe Gln Gln Lys Met Lys Phe Glu Gln Glu His Phe Ala
                245                 250                 255

Glu Gln Ser His Leu Val Lys Leu Ala Arg Ala Leu Glu Ala Asp Met
            260                 265                 270

Arg Ala Ala Ser Gln Gly Phe Glu Ala Lys Arg Gly Thr Ala His Gln
        275                 280                 285

Ile Thr Arg Arg Ala Leu Arg Gly Ala Asp Arg Val Phe Glu Ile Trp
    290                 295                 300

Lys Ser Ile Pro Glu Glu Ala Leu Phe Ser Gln Tyr Asp Glu Val Ile
305                 310                 315                 320

Arg Gln Val Gln Ala Glu Lys Arg Arg Asp Phe Gly Ser His Asp Leu
                325                 330                 335

Phe Ala Lys Leu Ala Glu Pro Lys Tyr Gln Pro Leu Trp Arg Ala Asp
            340                 345                 350

Glu Thr Phe Leu Thr Arg Tyr Ala Leu Tyr Asn Gly Val Leu Arg Asp
        355                 360                 365

Leu Glu Lys Ala Arg Gln Phe Ala Thr Phe Thr Leu Pro Asp Ala Cys
    370                 375                 380

Val Asn Pro Ile Trp Thr Arg Phe Glu Ser Ser Gln Gly Ser Asn Leu
385                 390                 395                 400

His Lys Tyr Glu Phe Leu Phe Asp His Leu Gly Pro Gly Arg His Ala
                405                 410                 415

Val Arg Phe Gln Arg Leu Leu Val Glu Ser Glu Gly Ala Lys Glu
            420                 425                 430

Arg Asp Ser Val Val Pro Val Ala Pro Ser Gly Gln Leu Asp Lys
        435                 440                 445

Leu Val Leu Arg Glu Glu Lys Ser Ser Val Ala Leu His Leu His
    450                 455                 460

Asp Thr Ala Arg Pro Asp Gly Phe Met Ala Glu Trp Ala Gly Ala Lys
465                 470                 475                 480

Leu Gln Tyr Glu Arg Ser Thr Leu Ala Arg Lys Ala Arg Arg Asp Lys
                485                 490                 495

Gln Gly Met Arg Ser Trp Arg Arg Gln Pro Ser Met Leu Met Ser Ala
            500                 505                 510

Ala Gln Met Leu Glu Asp Ala Lys Gln Ala Gly Asp Val Tyr Leu Asn
        515                 520                 525

Ile Ser Val Arg Val Lys Ser Pro Ser Glu Val Arg Gly Gln Arg Arg
    530                 535                 540
```

```
Pro Pro Tyr Ala Ala Leu Phe Arg Ile Asp Asp Lys Gln Arg Arg Val
545                 550                 555                 560

Thr Val Asn Tyr Asn Lys Leu Ser Ala Tyr Leu Glu Glu His Pro Asp
            565                 570                 575

Lys Gln Ile Pro Gly Ala Pro Gly Leu Leu Ser Gly Leu Arg Val Met
        580                 585                 590

Ser Val Asp Leu Gly Leu Arg Thr Ser Ala Ser Ile Ser Val Phe Arg
    595                 600                 605

Val Ala Lys Lys Glu Glu Val Glu Ala Leu Gly Asp Gly Arg Pro Pro
610                 615                 620

His Tyr Tyr Pro Ile His Gly Thr Asp Asp Leu Val Ala Val His Glu
625                 630                 635                 640

Arg Ser His Leu Ile Gln Met Pro Gly Glu Thr Glu Thr Lys Gln Leu
                645                 650                 655

Arg Lys Leu Arg Glu Glu Arg Gln Ala Val Leu Arg Pro Leu Phe Ala
            660                 665                 670

Gln Leu Ala Leu Leu Arg Leu Leu Val Arg Cys Gly Ala Ala Asp Glu
        675                 680                 685

Arg Ile Arg Thr Arg Ser Trp Gln Arg Leu Thr Lys Gln Gly Arg Glu
    690                 695                 700

Phe Thr Lys Arg Leu Thr Pro Ser Trp Arg Glu Ala Leu Glu Leu Glu
705                 710                 715                 720

Leu Thr Arg Leu Glu Ala Tyr Cys Gly Arg Val Pro Asp Asp Glu Trp
                725                 730                 735

Ser Arg Ile Val Asp Arg Thr Val Ile Ala Leu Trp Arg Arg Met Gly
            740                 745                 750

Lys Gln Val Arg Asp Trp Arg Lys Gln Val Lys Ser Gly Ala Lys Val
        755                 760                 765

Lys Val Lys Gly Tyr Gln Leu Asp Val Val Gly Gly Asn Ser Leu Ala
    770                 775                 780

Gln Ile Asp Tyr Leu Glu Gln Gln Tyr Lys Phe Leu Arg Arg Trp Ser
785                 790                 795                 800

Phe Phe Ala Arg Ala Ser Gly Leu Val Val Arg Ala Asp Arg Glu Ser
                805                 810                 815

His Phe Ala Val Ala Leu Arg Gln His Ile Glu Asn Ala Lys Arg Asp
            820                 825                 830

Arg Leu Lys Lys Leu Ala Asp Arg Ile Leu Met Glu Ala Leu Gly Tyr
        835                 840                 845

Val Tyr Glu Ala Ser Gly Pro Arg Glu Gly Gln Trp Thr Ala Gln His
    850                 855                 860

Pro Pro Cys Gln Leu Ile Ile Leu Glu Glu Leu Ser Ala Tyr Arg Phe
865                 870                 875                 880

Ser Asp Asp Arg Pro Pro Ser Glu Asn Ser Lys Leu Met Ala Trp Gly
                885                 890                 895

His Arg Gly Ile Leu Glu Glu Leu Val Asn Gln Ala Gln Val His Asp
            900                 905                 910

Val Leu Val Gly Thr Val Tyr Ala Ala Phe Ser Ser Arg Phe Asp Ala
        915                 920                 925

Arg Thr Gly Ala Pro Gly Val Arg Cys Arg Arg Val Pro Ala Arg Phe
    930                 935                 940

Val Gly Ala Thr Val Asp Asp Ser Leu Pro Leu Trp Leu Thr Glu Phe
945                 950                 955                 960

Leu Asp Lys His Arg Leu Asp Lys Asn Leu Leu Arg Pro Asp Asp Val
```

```
                    965                 970                 975
Ile Pro Thr Gly Glu Gly Glu Phe Leu Val Ser Pro Cys Gly Glu Glu
                    980                 985                 990

Ala Ala Arg Val Arg Gln Val His Ala Asp Ile Asn Ala Ala Gln Asn
            995                1000                1005

Leu Gln Arg Arg Leu Trp Gln Asn Phe Asp Ile Thr Glu Leu Arg
        1010                1015                1020

Leu Arg Cys Asp Val Lys Met Gly Gly Glu Gly Thr Val Leu Val
        1025                1030                1035

Pro Arg Val Asn Asn Ala Arg Ala Lys Gln Leu Phe Gly Lys Lys
        1040                1045                1050

Val Leu Val Ser Gln Asp Gly Val Thr Phe Phe Glu Arg Ser Gln
        1055                1060                1065

Thr Gly Gly Lys Pro His Ser Glu Lys Gln Thr Asp Leu Thr Asp
        1070                1075                1080

Lys Glu Leu Glu Leu Ile Ala Glu Ala Asp Glu Ala Arg Ala Lys
        1085                1090                1095

Ser Val Val Leu Phe Arg Asp Pro Ser Gly His Ile Gly Lys Gly
        1100                1105                1110

His Trp Ile Arg Gln Arg Glu Phe Trp Ser Leu Val Lys Gln Arg
        1115                1120                1125

Ile Glu Ser His Thr Ala Glu Arg Ile Arg Val Arg Gly Val Gly
        1130                1135                1140

Ser Ser Leu Asp
    1145

<210> SEQ ID NO 3
<211> LENGTH: 1146
<212> TYPE: PRT
<213> ORGANISM: Alicyclobacillus macrosporangiidus

<400> SEQUENCE: 3

Met Asn Val Ala Val Lys Ser Ile Lys Val Lys Leu Met Leu Gly His
1               5                   10                  15

Leu Pro Glu Ile Arg Glu Gly Leu Trp His Leu His Glu Ala Val Asn
            20                  25                  30

Leu Gly Val Arg Tyr Tyr Thr Glu Trp Leu Ala Leu Leu Arg Gln Gly
        35                  40                  45

Asn Leu Tyr Arg Arg Gly Lys Asp Gly Ala Gln Glu Cys Tyr Met Thr
    50                  55                  60

Ala Glu Gln Cys Arg Gln Glu Leu Leu Val Arg Leu Arg Asp Arg Gln
65                  70                  75                  80

Lys Arg Asn Gly His Thr Gly Asp Pro Gly Thr Asp Glu Glu Leu Leu
                85                  90                  95

Gly Val Ala Arg Arg Leu Tyr Glu Leu Leu Val Pro Gln Ser Val Gly
            100                 105                 110

Lys Lys Gly Gln Ala Gln Met Leu Ala Ser Gly Phe Leu Ser Pro Leu
        115                 120                 125

Ala Asp Pro Lys Ser Glu Gly Gly Lys Gly Thr Ser Lys Ser Gly Arg
    130                 135                 140

Lys Pro Ala Trp Met Gly Met Lys Glu Ala Gly Asp Ser Arg Trp Val
145                 150                 155                 160

Glu Ala Lys Ala Arg Tyr Glu Ala Asn Lys Ala Lys Asp Pro Thr Lys
                165                 170                 175
```

-continued

Gln Val Ile Ala Ser Leu Glu Met Tyr Gly Leu Arg Pro Leu Phe Asp
                180                 185                 190

Val Phe Thr Glu Thr Tyr Lys Thr Ile Arg Trp Met Pro Leu Gly Lys
        195                 200                 205

His Gln Gly Val Arg Ala Trp Asp Arg Asp Met Phe Gln Gln Ser Leu
        210                 215                 220

Glu Arg Leu Met Ser Trp Glu Ser Trp Asn Glu Arg Val Gly Ala Glu
225                 230                 235                 240

Phe Ala Arg Leu Val Asp Arg Asp Arg Phe Arg Glu Lys His Phe
                245                 250                 255

Thr Gly Gln Glu His Leu Val Ala Leu Ala Gln Arg Leu Glu Gln Glu
                260                 265                 270

Met Lys Glu Ala Ser Pro Gly Phe Glu Ser Lys Ser Ser Gln Ala His
        275                 280                 285

Arg Ile Thr Lys Arg Ala Leu Arg Gly Ala Asp Gly Ile Ile Asp Asp
        290                 295                 300

Trp Leu Lys Leu Ser Glu Gly Glu Pro Val Asp Arg Phe Asp Glu Ile
305                 310                 315                 320

Leu Arg Lys Arg Gln Ala Gln Asn Pro Arg Arg Phe Gly Ser His Asp
                325                 330                 335

Leu Phe Leu Lys Leu Ala Glu Pro Val Phe Gln Pro Leu Trp Arg Glu
                340                 345                 350

Asp Pro Ser Phe Leu Ser Arg Trp Ala Ser Tyr Asn Glu Val Leu Asn
                355                 360                 365

Lys Leu Glu Asp Ala Lys Gln Phe Ala Thr Phe Thr Leu Pro Ser Pro
370                 375                 380

Cys Ser Asn Pro Val Trp Ala Arg Phe Glu Asn Ala Glu Gly Thr Asn
385                 390                 395                 400

Ile Phe Lys Tyr Asp Phe Leu Phe Asp His Phe Gly Lys Gly Arg His
                405                 410                 415

Gly Val Arg Phe Gln Arg Met Ile Val Met Arg Asp Gly Val Pro Thr
                420                 425                 430

Glu Val Glu Gly Ile Val Val Pro Ile Ala Pro Ser Arg Gln Leu Asp
        435                 440                 445

Ala Leu Ala Pro Asn Asp Ala Ala Ser Pro Ile Asp Val Phe Val Gly
        450                 455                 460

Asp Pro Ala Ala Pro Gly Ala Phe Arg Gly Gln Phe Gly Gly Ala Lys
465                 470                 475                 480

Ile Gln Tyr Arg Arg Ser Ala Leu Val Arg Lys Gly Arg Arg Glu Glu
                485                 490                 495

Lys Ala Tyr Leu Cys Gly Phe Arg Leu Pro Ser Gln Arg Arg Thr Gly
        500                 505                 510

Thr Pro Ala Asp Asp Ala Gly Glu Val Phe Leu Asn Leu Ser Leu Arg
        515                 520                 525

Val Glu Ser Gln Ser Glu Gln Ala Gly Arg Arg Asn Pro Pro Tyr Ala
        530                 535                 540

Ala Val Phe His Ile Ser Asp Gln Thr Arg Arg Val Ile Val Arg Tyr
545                 550                 555                 560

Gly Glu Ile Glu Arg Tyr Leu Ala Glu His Pro Asp Thr Gly Ile Pro
                565                 570                 575

Gly Ser Arg Gly Leu Thr Ser Gly Leu Arg Val Met Ser Val Asp Leu
                580                 585                 590

Gly Leu Arg Thr Ser Ala Ala Ile Ser Val Phe Arg Val Ala His Arg

-continued

```
            595                 600                 605
Asp Glu Leu Thr Pro Asp Ala His Gly Arg Gln Pro Phe Phe Pro
            610                 615                 620

Ile His Gly Met Asp His Leu Val Ala Leu His Glu Arg Ser His Leu
625                 630                 635                 640

Ile Arg Leu Pro Gly Glu Thr Glu Ser Lys Lys Val Arg Ser Ile Arg
                    645                 650                 655

Glu Gln Arg Leu Asp Arg Leu Asn Arg Leu Arg Ser Gln Met Ala Ser
            660                 665                 670

Leu Arg Leu Leu Val Arg Thr Gly Val Leu Asp Glu Gln Lys Arg Asp
            675                 680                 685

Arg Asn Trp Glu Arg Leu Gln Ser Ser Met Glu Arg Gly Gly Glu Arg
            690                 695                 700

Met Pro Ser Asp Trp Trp Asp Leu Phe Gln Ala Gln Val Arg Tyr Leu
705                 710                 715                 720

Ala Gln His Arg Asp Ala Ser Gly Glu Ala Trp Gly Arg Met Val Gln
                    725                 730                 735

Ala Ala Val Arg Thr Leu Trp Arg Gln Leu Ala Lys Gln Val Arg Asp
            740                 745                 750

Trp Arg Lys Glu Val Arg Arg Asn Ala Asp Lys Val Lys Ile Arg Gly
            755                 760                 765

Ile Ala Arg Asp Val Pro Gly Gly His Ser Leu Ala Gln Leu Asp Tyr
770                 775                 780

Leu Glu Arg Gln Tyr Arg Phe Leu Arg Ser Trp Ser Ala Phe Ser Val
785                 790                 795                 800

Gln Ala Gly Gln Val Val Arg Ala Glu Arg Asp Ser Arg Phe Ala Val
                    805                 810                 815

Ala Leu Arg Glu His Ile Asp Asn Gly Lys Lys Asp Arg Leu Lys Lys
            820                 825                 830

Leu Ala Asp Arg Ile Leu Met Glu Ala Leu Gly Tyr Val Tyr Val Thr
            835                 840                 845

Asp Gly Arg Arg Ala Gly Gln Trp Gln Ala Val Tyr Pro Pro Cys Gln
850                 855                 860

Leu Val Leu Glu Glu Leu Ser Glu Tyr Arg Phe Ser Asn Asp Arg
865                 870                 875                 880

Pro Pro Ser Glu Asn Ser Gln Leu Met Val Trp Ser His Arg Gly Val
                    885                 890                 895

Leu Glu Glu Leu Ile His Gln Ala Gln Val His Asp Val Leu Val Gly
            900                 905                 910

Thr Ile Pro Ala Ala Phe Ser Ser Arg Phe Asp Ala Arg Thr Gly Ala
            915                 920                 925

Pro Gly Ile Arg Cys Arg Val Pro Ser Ile Pro Leu Lys Asp Ala
            930                 935                 940

Pro Ser Ile Pro Ile Trp Leu Ser His Tyr Leu Lys Gln Thr Glu Arg
945                 950                 955                 960

Asp Ala Ala Leu Arg Pro Gly Glu Leu Ile Pro Thr Gly Asp Gly
                    965                 970                 975

Glu Phe Leu Val Thr Pro Ala Gly Arg Gly Ala Ser Gly Val Arg Val
            980                 985                 990

Val His Ala Asp Ile Asn Ala Ala His Asn Leu Gln Arg Arg Leu Trp
            995                 1000                1005

Glu Asn Phe Asp Leu Ser Asp Ile Arg Val Arg Cys Asp Arg Arg
    1010                1015                1020
```

```
Glu Gly Lys Asp Gly Thr Val Val Leu Ile Pro Arg Leu Thr Asn
    1025                1030                1035

Gln Arg Val Lys Glu Arg Tyr Ser Gly Val Ile Phe Thr Ser Glu
    1040                1045                1050

Asp Gly Val Ser Phe Thr Val Gly Asp Ala Lys Thr Arg Arg Arg
    1055                1060                1065

Ser Ser Ala Ser Gln Gly Glu Gly Asp Leu Ser Asp Glu Glu
    1070                1075                1080

Gln Glu Leu Leu Ala Glu Ala Asp Asp Ala Arg Glu Arg Ser Val
    1085                1090                1095

Val Leu Phe Arg Asp Pro Ser Gly Phe Val Asn Gly Gly Arg Trp
    1100                1105                1110

Thr Ala Gln Arg Ala Phe Trp Gly Met Val His Asn Arg Ile Glu
    1115                1120                1125

Thr Leu Leu Ala Glu Arg Phe Ser Val Ser Gly Ala Ala Glu Lys
    1130                1135                1140

Val Arg Gly
    1145

<210> SEQ ID NO 4
<211> LENGTH: 1108
<212> TYPE: PRT
<213> ORGANISM: Bacillus hisashii

<400> SEQUENCE: 4

Met Ala Thr Arg Ser Phe Ile Leu Lys Ile Glu Pro Asn Glu Val
1               5                   10                  15

Lys Lys Gly Leu Trp Lys Thr His Glu Val Leu Asn His Gly Ile Ala
                20                  25                  30

Tyr Tyr Met Asn Ile Leu Lys Leu Ile Arg Gln Glu Ala Ile Tyr Glu
                35                  40                  45

His His Glu Gln Asp Pro Lys Asn Pro Lys Lys Val Ser Lys Ala Glu
        50                  55                  60

Ile Gln Ala Glu Leu Trp Asp Phe Val Leu Lys Met Gln Lys Cys Asn
65                  70                  75                  80

Ser Phe Thr His Glu Val Asp Lys Asp Glu Val Phe Asn Ile Leu Arg
                85                  90                  95

Glu Leu Tyr Glu Glu Leu Val Pro Ser Ser Val Glu Lys Lys Gly Glu
                100                 105                 110

Ala Asn Gln Leu Ser Asn Lys Phe Leu Tyr Pro Leu Val Asp Pro Asn
        115                 120                 125

Ser Gln Ser Gly Lys Gly Thr Ala Ser Ser Gly Arg Lys Pro Arg Trp
    130                 135                 140

Tyr Asn Leu Lys Ile Ala Gly Asp Pro Ser Trp Glu Glu Glu Lys Lys
145                 150                 155                 160

Lys Trp Glu Glu Asp Lys Lys Lys Asp Pro Leu Ala Lys Ile Leu Gly
                165                 170                 175

Lys Leu Ala Glu Tyr Gly Leu Ile Pro Leu Phe Ile Pro Tyr Thr Asp
                180                 185                 190

Ser Asn Glu Pro Ile Val Lys Glu Ile Lys Trp Met Glu Lys Ser Arg
        195                 200                 205

Asn Gln Ser Val Arg Arg Leu Asp Lys Asp Met Phe Ile Gln Ala Leu
    210                 215                 220

Glu Arg Phe Leu Ser Trp Glu Ser Trp Asn Leu Lys Val Lys Glu Glu
```

-continued

```
            225                 230                 235                 240

Tyr Glu Lys Val Glu Lys Glu Tyr Lys Thr Leu Glu Glu Arg Ile Lys
                245                 250                 255

Glu Asp Ile Gln Ala Leu Lys Ala Leu Glu Gln Tyr Glu Lys Glu Arg
                260                 265                 270

Gln Glu Gln Leu Leu Arg Asp Thr Leu Asn Thr Asn Glu Tyr Arg Leu
                275                 280                 285

Ser Lys Arg Gly Leu Arg Gly Trp Arg Glu Ile Ile Gln Lys Trp Leu
                290                 295                 300

Lys Met Asp Glu Asn Glu Pro Ser Glu Lys Tyr Leu Glu Val Phe Lys
305                 310                 315                 320

Asp Tyr Gln Arg Lys His Pro Arg Glu Ala Gly Asp Tyr Ser Val Tyr
                325                 330                 335

Glu Phe Leu Ser Lys Lys Glu Asn His Phe Ile Trp Arg Asn His Pro
                340                 345                 350

Glu Tyr Pro Tyr Leu Tyr Ala Thr Phe Cys Glu Ile Asp Lys Lys Lys
                355                 360                 365

Lys Asp Ala Lys Gln Gln Ala Thr Phe Thr Leu Ala Asp Pro Ile Asn
370                 375                 380

His Pro Leu Trp Val Arg Phe Glu Glu Arg Ser Gly Ser Asn Leu Asn
385                 390                 395                 400

Lys Tyr Arg Ile Leu Thr Glu Gln Leu His Thr Glu Lys Leu Lys Lys
                405                 410                 415

Lys Leu Thr Val Gln Leu Asp Arg Leu Ile Tyr Pro Thr Glu Ser Gly
                420                 425                 430

Gly Trp Glu Glu Lys Gly Lys Val Asp Ile Val Leu Leu Pro Ser Arg
                435                 440                 445

Gln Phe Tyr Asn Gln Ile Phe Leu Asp Ile Glu Glu Lys Gly Lys His
                450                 455                 460

Ala Phe Thr Tyr Lys Asp Glu Ser Ile Lys Phe Pro Leu Lys Gly Thr
465                 470                 475                 480

Leu Gly Gly Ala Arg Val Gln Phe Asp Arg Asp His Leu Arg Arg Tyr
                485                 490                 495

Pro His Lys Val Glu Ser Gly Asn Val Gly Arg Ile Tyr Phe Asn Met
                500                 505                 510

Thr Val Asn Ile Glu Pro Thr Glu Ser Pro Val Ser Lys Ser Leu Lys
                515                 520                 525

Ile His Arg Asp Asp Phe Pro Lys Val Val Asn Phe Lys Pro Lys Glu
                530                 535                 540

Leu Thr Glu Trp Ile Lys Asp Ser Lys Gly Lys Lys Leu Lys Ser Gly
545                 550                 555                 560

Ile Glu Ser Leu Glu Ile Gly Leu Arg Val Met Ser Ile Asp Leu Gly
                565                 570                 575

Gln Arg Gln Ala Ala Ala Ala Ser Ile Phe Glu Val Val Asp Gln Lys
                580                 585                 590

Pro Asp Ile Glu Gly Lys Leu Phe Phe Pro Ile Lys Gly Thr Glu Leu
                595                 600                 605

Tyr Ala Val His Arg Ala Ser Phe Asn Ile Lys Leu Pro Gly Glu Thr
                610                 615                 620

Leu Val Lys Ser Arg Glu Val Leu Arg Lys Ala Arg Glu Asp Asn Leu
625                 630                 635                 640

Lys Leu Met Asn Gln Lys Leu Asn Phe Leu Arg Asn Val Leu His Phe
                645                 650                 655
```

-continued

Gln Gln Phe Glu Asp Ile Thr Glu Arg Glu Lys Arg Val Thr Lys Trp
            660                 665                 670

Ile Ser Arg Gln Glu Asn Ser Asp Val Pro Leu Val Tyr Gln Asp Glu
            675                 680                 685

Leu Ile Gln Ile Arg Glu Leu Met Tyr Lys Pro Tyr Lys Asp Trp Val
        690                 695                 700

Ala Phe Leu Lys Gln Leu His Lys Arg Leu Glu Val Glu Ile Gly Lys
705                 710                 715                 720

Glu Val Lys His Trp Arg Lys Ser Leu Ser Asp Gly Arg Lys Gly Leu
                725                 730                 735

Tyr Gly Ile Ser Leu Lys Asn Ile Asp Glu Ile Asp Arg Thr Arg Lys
            740                 745                 750

Phe Leu Leu Arg Trp Ser Leu Arg Pro Thr Glu Pro Gly Glu Val Arg
        755                 760                 765

Arg Leu Glu Pro Gly Gln Arg Phe Ala Ile Asp Gln Leu Asn His Leu
    770                 775                 780

Asn Ala Leu Lys Glu Asp Arg Leu Lys Lys Met Ala Asn Thr Ile Ile
785                 790                 795                 800

Met His Ala Leu Gly Tyr Cys Tyr Asp Val Arg Lys Lys Lys Trp Gln
                805                 810                 815

Ala Lys Asn Pro Ala Cys Gln Ile Ile Leu Phe Glu Asp Leu Ser Asn
            820                 825                 830

Tyr Asn Pro Tyr Glu Glu Arg Ser Arg Phe Glu Asn Ser Lys Leu Met
        835                 840                 845

Lys Trp Ser Arg Arg Glu Ile Pro Arg Gln Val Ala Leu Gln Gly Glu
    850                 855                 860

Ile Tyr Gly Leu Gln Val Gly Glu Val Gly Ala Gln Phe Ser Ser Arg
865                 870                 875                 880

Phe His Ala Lys Thr Gly Ser Pro Gly Ile Arg Cys Ser Val Val Thr
                885                 890                 895

Lys Glu Lys Leu Gln Asp Asn Arg Phe Phe Lys Asn Leu Gln Arg Glu
            900                 905                 910

Gly Arg Leu Thr Leu Asp Lys Ile Ala Val Leu Lys Glu Gly Asp Leu
        915                 920                 925

Tyr Pro Asp Lys Gly Gly Glu Lys Phe Ile Ser Leu Ser Lys Asp Arg
    930                 935                 940

Lys Cys Val Thr Thr His Ala Asp Ile Asn Ala Ala Gln Asn Leu Gln
945                 950                 955                 960

Lys Arg Phe Trp Thr Arg Thr His Gly Phe Tyr Lys Val Tyr Cys Lys
                965                 970                 975

Ala Tyr Gln Val Asp Gly Gln Thr Val Tyr Ile Pro Glu Ser Lys Asp
            980                 985                 990

Gln Lys Gln Lys Ile Ile Glu Glu Phe Gly Glu Gly Tyr Phe Ile Leu
        995                 1000                1005

Lys Asp Gly Val Tyr Glu Trp Val Asn Ala Gly Lys Leu Lys Ile
        1010                1015                1020

Lys Lys Gly Ser Ser Lys Gln Ser Ser Ser Glu Leu Val Asp Ser
        1025                1030                1035

Asp Ile Leu Lys Asp Ser Phe Asp Leu Ala Ser Glu Leu Lys Gly
        1040                1045                1050

Glu Lys Leu Met Leu Tyr Arg Asp Pro Ser Gly Asn Val Phe Pro
        1055                1060                1065

-continued

```
Ser Asp Lys Trp Met Ala Ala Gly Val Phe Phe Gly Lys Leu Glu
    1070                1075                1080

Arg Ile Leu Ile Ser Lys Leu Thr Asn Gln Tyr Ser Ile Ser Thr
    1085                1090                1095

Ile Glu Asp Asp Ser Ser Lys Gln Ser Met
    1100                1105

<210> SEQ ID NO 5
<211> LENGTH: 1108
<212> TYPE: PRT
<213> ORGANISM: Bacillus

<400> SEQUENCE: 5

Met Ala Ile Arg Ser Ile Lys Leu Lys Leu Lys Thr His Thr Gly Pro
1               5                   10                  15

Glu Ala Gln Asn Leu Arg Lys Gly Ile Trp Arg Thr His Arg Leu Leu
            20                  25                  30

Asn Glu Gly Val Ala Tyr Tyr Met Lys Met Leu Leu Leu Phe Arg Gln
        35                  40                  45

Glu Ser Thr Gly Glu Arg Pro Lys Glu Glu Leu Gln Glu Glu Leu Ile
50                  55                  60

Cys His Ile Arg Glu Gln Gln Gln Arg Asn Gln Ala Asp Lys Asn Thr
65                  70                  75                  80

Gln Ala Leu Pro Leu Asp Lys Ala Leu Glu Ala Leu Arg Gln Leu Tyr
                85                  90                  95

Glu Leu Leu Val Pro Ser Ser Val Gly Gln Ser Gly Asp Ala Gln Ile
            100                 105                 110

Ile Ser Arg Lys Phe Leu Ser Pro Leu Val Asp Pro Asn Ser Glu Gly
        115                 120                 125

Gly Lys Gly Thr Ser Lys Ala Gly Ala Lys Pro Thr Trp Gln Lys Lys
    130                 135                 140

Lys Glu Ala Asn Asp Pro Thr Trp Glu Gln Asp Tyr Glu Lys Trp Lys
145                 150                 155                 160

Lys Arg Arg Glu Glu Asp Pro Thr Ala Ser Val Ile Thr Thr Leu Glu
                165                 170                 175

Glu Tyr Gly Ile Arg Pro Ile Phe Pro Leu Tyr Thr Asn Thr Val Thr
            180                 185                 190

Asp Ile Ala Trp Leu Pro Leu Gln Ser Asn Gln Phe Val Arg Thr Trp
        195                 200                 205

Asp Arg Asp Met Leu Gln Gln Ala Ile Glu Arg Leu Leu Ser Trp Glu
    210                 215                 220

Ser Trp Asn Lys Arg Val Gln Glu Glu Tyr Ala Lys Leu Lys Glu Lys
225                 230                 235                 240

Met Ala Gln Leu Asn Glu Gln Leu Glu Gly Gly Gln Glu Trp Ile Ser
                245                 250                 255

Leu Leu Glu Gln Tyr Glu Glu Asn Arg Glu Arg Glu Leu Arg Glu Asn
            260                 265                 270

Met Thr Ala Ala Asn Asp Lys Tyr Arg Ile Thr Lys Arg Gln Met Lys
        275                 280                 285

Gly Trp Asn Glu Leu Tyr Glu Leu Trp Ser Thr Phe Pro Ala Ser Ala
    290                 295                 300

Ser His Glu Gln Tyr Lys Glu Ala Leu Lys Arg Val Gln Gln Arg Leu
305                 310                 315                 320

Arg Gly Arg Phe Gly Asp Ala His Phe Phe Gln Tyr Leu Met Glu Glu
                325                 330                 335
```

```
Lys Asn Arg Leu Ile Trp Lys Gly Asn Pro Gln Arg Ile His Tyr Phe
            340                 345                 350

Val Ala Arg Asn Glu Leu Thr Lys Arg Leu Glu Ala Lys Gln Ser
            355                 360                 365

Ala Thr Met Thr Leu Pro Asn Ala Arg Lys His Pro Leu Trp Val Arg
370                 375                 380

Phe Asp Ala Arg Gly Gly Asn Leu Gln Asp Tyr Tyr Leu Thr Ala Glu
385                 390                 395                 400

Ala Asp Lys Pro Arg Ser Arg Arg Phe Val Thr Phe Ser Gln Leu Ile
            405                 410                 415

Trp Pro Ser Glu Ser Gly Trp Met Glu Lys Lys Asp Val Glu Val Glu
            420                 425                 430

Leu Ala Leu Ser Arg Gln Phe Tyr Gln Gln Val Lys Leu Leu Lys Asn
            435                 440                 445

Asp Lys Gly Lys Gln Lys Ile Glu Phe Lys Asp Lys Gly Ser Gly Ser
            450                 455                 460

Thr Phe Asn Gly His Leu Gly Gly Ala Lys Leu Gln Leu Glu Arg Gly
465                 470                 475                 480

Asp Leu Glu Lys Glu Glu Lys Asn Phe Glu Asp Gly Glu Ile Gly Ser
            485                 490                 495

Val Tyr Leu Asn Val Val Ile Asp Phe Glu Pro Leu Gln Glu Val Lys
            500                 505                 510

Asn Gly Arg Val Gln Ala Pro Tyr Gly Gln Val Leu Gln Leu Ile Arg
            515                 520                 525

Arg Pro Asn Glu Phe Pro Lys Val Thr Thr Tyr Lys Ser Glu Gln Leu
            530                 535                 540

Val Glu Trp Ile Lys Ala Ser Pro Gln His Ser Ala Gly Val Glu Ser
545                 550                 555                 560

Leu Ala Ser Gly Phe Arg Val Met Ser Ile Asp Leu Gly Leu Arg Ala
                565                 570                 575

Ala Ala Ala Thr Ser Ile Phe Ser Val Glu Glu Ser Ser Asp Lys Asn
            580                 585                 590

Ala Ala Asp Phe Ser Tyr Trp Ile Glu Gly Thr Pro Leu Val Ala Val
            595                 600                 605

His Gln Arg Ser Tyr Met Leu Arg Leu Pro Gly Glu Gln Val Glu Lys
            610                 615                 620

Gln Val Met Glu Lys Arg Asp Glu Arg Phe Gln Leu His Gln Arg Val
625                 630                 635                 640

Lys Phe Gln Ile Arg Val Leu Ala Gln Ile Met Arg Met Ala Asn Lys
                645                 650                 655

Gln Tyr Gly Asp Arg Trp Asp Glu Leu Asp Ser Leu Lys Gln Ala Val
            660                 665                 670

Glu Gln Lys Lys Ser Pro Leu Asp Gln Thr Asp Arg Thr Phe Trp Glu
            675                 680                 685

Gly Ile Val Cys Asp Leu Thr Lys Val Leu Pro Arg Asn Glu Ala Asp
690                 695                 700

Trp Glu Gln Ala Val Val Gln Ile His Arg Lys Ala Glu Glu Tyr Val
705                 710                 715                 720

Gly Lys Ala Val Gln Ala Trp Arg Lys Arg Phe Ala Ala Asp Glu Arg
            725                 730                 735

Lys Gly Ile Ala Gly Leu Ser Met Trp Asn Ile Glu Glu Leu Glu Gly
            740                 745                 750
```

-continued

```
Leu Arg Lys Leu Leu Ile Ser Trp Ser Arg Arg Thr Arg Asn Pro Gln
        755                 760                 765

Glu Val Asn Arg Phe Glu Arg Gly His Thr Ser His Gln Arg Leu Leu
    770                 775                 780

Thr His Ile Gln Asn Val Lys Glu Asp Arg Leu Lys Gln Leu Ser His
785                 790                 795                 800

Ala Ile Val Met Thr Ala Leu Gly Tyr Val Tyr Asp Glu Arg Lys Gln
                805                 810                 815

Glu Trp Cys Ala Glu Tyr Pro Ala Cys Gln Val Ile Leu Phe Glu Asn
            820                 825                 830

Leu Ser Gln Tyr Arg Ser Asn Leu Asp Arg Ser Thr Lys Glu Asn Ser
        835                 840                 845

Thr Leu Met Lys Trp Ala His Arg Ser Ile Pro Lys Tyr Val His Met
    850                 855                 860

Gln Ala Glu Pro Tyr Gly Ile Gln Ile Gly Asp Val Arg Ala Glu Tyr
865                 870                 875                 880

Ser Ser Arg Phe Tyr Ala Lys Thr Gly Thr Pro Gly Ile Arg Cys Lys
                885                 890                 895

Lys Val Arg Gly Gln Asp Leu Gln Gly Arg Phe Glu Asn Leu Gln
            900                 905                 910

Lys Arg Leu Val Asn Glu Gln Phe Leu Thr Glu Gln Val Lys Gln
        915                 920                 925

Leu Arg Pro Gly Asp Ile Val Pro Asp Asp Ser Gly Glu Leu Phe Met
    930                 935                 940

Thr Leu Thr Asp Gly Ser Gly Ser Lys Glu Val Val Phe Leu Gln Ala
945                 950                 955                 960

Asp Ile Asn Ala Ala His Asn Leu Gln Lys Arg Phe Trp Gln Arg Tyr
                965                 970                 975

Asn Glu Leu Phe Lys Val Ser Cys Arg Val Ile Val Arg Asp Glu Glu
            980                 985                 990

Glu Tyr Leu Val Pro Lys Thr Lys Ser Val Gln Ala Lys Leu Gly Lys
        995                 1000                1005

Gly Leu Phe Val Lys Lys Ser Asp Thr Ala Trp Lys Asp Val Tyr
    1010                1015                1020

Val Trp Asp Ser Gln Ala Lys Leu Lys Gly Lys Thr Thr Phe Thr
    1025                1030                1035

Glu Glu Ser Glu Ser Pro Glu Gln Leu Glu Asp Phe Gln Glu Ile
    1040                1045                1050

Ile Glu Glu Ala Glu Glu Ala Lys Gly Thr Tyr Arg Thr Leu Phe
    1055                1060                1065

Arg Asp Pro Ser Gly Val Phe Phe Pro Glu Ser Val Trp Tyr Pro
    1070                1075                1080

Gln Lys Asp Phe Trp Gly Glu Val Lys Arg Lys Leu Tyr Gly Lys
    1085                1090                1095

Leu Arg Glu Arg Phe Leu Thr Lys Ala Arg
    1100                1105

<210> SEQ ID NO 6
<211> LENGTH: 1112
<212> TYPE: PRT
<213> ORGANISM: Bacillus

<400> SEQUENCE: 6

Met Ala Ile Arg Ser Ile Lys Leu Lys Met Lys Thr Asn Ser Gly Thr
1               5                   10                  15
```

-continued

```
Asp Ser Ile Tyr Leu Arg Lys Ala Leu Trp Arg Thr His Gln Leu Ile
            20                  25                  30

Asn Glu Gly Ile Ala Tyr Tyr Met Asn Leu Leu Thr Leu Tyr Arg Gln
        35                  40                  45

Glu Ala Ile Gly Asp Lys Thr Lys Glu Ala Tyr Gln Ala Glu Leu Ile
 50                  55                  60

Asn Ile Ile Arg Asn Gln Gln Arg Asn Gly Ser Ser Glu His
 65                  70                  75                  80

Gly Ser Asp Gln Glu Ile Leu Ala Leu Leu Arg Gln Leu Tyr Glu Leu
                85                  90                  95

Ile Ile Pro Ser Ser Ile Gly Glu Ser Gly Asp Ala Asn Gln Leu Gly
            100                 105                 110

Asn Lys Phe Leu Tyr Pro Leu Val Asp Pro Asn Ser Gln Ser Gly Lys
        115                 120                 125

Gly Thr Ser Asn Ala Gly Arg Lys Pro Arg Trp Lys Arg Leu Lys Glu
130                 135                 140

Glu Gly Asn Pro Asp Trp Glu Leu Glu Lys Lys Asp Glu Glu Arg
145                 150                 155                 160

Lys Ala Lys Asp Pro Thr Val Lys Ile Phe Asp Asn Leu Asn Lys Tyr
                165                 170                 175

Gly Leu Leu Pro Leu Phe Pro Leu Phe Thr Asn Ile Gln Lys Asp Ile
            180                 185                 190

Glu Trp Leu Pro Leu Gly Lys Arg Gln Ser Val Arg Lys Trp Asp Lys
        195                 200                 205

Asp Met Phe Ile Gln Ala Ile Glu Arg Leu Leu Ser Trp Glu Ser Trp
210                 215                 220

Asn Arg Arg Val Ala Asp Glu Tyr Lys Gln Leu Lys Glu Lys Thr Glu
225                 230                 235                 240

Ser Tyr Tyr Lys Glu His Leu Thr Gly Gly Glu Glu Trp Ile Glu Lys
                245                 250                 255

Ile Arg Lys Phe Glu Lys Glu Arg Asn Met Glu Leu Glu Lys Asn Ala
            260                 265                 270

Phe Ala Pro Asn Asp Gly Tyr Phe Ile Thr Ser Arg Gln Ile Arg Gly
        275                 280                 285

Trp Asp Arg Val Tyr Glu Lys Trp Ser Lys Leu Pro Glu Ser Ala Ser
290                 295                 300

Pro Glu Glu Leu Trp Lys Val Ala Glu Gln Gln Asn Lys Met Ser
305                 310                 315                 320

Glu Gly Phe Gly Asp Pro Lys Val Phe Ser Phe Leu Ala Asn Arg Glu
                325                 330                 335

Asn Arg Asp Ile Trp Arg Gly His Ser Glu Arg Ile Tyr His Ile Ala
            340                 345                 350

Ala Tyr Asn Gly Leu Gln Lys Lys Leu Ser Arg Thr Lys Glu Gln Ala
        355                 360                 365

Thr Phe Thr Leu Pro Asp Ala Ile Glu His Pro Leu Trp Ile Arg Tyr
370                 375                 380

Glu Ser Pro Gly Gly Thr Asn Leu Asn Leu Phe Lys Leu Glu Glu Lys
385                 390                 395                 400

Gln Lys Lys Asn Tyr Tyr Val Thr Leu Ser Lys Ile Ile Trp Pro Ser
                405                 410                 415

Glu Glu Lys Trp Ile Glu Lys Glu Asn Ile Glu Ile Pro Leu Ala Pro
            420                 425                 430
```

```
Ser Ile Gln Phe Asn Arg Gln Ile Lys Leu Lys Gln His Val Lys Gly
            435                 440                 445

Lys Gln Glu Ile Ser Phe Ser Asp Tyr Ser Ser Arg Ile Ser Leu Asp
450                 455                 460

Gly Val Leu Gly Gly Ser Arg Ile Gln Phe Asn Arg Lys Tyr Ile Lys
465                 470                 475                 480

Asn His Lys Glu Leu Leu Gly Glu Gly Asp Ile Gly Pro Val Phe Phe
                485                 490                 495

Asn Leu Val Val Asp Val Ala Pro Leu Gln Thr Arg Asn Gly Arg
                500                 505                 510

Leu Gln Ser Pro Ile Gly Lys Ala Leu Lys Val Ile Ser Ser Asp Phe
            515                 520                 525

Ser Lys Val Ile Asp Tyr Lys Pro Lys Glu Leu Met Asp Trp Met Asn
530                 535                 540

Thr Gly Ser Ala Ser Asn Ser Phe Gly Val Ala Ser Leu Leu Glu Gly
545                 550                 555                 560

Met Arg Val Met Ser Ile Asp Met Gly Gln Arg Thr Ser Ala Ser Val
                565                 570                 575

Ser Ile Phe Glu Val Val Lys Glu Leu Pro Lys Asp Gln Gln Lys
            580                 585                 590

Leu Phe Tyr Ser Ile Asn Asp Thr Glu Leu Phe Ala Ile His Lys Arg
            595                 600                 605

Ser Phe Leu Leu Asn Leu Pro Gly Glu Val Val Thr Lys Asn Asn Lys
            610                 615                 620

Gln Gln Arg Gln Glu Arg Arg Lys Lys Arg Gln Phe Val Arg Ser Gln
625                 630                 635                 640

Ile Arg Met Leu Ala Asn Val Leu Arg Leu Glu Thr Lys Lys Thr Pro
                645                 650                 655

Asp Glu Arg Lys Lys Ala Ile His Lys Leu Met Glu Ile Val Gln Ser
                660                 665                 670

Tyr Asp Ser Trp Thr Ala Ser Gln Lys Glu Val Trp Glu Lys Glu Leu
            675                 680                 685

Asn Leu Leu Thr Asn Met Ala Ala Phe Asn Asp Glu Ile Trp Lys Glu
            690                 695                 700

Ser Leu Val Glu Leu His His Arg Ile Glu Pro Tyr Val Gly Gln Ile
705                 710                 715                 720

Val Ser Lys Trp Arg Lys Gly Leu Ser Glu Gly Arg Lys Asn Leu Ala
                725                 730                 735

Gly Ile Ser Met Trp Asn Ile Asp Glu Leu Glu Asp Thr Arg Arg Leu
            740                 745                 750

Leu Ile Ser Trp Ser Lys Arg Ser Arg Thr Pro Gly Glu Ala Asn Arg
            755                 760                 765

Ile Glu Thr Asp Glu Pro Phe Gly Ser Ser Leu Leu Gln His Ile Gln
            770                 775                 780

Asn Val Lys Asp Asp Arg Leu Lys Gln Met Ala Asn Leu Ile Ile Met
785                 790                 795                 800

Thr Ala Leu Gly Phe Lys Tyr Asp Lys Glu Lys Asp Arg Tyr Lys
                805                 810                 815

Arg Trp Lys Glu Thr Tyr Pro Ala Cys Gln Ile Ile Leu Phe Glu Asn
            820                 825                 830

Leu Asn Arg Tyr Leu Phe Asn Leu Asp Arg Ser Arg Arg Glu Asn Ser
            835                 840                 845

Arg Leu Met Lys Trp Ala His Arg Ser Ile Pro Arg Thr Val Ser Met
```

```
                      850                855                860
        Gln Gly Glu Met Phe Gly Leu Gln Val Gly Asp Val Arg Ser Glu Tyr
        865                870                875                880

Ser Ser Arg Phe His Ala Lys Thr Gly Ala Pro Gly Ile Arg Cys His
                        885                890                895

Ala Leu Thr Glu Glu Asp Leu Lys Ala Gly Ser Asn Thr Leu Lys Arg
                    900                905                910

Leu Ile Glu Asp Gly Phe Ile Asn Glu Ser Glu Leu Ala Tyr Leu Lys
                    915                920                925

Lys Gly Asp Ile Ile Pro Ser Gln Gly Gly Glu Leu Phe Val Thr Leu
                    930                935                940

Ser Lys Arg Tyr Lys Lys Asp Ser Asp Asn Asn Glu Leu Thr Val Ile
        945                950                955                960

His Ala Asp Ile Asn Ala Ala Gln Asn Leu Gln Lys Arg Phe Trp Gln
                    965                970                975

Gln Asn Ser Glu Val Tyr Arg Val Pro Cys Gln Leu Ala Arg Met Gly
                    980                985                990

Glu Asp Lys Leu Tyr Ile Pro Lys Ser Gln Thr Glu Thr Ile Lys Lys
                    995                1000               1005

Tyr Phe Gly Lys Gly Ser Phe Val Lys Asn Asn Thr Glu Gln Glu
                    1010               1015               1020

Val Tyr Lys Trp Glu Lys Ser Glu Lys Met Lys Ile Lys Thr Asp
                    1025               1030               1035

Thr Thr Phe Asp Leu Gln Asp Leu Asp Gly Phe Glu Asp Ile Ser
                    1040               1045               1050

Lys Thr Ile Glu Leu Ala Gln Glu Gln Gln Lys Lys Tyr Leu Thr
                    1055               1060               1065

Met Phe Arg Asp Pro Ser Gly Tyr Phe Phe Asn Asn Glu Thr Trp
                    1070               1075               1080

Arg Pro Gln Lys Glu Tyr Trp Ser Ile Val Asn Asn Ile Ile Lys
                    1085               1090               1095

Ser Cys Leu Lys Lys Lys Ile Leu Ser Asn Lys Val Glu Leu
                    1100               1105               1110

<210> SEQ ID NO 7
<211> LENGTH: 1149
<212> TYPE: PRT
<213> ORGANISM: Desulfovibrio inopinatus

<400> SEQUENCE: 7

Met Pro Thr Arg Thr Ile Asn Leu Lys Leu Val Leu Gly Lys Asn Pro
1               5                   10                  15

Glu Asn Ala Thr Leu Arg Arg Ala Leu Phe Ser Thr His Arg Leu Val
                20                  25                  30

Asn Gln Ala Thr Lys Arg Ile Glu Glu Phe Leu Leu Leu Cys Arg Gly
            35                  40                  45

Glu Ala Tyr Arg Thr Val Asp Asn Glu Gly Lys Ala Glu Ile Pro
        50                  55                  60

Arg His Ala Val Gln Glu Glu Ala Leu Ala Phe Ala Lys Ala Ala Gln
65                  70                  75                  80

Arg His Asn Gly Cys Ile Ser Thr Tyr Glu Asp Gln Glu Ile Leu Asp
                85                  90                  95

Val Leu Arg Gln Leu Tyr Glu Arg Leu Val Pro Ser Val Asn Glu Asn
            100                 105                 110
```

-continued

```
Asn Glu Ala Gly Asp Ala Gln Ala Asn Ala Trp Val Ser Pro Leu
            115                 120                 125
Met Ser Ala Glu Ser Glu Gly Gly Leu Ser Val Tyr Asp Lys Val Leu
130                 135                 140
Asp Pro Pro Val Trp Met Lys Leu Lys Glu Glu Lys Ala Pro Gly
145                 150                 155                 160
Trp Glu Ala Ala Ser Gln Ile Trp Ile Gln Ser Asp Glu Gly Gln Ser
                    165                 170                 175
Leu Leu Asn Lys Pro Gly Ser Pro Arg Trp Ile Arg Lys Leu Arg
            180                 185                 190
Ser Gly Gln Pro Trp Gln Asp Asp Phe Val Ser Asp Gln Lys Lys Lys
                    195                 200                 205
Gln Asp Glu Leu Thr Lys Gly Asn Ala Pro Leu Ile Lys Gln Leu Lys
    210                 215                 220
Glu Met Gly Leu Leu Pro Leu Val Asn Pro Phe Phe Arg His Leu Leu
225                 230                 235                 240
Asp Pro Glu Gly Lys Gly Val Ser Pro Trp Asp Arg Leu Ala Val Arg
                    245                 250                 255
Ala Ala Val Ala His Phe Ile Ser Trp Glu Ser Trp Asn His Arg Thr
                260                 265                 270
Arg Ala Glu Tyr Asn Ser Leu Lys Leu Arg Arg Asp Glu Phe Glu Ala
            275                 280                 285
Ala Ser Asp Glu Phe Lys Asp Asp Phe Thr Leu Leu Arg Gln Tyr Glu
    290                 295                 300
Ala Lys Arg His Ser Thr Leu Lys Ser Ile Ala Leu Ala Asp Asp Ser
305                 310                 315                 320
Asn Pro Tyr Arg Ile Gly Val Arg Ser Leu Arg Ala Trp Asn Arg Val
                    325                 330                 335
Arg Glu Glu Trp Ile Asp Lys Gly Ala Thr Glu Glu Gln Arg Val Thr
                340                 345                 350
Ile Leu Ser Lys Leu Gln Thr Gln Leu Arg Gly Lys Phe Gly Asp Pro
            355                 360                 365
Asp Leu Phe Asn Trp Leu Ala Gln Asp Arg His Val His Leu Trp Ser
    370                 375                 380
Pro Arg Asp Ser Val Thr Pro Leu Val Arg Ile Asn Ala Val Asp Lys
385                 390                 395                 400
Val Leu Arg Arg Arg Lys Pro Tyr Ala Leu Met Thr Phe Ala His Pro
                    405                 410                 415
Arg Phe His Pro Arg Trp Ile Leu Tyr Glu Ala Pro Gly Gly Ser Asn
                420                 425                 430
Leu Arg Gln Tyr Ala Leu Asp Cys Thr Glu Asn Ala Leu His Ile Thr
            435                 440                 445
Leu Pro Leu Leu Val Asp Asp Ala His Gly Thr Trp Ile Glu Lys Lys
    450                 455                 460
Ile Arg Val Pro Leu Ala Pro Ser Gly Gln Ile Gln Asp Leu Thr Leu
465                 470                 475                 480
Glu Lys Leu Glu Lys Lys Lys Asn Arg Leu Tyr Tyr Arg Ser Gly Phe
                    485                 490                 495
Gln Gln Phe Ala Gly Leu Ala Gly Gly Ala Glu Val Leu Phe His Arg
                500                 505                 510
Pro Tyr Met Glu His Asp Glu Arg Ser Glu Glu Ser Leu Leu Glu Arg
            515                 520                 525
Pro Gly Ala Val Trp Phe Lys Leu Thr Leu Asp Val Ala Thr Gln Ala
```

```
            530                 535                 540
Pro Pro Asn Trp Leu Asp Gly Lys Gly Arg Val Arg Thr Pro Glu
545                 550                 555                 560

Val His His Phe Lys Thr Ala Leu Ser Asn Lys Ser Lys His Thr Arg
                565                 570                 575

Thr Leu Gln Pro Gly Leu Arg Val Leu Ser Val Asp Leu Gly Met Arg
            580                 585                 590

Thr Phe Ala Ser Cys Ser Val Phe Glu Leu Ile Glu Gly Lys Pro Glu
            595                 600                 605

Thr Gly Arg Ala Phe Pro Val Ala Asp Glu Arg Ser Met Asp Ser Pro
            610                 615                 620

Asn Lys Leu Trp Ala Lys His Glu Arg Ser Phe Lys Leu Thr Leu Pro
625                 630                 635                 640

Gly Glu Thr Pro Ser Arg Lys Glu Glu Glu Arg Ser Ile Ala Arg
                645                 650                 655

Ala Glu Ile Tyr Ala Leu Lys Arg Asp Ile Gln Arg Leu Lys Ser Leu
                660                 665                 670

Leu Arg Leu Gly Glu Glu Asp Asn Asp Asn Arg Arg Asp Ala Leu Leu
            675                 680                 685

Glu Gln Phe Phe Lys Gly Trp Gly Glu Glu Asp Val Val Pro Gly Gln
690                 695                 700

Ala Phe Pro Arg Ser Leu Phe Gln Gly Leu Gly Ala Ala Pro Phe Arg
705                 710                 715                 720

Ser Thr Pro Glu Leu Trp Arg Gln His Cys Gln Thr Tyr Tyr Asp Lys
                725                 730                 735

Ala Glu Ala Cys Leu Ala Lys His Ile Ser Asp Trp Arg Lys Arg Thr
            740                 745                 750

Arg Pro Arg Pro Thr Ser Arg Glu Met Trp Tyr Lys Thr Arg Ser Tyr
                755                 760                 765

His Gly Gly Lys Ser Ile Trp Met Leu Glu Tyr Leu Asp Ala Val Arg
            770                 775                 780

Lys Leu Leu Leu Ser Trp Ser Leu Arg Gly Arg Thr Tyr Gly Ala Ile
785                 790                 795                 800

Asn Arg Gln Asp Thr Ala Arg Phe Gly Ser Leu Ala Ser Arg Leu Leu
                805                 810                 815

His His Ile Asn Ser Leu Lys Glu Asp Arg Ile Lys Thr Gly Ala Asp
            820                 825                 830

Ser Ile Val Gln Ala Ala Arg Gly Tyr Ile Pro Leu Pro His Gly Lys
            835                 840                 845

Gly Trp Glu Gln Arg Tyr Glu Pro Cys Gln Leu Ile Leu Phe Glu Asp
850                 855                 860

Leu Ala Arg Tyr Arg Phe Arg Val Asp Arg Pro Arg Glu Asn Ser
865                 870                 875                 880

Gln Leu Met Gln Trp Asn His Arg Ala Ile Val Ala Glu Thr Met
            885                 890                 895

Gln Ala Glu Leu Tyr Gly Gln Ile Val Glu Asn Thr Ala Ala Gly Phe
            900                 905                 910

Ser Ser Arg Phe His Ala Ala Thr Gly Ala Pro Gly Val Arg Cys Arg
            915                 920                 925

Phe Leu Leu Glu Arg Asp Phe Asp Asn Asp Leu Pro Lys Pro Tyr Leu
            930                 935                 940

Leu Arg Glu Leu Ser Trp Met Leu Gly Asn Thr Lys Val Glu Ser Glu
945                 950                 955                 960
```

-continued

```
Glu Glu Lys Leu Arg Leu Leu Ser Gly Lys Ile Arg Pro Gly Ser Leu
                965                 970                 975

Val Pro Trp Asp Gly Gly Glu Gln Phe Ala Thr Leu His Pro Lys Arg
            980                 985                 990

Gln Thr Leu Cys Val Ile His Ala Asp Met Asn Ala Ala Gln Asn Leu
        995                1000                1005

Gln Arg Arg Phe Phe Gly Arg Cys Gly Glu Ala Phe Arg Leu Val
    1010                1015                1020

Cys Gln Pro His Gly Asp Asp Val Leu Arg Leu Ala Ser Thr Pro
    1025                1030                1035

Gly Ala Arg Leu Leu Gly Ala Leu Gln Gln Leu Glu Asn Gly Gln
    1040                1045                1050

Gly Ala Phe Glu Leu Val Arg Asp Met Gly Ser Thr Ser Gln Met
    1055                1060                1065

Asn Arg Phe Val Met Lys Ser Leu Gly Lys Lys Lys Ile Lys Pro
    1070                1075                1080

Leu Gln Asp Asn Asn Gly Asp Asp Glu Leu Glu Asp Val Leu Ser
    1085                1090                1095

Val Leu Pro Glu Glu Asp Asp Thr Gly Arg Ile Thr Val Phe Arg
    1100                1105                1110

Asp Ser Ser Gly Ile Phe Phe Pro Cys Asn Val Trp Ile Pro Ala
    1115                1120                1125

Lys Gln Phe Trp Pro Ala Val Arg Ala Met Ile Trp Lys Val Met
    1130                1135                1140

Ala Ser His Ser Leu Gly
    1145

<210> SEQ ID NO 8
<211> LENGTH: 1090
<212> TYPE: PRT
<213> ORGANISM: Laceyella sediminis

<400> SEQUENCE: 8

Met Ser Ile Arg Ser Phe Lys Leu Lys Ile Lys Thr Lys Ser Gly Val
1               5                   10                  15

Asn Ala Glu Glu Leu Arg Arg Gly Leu Trp Arg Thr His Gln Leu Ile
                20                  25                  30

Asn Asp Gly Ile Ala Tyr Tyr Met Asn Trp Leu Val Leu Arg Gln
            35                  40                  45

Glu Asp Leu Phe Ile Arg Asn Glu Glu Thr Asn Glu Ile Glu Lys Arg
    50                  55                  60

Ser Lys Glu Glu Ile Gln Gly Glu Leu Leu Glu Arg Val His Lys Gln
65                  70                  75                  80

Gln Gln Arg Asn Gln Trp Ser Gly Glu Val Asp Asp Gln Thr Leu Leu
                85                  90                  95

Gln Thr Leu Arg His Leu Tyr Glu Glu Ile Val Pro Ser Val Ile Gly
            100                 105                 110

Lys Ser Gly Asn Ala Ser Leu Lys Ala Arg Phe Phe Leu Gly Pro Leu
        115                 120                 125

Val Asp Pro Asn Asn Lys Thr Thr Lys Asp Val Ser Lys Ser Gly Pro
    130                 135                 140

Thr Pro Lys Trp Lys Lys Met Lys Asp Ala Gly Asp Pro Asn Trp Val
145                 150                 155                 160

Gln Glu Tyr Glu Lys Tyr Met Ala Glu Arg Gln Thr Leu Val Arg Leu
```

```
              165                 170                 175
Glu Glu Met Gly Leu Ile Pro Leu Phe Pro Met Tyr Thr Asp Glu Val
            180                 185                 190

Gly Asp Ile His Trp Leu Pro Gln Ala Ser Gly Tyr Thr Arg Thr Trp
            195                 200                 205

Asp Arg Asp Met Phe Gln Gln Ala Ile Glu Arg Leu Leu Ser Trp Glu
            210                 215                 220

Ser Trp Asn Arg Arg Val Arg Glu Arg Ala Gln Phe Glu Lys Lys
225                 230                 235                 240

Thr His Asp Phe Ala Ser Arg Phe Ser Glu Ser Asp Val Gln Trp Met
                    245                 250                 255

Asn Lys Leu Arg Glu Tyr Glu Ala Gln Gln Glu Lys Ser Leu Glu Glu
            260                 265                 270

Asn Ala Phe Ala Pro Asn Glu Pro Tyr Ala Leu Thr Lys Lys Ala Leu
            275                 280                 285

Arg Gly Trp Glu Arg Val Tyr His Ser Trp Met Arg Leu Asp Ser Ala
            290                 295                 300

Ala Ser Glu Glu Ala Tyr Trp Gln Glu Val Ala Thr Cys Gln Thr Ala
305                 310                 315                 320

Met Arg Gly Glu Phe Gly Asp Pro Ala Ile Tyr Gln Phe Leu Ala Gln
                    325                 330                 335

Lys Glu Asn His Asp Ile Trp Arg Gly Tyr Pro Glu Arg Val Ile Asp
            340                 345                 350

Phe Ala Glu Leu Asn His Leu Gln Arg Glu Leu Arg Arg Ala Lys Glu
            355                 360                 365

Asp Ala Thr Phe Thr Leu Pro Asp Ser Val Asp His Pro Leu Trp Val
            370                 375                 380

Arg Tyr Glu Ala Pro Gly Gly Thr Asn Ile His Gly Tyr Asp Leu Val
385                 390                 395                 400

Gln Asp Thr Lys Arg Asn Leu Thr Leu Ile Leu Asp Lys Phe Ile Leu
                    405                 410                 415

Pro Asp Glu Asn Gly Ser Trp His Glu Val Lys Lys Val Pro Phe Ser
            420                 425                 430

Leu Ala Lys Ser Lys Gln Phe His Arg Gln Val Trp Leu Gln Glu Glu
            435                 440                 445

Gln Lys Gln Lys Lys Arg Glu Val Val Phe Tyr Asp Tyr Ser Thr Asn
            450                 455                 460

Leu Pro His Leu Gly Thr Leu Ala Gly Ala Lys Leu Gln Trp Asp Arg
465                 470                 475                 480

Asn Phe Leu Asn Lys Arg Thr Gln Gln Gln Ile Glu Glu Thr Gly Glu
                    485                 490                 495

Ile Gly Lys Val Phe Phe Asn Ile Ser Val Asp Val Arg Pro Ala Val
            500                 505                 510

Glu Val Lys Asn Gly Arg Leu Gln Asn Gly Leu Gly Lys Ala Leu Thr
            515                 520                 525

Val Leu Thr His Pro Asp Gly Thr Lys Ile Val Thr Gly Trp Lys Ala
            530                 535                 540

Glu Gln Leu Glu Lys Trp Val Gly Glu Ser Gly Arg Val Ser Ser Leu
545                 550                 555                 560

Gly Leu Asp Ser Leu Ser Glu Gly Leu Arg Val Met Ser Ile Asp Leu
                    565                 570                 575

Gly Gln Arg Thr Ser Ala Thr Val Ser Val Phe Glu Ile Thr Lys Glu
            580                 585                 590
```

```
Ala Pro Asp Asn Pro Tyr Lys Phe Phe Tyr Gln Leu Glu Gly Thr Glu
        595                 600                 605

Leu Phe Ala Val His Gln Arg Ser Phe Leu Leu Ala Leu Pro Gly Glu
610                 615                 620

Asn Pro Pro Gln Lys Ile Lys Gln Met Arg Glu Ile Arg Trp Lys Glu
625                 630                 635                 640

Arg Asn Arg Ile Lys Gln Gln Val Asp Gln Leu Ser Ala Ile Leu Arg
                645                 650                 655

Leu His Lys Lys Val Asn Glu Asp Glu Arg Ile Gln Ala Ile Asp Lys
                660                 665                 670

Leu Leu Gln Lys Val Ala Ser Trp Gln Leu Asn Glu Glu Ile Ala Thr
                675                 680                 685

Ala Trp Asn Gln Ala Leu Ser Gln Leu Tyr Ser Lys Ala Lys Glu Asn
                690                 695                 700

Asp Leu Gln Trp Asn Gln Ala Ile Lys Asn Ala His His Gln Leu Glu
705                 710                 715                 720

Pro Val Val Gly Lys Gln Ile Ser Leu Trp Arg Lys Asp Leu Ser Thr
                725                 730                 735

Gly Arg Gln Gly Ile Ala Gly Leu Ser Leu Trp Ser Ile Glu Glu Leu
                740                 745                 750

Glu Ala Thr Lys Lys Leu Leu Thr Arg Trp Ser Lys Arg Ser Arg Glu
                755                 760                 765

Pro Gly Val Val Lys Arg Ile Glu Arg Phe Glu Thr Phe Ala Lys Gln
                770                 775                 780

Ile Gln His His Ile Asn Gln Val Lys Glu Asn Arg Leu Lys Gln Leu
785                 790                 795                 800

Ala Asn Leu Ile Val Met Thr Ala Leu Gly Tyr Lys Tyr Asp Gln Glu
                805                 810                 815

Gln Lys Lys Trp Ile Glu Val Tyr Pro Ala Cys Gln Val Val Leu Phe
                820                 825                 830

Glu Asn Leu Arg Ser Tyr Arg Phe Ser Tyr Glu Arg Ser Arg Arg Glu
                835                 840                 845

Asn Lys Lys Leu Met Glu Trp Ser His Arg Ser Ile Pro Lys Leu Val
                850                 855                 860

Gln Met Gln Gly Glu Leu Phe Gly Leu Gln Val Ala Asp Val Tyr Ala
865                 870                 875                 880

Ala Tyr Ser Ser Arg Tyr His Gly Arg Thr Gly Ala Pro Gly Ile Arg
                885                 890                 895

Cys His Ala Leu Thr Glu Ala Asp Leu Arg Asn Glu Thr Asn Ile Ile
                900                 905                 910

His Glu Leu Ile Glu Ala Gly Phe Ile Lys Glu Glu His Arg Pro Tyr
                915                 920                 925

Leu Gln Gln Gly Asp Leu Val Pro Trp Ser Gly Gly Glu Leu Phe Ala
                930                 935                 940

Thr Leu Gln Lys Pro Tyr Asp Asn Pro Arg Ile Leu Thr Leu His Ala
945                 950                 955                 960

Asp Ile Asn Ala Ala Gln Asn Ile Gln Lys Arg Phe Trp His Pro Ser
                965                 970                 975

Met Trp Phe Arg Val Asn Cys Glu Ser Val Met Glu Gly Glu Ile Val
                980                 985                 990

Thr Tyr Val Pro Lys Asn Lys Thr  Val His Lys Lys Gln  Gly Lys Thr
                995                 1000                1005
```

```
Phe Arg Phe Val Lys Val Glu Gly Ser Asp Val Tyr Glu Trp Ala
    1010                1015                1020

Lys Trp Ser Lys Asn Arg Asn Lys Asn Thr Phe Ser Ser Ile Thr
    1025                1030                1035

Glu Arg Lys Pro Pro Ser Ser Met Ile Leu Phe Arg Asp Pro Ser
    1040                1045                1050

Gly Thr Phe Phe Lys Glu Gln Glu Trp Val Glu Gln Lys Thr Phe
    1055                1060                1065

Trp Gly Lys Val Gln Ser Met Ile Gln Ala Tyr Met Lys Lys Thr
    1070                1075                1080

Ile Val Gln Arg Met Glu Glu
    1085                1090
```

<210> SEQ ID NO 9
<211> LENGTH: 1119
<212> TYPE: PRT
<213> ORGANISM: Spirochaetes

<400> SEQUENCE: 9

```
Met Ser Phe Thr Ile Ser Tyr Pro Phe Lys Leu Ile Ile Lys Asn Lys
1               5                   10                  15

Asp Glu Ala Lys Ala Leu Leu Asp Thr His Gln Tyr Met Asn Glu Gly
                20                  25                  30

Val Lys Tyr Tyr Leu Glu Lys Leu Leu Met Phe Arg Gln Glu Lys Ile
                35                  40                  45

Phe Ile Gly Glu Asp Glu Thr Gly Lys Arg Ile Tyr Ile Glu Glu Thr
            50                  55                  60

Glu Tyr Lys Lys Gln Ile Glu Glu Phe Tyr Leu Ile Lys Lys Thr Glu
65                  70                  75                  80

Leu Gly Arg Asn Leu Thr Leu Thr Leu Asp Gly Phe Lys Thr Leu Met
                85                  90                  95

Arg Glu Leu Tyr Ile Cys Leu Val Ser Ser Ser Met Glu Asn Lys Lys
                100                 105                 110

Gly Phe Pro Asn Ala Gln Gln Ala Ser Leu Asn Ile Phe Ser Pro Leu
            115                 120                 125

Phe Asp Ala Glu Ser Lys Gly Tyr Ile Leu Lys Glu Glu Asn Asn Asn
    130                 135                 140

Ile Ser Leu Ile His Lys Asp Tyr Gly Lys Ile Leu Leu Lys Arg Leu
145                 150                 155                 160

Arg Asp Asn Asn Leu Ile Pro Ile Phe Thr Lys Phe Thr Asp Ile Lys
                165                 170                 175

Lys Ile Thr Ala Lys Leu Ser Pro Thr Ala Leu Asp Arg Met Ile Phe
                180                 185                 190

Ala Gln Ala Ile Glu Lys Leu Leu Ser Tyr Glu Ser Trp Cys Lys Leu
            195                 200                 205

Met Ile Lys Glu Arg Phe Asp Lys Glu Val Lys Ile Lys Glu Leu Glu
    210                 215                 220

Asn Lys Cys Glu Asn Lys Gln Glu Arg Asp Lys Ile Phe Glu Ile Leu
225                 230                 235                 240

Glu Lys Tyr Glu Glu Arg Gln Lys Thr Phe Glu Gln Asp Ser Gly
                245                 250                 255

Phe Ala Lys Lys Gly Phe Tyr Ile Thr Gly Arg Met Leu Lys Gly
                260                 265                 270

Phe Asp Glu Ile Lys Glu Lys Trp Leu Lys Glu Lys Asp Arg Ser Glu
            275                 280                 285
```

```
Gln Asn Leu Ile Asn Ile Leu Asn Lys Tyr Gln Thr Asp Asn Ser Lys
    290                 295                 300

Leu Val Gly Asp Arg Asn Leu Phe Glu Phe Ile Ile Lys Leu Glu Asn
305                 310                 315                 320

Gln Cys Leu Trp Asn Gly Asp Ile Asp Tyr Leu Lys Ile Lys Arg Asp
                325                 330                 335

Ile Asn Lys Asn Gln Ile Trp Leu Asp Arg Pro Glu Met Pro Arg Phe
            340                 345                 350

Thr Met Pro Asp Phe Lys Lys His Pro Leu Trp Tyr Arg Tyr Glu Asp
        355                 360                 365

Pro Ser Asn Ser Asn Phe Arg Asn Tyr Lys Ile Glu Val Val Lys Asp
370                 375                 380

Glu Asn Tyr Ile Thr Ile Pro Leu Ile Thr Glu Arg Asn Asn Glu Tyr
385                 390                 395                 400

Phe Glu Glu Asn Tyr Thr Phe Asn Leu Ala Lys Leu Lys Lys Leu Ser
                405                 410                 415

Glu Asn Ile Thr Phe Ile Pro Lys Ser Lys Asn Lys Glu Phe Glu Phe
            420                 425                 430

Ile Asp Ser Asn Asp Glu Glu Asp Lys Lys Asp Gln Lys Lys Ser
        435                 440                 445

Lys Gln Tyr Ile Lys Tyr Cys Asp Thr Ala Lys Asn Thr Ser Tyr Gly
    450                 455                 460

Lys Ser Gly Gly Ile Arg Leu Tyr Phe Asn Arg Asn Glu Leu Glu Asn
465                 470                 475                 480

Tyr Lys Asp Gly Lys Lys Met Asp Ser Tyr Thr Val Phe Thr Leu Ser
                485                 490                 495

Ile Arg Asp Tyr Lys Ser Leu Phe Ala Lys Glu Lys Leu Gln Pro Gln
            500                 505                 510

Ile Phe Asn Thr Val Asp Asn Lys Ile Thr Ser Leu Lys Ile Gln Lys
        515                 520                 525

Lys Phe Gly Asn Glu Glu Gln Thr Asn Phe Leu Ser Tyr Phe Thr Gln
    530                 535                 540

Asn Gln Ile Thr Lys Lys Asp Trp Met Asp Glu Lys Thr Phe Gln Asn
545                 550                 555                 560

Val Lys Glu Leu Asn Glu Gly Ile Arg Val Leu Ser Val Asp Leu Gly
                565                 570                 575

Gln Arg Phe Phe Ala Ala Val Ser Cys Phe Glu Ile Met Ser Glu Ile
            580                 585                 590

Asp Asn Asn Lys Leu Phe Phe Asn Leu Asn Asp Gln Asn His Lys Ile
        595                 600                 605

Ile Arg Ile Asn Asp Lys Asn Tyr Tyr Ala Lys His Ile Tyr Ser Lys
    610                 615                 620

Thr Ile Lys Leu Ser Gly Glu Asp Asp Leu Tyr Lys Glu Arg Lys
625                 630                 635                 640

Ile Asn Lys Asn Tyr Lys Leu Ser Tyr Gln Glu Arg Lys Asn Lys Ile
                645                 650                 655

Gly Ile Phe Thr Arg Gln Ile Asn Lys Leu Asn Gln Leu Leu Lys Ile
            660                 665                 670

Ile Arg Asn Asp Glu Ile Asp Lys Glu Lys Phe Lys Glu Leu Ile Glu
        675                 680                 685

Thr Thr Lys Arg Tyr Val Lys Asn Thr Tyr Asn Asp Gly Ile Ile Asp
    690                 695                 700
```

-continued

```
Trp Asn Asn Val Asp Asn Lys Ile Leu Ser Tyr Glu Asn Lys Glu Asp
705                 710                 715                 720

Val Ile Asn Leu His Lys Glu Leu Asp Lys Lys Leu Glu Ile Asp Phe
            725                 730                 735

Lys Glu Phe Ile Arg Glu Cys Arg Lys Pro Ile Phe Arg Ser Gly Gly
            740                 745                 750

Leu Ser Met Gln Arg Ile Asp Phe Leu Glu Lys Leu Asn Lys Leu Lys
            755                 760                 765

Arg Lys Trp Val Ala Arg Thr Gln Lys Ser Ala Glu Ser Ile Val Leu
770                 775                 780

Thr Pro Lys Phe Gly Tyr Lys Leu Lys Glu His Ile Asn Glu Leu Lys
785                 790                 795                 800

Asp Asn Arg Val Lys Gln Gly Val Asn Tyr Ile Leu Met Thr Ala Leu
                805                 810                 815

Gly Tyr Ile Lys Asp Asn Glu Ile Lys Asn Asp Ser Lys Lys Lys Gln
                820                 825                 830

Lys Glu Asp Trp Val Lys Asn Arg Ala Cys Gln Ile Ile Leu Met
    835                 840                 845

Glu Lys Leu Thr Glu Tyr Thr Phe Ala Glu Asp Arg Pro Arg Glu Glu
850                 855                 860

Asn Ser Lys Leu Arg Met Trp Ser His Arg Gln Ile Phe Asn Phe Leu
865                 870                 875                 880

Gln Gln Lys Ala Ser Leu Trp Gly Ile Leu Val Gly Asp Val Phe Ala
                885                 890                 895

Pro Tyr Thr Ser Lys Cys Leu Ser Asp Asn Asn Ala Pro Gly Ile Arg
                900                 905                 910

Cys His Gln Val Thr Lys Lys Asp Leu Ile Asp Asn Ser Trp Phe Leu
                915                 920                 925

Lys Ile Val Val Lys Asp Asp Ala Phe Cys Asp Leu Ile Glu Ile Asn
930                 935                 940

Lys Glu Asn Val Lys Asn Lys Ser Ile Lys Ile Asn Asp Ile Leu Pro
945                 950                 955                 960

Leu Arg Gly Gly Glu Leu Phe Ala Ser Ile Lys Asp Gly Lys Leu His
                965                 970                 975

Ile Val Gln Ala Asp Ile Asn Ala Ser Arg Asn Ile Ala Lys Arg Phe
                980                 985                 990

Leu Ser Gln Ile Asn Pro Phe Arg Val Val Leu Lys Lys Asp Lys Asp
            995                 1000                1005

Glu Thr Phe His Leu Lys Asn Glu Pro Asn Tyr Leu Lys Asn Tyr
    1010                1015                1020

Tyr Ser Ile Leu Asn Phe Val Pro Thr Asn Glu Glu Leu Thr Phe
    1025                1030                1035

Phe Lys Val Glu Glu Asn Lys Asp Ile Lys Pro Thr Lys Arg Ile
    1040                1045                1050

Lys Met Asp Lys His Glu Lys Glu Ser Thr Asp Glu Gly Asp Asp
    1055                1060                1065

Tyr Ser Lys Asn Gln Ile Ala Leu Phe Arg Asp Asp Ser Gly Ile
    1070                1075                1080

Phe Phe Asp Lys Ser Leu Trp Val Asp Gly Lys Ile Phe Trp Ser
    1085                1090                1095

Val Val Lys Asn Lys Met Thr Lys Leu Leu Arg Glu Arg Asn Asn
    1100                1105                1110

Lys Lys Asn Gly Ser Lys
```

-continued

1115

<210> SEQ ID NO 10
<211> LENGTH: 1142
<212> TYPE: PRT
<213> ORGANISM: Tuberibacillus calidus

<400> SEQUENCE: 10

Met Asn Ile His Leu Lys Glu Leu Ile Arg Met Ala Thr Lys Ser Phe
1               5                   10                  15

Ile Leu Lys Met Lys Thr Lys Asn Asn Pro Gln Leu Arg Leu Ser Leu
            20                  25                  30

Trp Lys Thr His Glu Leu Phe Asn Phe Gly Val Ala Tyr Tyr Met Asp
        35                  40                  45

Leu Leu Ser Leu Phe Arg Gln Lys Asp Leu Tyr Met His Asn Asp Glu
    50                  55                  60

Asp Pro Asp His Pro Val Val Leu Lys Glu Glu Ile Gln Glu Arg
65                  70                  75                  80

Leu Trp Met Lys Val Arg Glu Thr Gln Gln Lys Asn Gly Phe His Gly
                85                  90                  95

Glu Val Ser Lys Asp Glu Val Leu Glu Thr Leu Arg Ala Leu Tyr Glu
            100                 105                 110

Glu Leu Val Pro Ser Ala Val Gly Lys Ser Gly Glu Ala Asn Gln Ile
        115                 120                 125

Ser Asn Lys Tyr Leu Tyr Pro Leu Thr Asp Pro Ala Ser Gln Ser Gly
    130                 135                 140

Lys Gly Thr Ala Asn Ser Gly Arg Lys Pro Arg Trp Lys Lys Leu Lys
145                 150                 155                 160

Glu Ala Gly Asp Pro Ser Trp Lys Asp Ala Tyr Glu Lys Trp Glu Lys
                165                 170                 175

Glu Arg Gln Glu Asp Pro Lys Leu Lys Ile Leu Ala Ala Leu Gln Ser
            180                 185                 190

Phe Gly Leu Ile Pro Leu Phe Arg Pro Phe Thr Glu Asn Asp His Lys
        195                 200                 205

Ala Val Ile Ser Val Lys Trp Met Pro Lys Ser Lys Asn Gln Ser Val
    210                 215                 220

Arg Lys Phe Asp Lys Asp Met Phe Asn Gln Ala Ile Glu Arg Phe Leu
225                 230                 235                 240

Ser Trp Glu Ser Trp Asn Glu Lys Val Ala Glu Asp Tyr Glu Lys Thr
                245                 250                 255

Val Ser Ile Tyr Glu Ser Leu Gln Lys Glu Leu Lys Gly Ile Ser Thr
            260                 265                 270

Lys Ala Phe Glu Ile Met Glu Arg Val Glu Lys Ala Tyr Glu Ala His
        275                 280                 285

Leu Arg Glu Ile Thr Phe Ser Asn Ser Thr Tyr Arg Ile Gly Asn Arg
    290                 295                 300

Ala Ile Arg Gly Trp Thr Glu Ile Val Lys Lys Trp Met Lys Leu Asp
305                 310                 315                 320

Pro Ser Ala Pro Gln Gly Asn Tyr Leu Asp Val Val Lys Asp Tyr Gln
                325                 330                 335

Arg Arg His Pro Arg Glu Ser Gly Asp Phe Lys Leu Phe Glu Leu Leu
            340                 345                 350

Ser Arg Pro Glu Asn Gln Ala Ala Trp Arg Glu Tyr Pro Glu Phe Leu
        355                 360                 365

-continued

```
Pro Leu Tyr Val Lys Tyr Arg His Ala Glu Gln Arg Met Lys Thr Ala
    370                 375                 380

Lys Lys Gln Ala Thr Phe Thr Leu Cys Asp Pro Ile Arg His Pro Leu
385                 390                 395                 400

Trp Val Arg Tyr Glu Glu Arg Ser Gly Thr Asn Leu Asn Lys Tyr Arg
                405                 410                 415

Leu Ile Met Asn Glu Lys Glu Lys Val Val Gln Phe Asp Arg Leu Ile
            420                 425                 430

Cys Leu Asn Ala Asp Gly His Tyr Glu Glu Gln Asp Val Thr Val
        435                 440                 445

Pro Leu Ala Pro Ser Gln Gln Phe Asp Asp Gln Ile Lys Phe Ser Ser
450                 455                 460

Glu Asp Thr Gly Lys Gly Lys His Asn Phe Ser Tyr Tyr His Lys Gly
465                 470                 475                 480

Ile Asn Tyr Glu Leu Lys Gly Thr Leu Gly Gly Ala Arg Ile Gln Phe
                485                 490                 495

Asp Arg Glu His Leu Leu Arg Arg Gln Gly Val Lys Ala Gly Asn Val
            500                 505                 510

Gly Arg Ile Phe Leu Asn Val Thr Leu Asn Ile Glu Pro Met Gln Pro
        515                 520                 525

Phe Ser Arg Ser Gly Asn Leu Gln Thr Ser Val Gly Lys Ala Leu Lys
530                 535                 540

Val Tyr Val Asp Gly Tyr Pro Lys Val Val Asn Phe Lys Pro Lys Glu
545                 550                 555                 560

Leu Thr Glu His Ile Lys Glu Ser Glu Lys Asn Thr Leu Thr Leu Gly
                565                 570                 575

Val Glu Ser Leu Pro Thr Gly Leu Arg Val Met Ser Val Asp Leu Gly
            580                 585                 590

Gln Arg Gln Ala Ala Ala Ile Ser Ile Phe Glu Val Val Ser Glu Lys
        595                 600                 605

Pro Asp Asp Asn Lys Leu Phe Tyr Pro Val Lys Asp Thr Asp Leu Phe
610                 615                 620

Ala Val His Arg Thr Ser Phe Asn Ile Lys Leu Pro Gly Glu Lys Arg
625                 630                 635                 640

Thr Glu Arg Arg Met Leu Glu Gln Gln Lys Arg Asp Gln Ala Ile Arg
                645                 650                 655

Asp Leu Ser Arg Lys Leu Lys Phe Leu Lys Asn Val Leu Asn Met Gln
            660                 665                 670

Lys Leu Glu Lys Thr Asp Glu Arg Glu Lys Arg Val Asn Arg Trp Ile
        675                 680                 685

Lys Asp Arg Glu Arg Glu Glu Asn Pro Val Tyr Val Gln Glu Phe
690                 695                 700

Glu Met Ile Ser Lys Val Leu Tyr Ser Pro His Ser Val Trp Val Asp
705                 710                 715                 720

Gln Leu Lys Ser Ile His Arg Lys Leu Glu Gln Leu Gly Lys Glu
                725                 730                 735

Ile Ser Lys Trp Arg Gln Ser Ile Ser Gln Gly Arg Gln Gly Val Tyr
            740                 745                 750

Gly Ile Ser Leu Lys Asn Ile Glu Asp Ile Glu Lys Thr Arg Arg Leu
        755                 760                 765

Leu Phe Arg Trp Ser Met Arg Pro Glu Asn Pro Gly Glu Val Lys Gln
770                 775                 780

Leu Gln Pro Gly Glu Arg Phe Ala Ile Asp Gln Gln Asn His Leu Asn
```

```
                    785                 790                795                 800
His Leu Lys Asp Asp Arg Ile Lys Lys Leu Ala Asn Gln Ile Val Met
                805                 810                815

Thr Ala Leu Gly Tyr Arg Tyr Asp Gly Lys Arg Lys Lys Trp Ile Ala
                820                 825                830

Lys His Pro Ala Cys Gln Leu Val Leu Phe Glu Asp Leu Ser Arg Tyr
                835                 840                845

Ala Phe Tyr Asp Glu Arg Ser Arg Leu Glu Asn Arg Asn Leu Met Arg
                850                 855                860

Trp Ser Arg Arg Glu Ile Pro Lys Gln Val Ala Gln Ile Gly Gly Leu
865                 870                 875                880

Tyr Gly Leu Leu Val Gly Val Gly Ala Gln Tyr Ser Ser Arg Phe
                885                 890                895

His Ala Lys Ser Gly Ala Pro Gly Ile Arg Cys Arg Val Val Lys Glu
                900                 905                910

His Glu Leu Tyr Ile Thr Glu Gly Gly Gln Lys Val Arg Asn Gln Lys
                915                 920                925

Phe Leu Asp Ser Leu Val Glu Asn Asn Ile Ile Glu Pro Asp Asp Ala
                930                 935                940

Arg Arg Leu Glu Pro Gly Asp Leu Ile Arg Asp Gln Gly Gly Asp Lys
945                 950                 955                960

Phe Ala Thr Leu Asp Glu Arg Gly Glu Leu Val Ile Thr His Ala Asp
                965                 970                975

Ile Asn Ala Ala Gln Asn Leu Gln Lys Arg Phe Trp Thr Arg Thr His
                980                 985                990

Gly Leu Tyr Arg Ile Arg Cys Glu Ser Arg Glu Ile Lys Asp Ala Val
                995                 1000               1005

Val Leu Val Pro Ser Asp Lys Asp Gln Lys Glu Lys Met Glu Asn
                1010                1015               1020

Leu Phe Gly Ile Gly Tyr Leu Gln Pro Phe Lys Gln Glu Asn Asp
                1025                1030               1035

Val Tyr Lys Trp Val Lys Gly Glu Lys Ile Lys Gly Lys Lys Thr
                1040                1045               1050

Ser Ser Gln Ser Asp Asp Lys Glu Leu Val Ser Glu Ile Leu Gln
                1055                1060               1065

Glu Ala Ser Val Met Ala Asp Glu Leu Lys Gly Asn Arg Lys Thr
                1070                1075               1080

Leu Phe Arg Asp Pro Ser Gly Tyr Val Phe Pro Lys Asp Arg Trp
                1085                1090               1095

Tyr Thr Gly Gly Arg Tyr Phe Gly Thr Leu Glu His Leu Leu Lys
                1100                1105               1110

Arg Lys Leu Ala Glu Arg Arg Leu Phe Asp Gly Gly Ser Ser Arg
                1115                1120               1125

Arg Gly Leu Phe Asn Gly Thr Asp Ser Asn Thr Asn Val Glu
                1130                1135               1140

<210> SEQ ID NO 11
<211> LENGTH: 137
<212> TYPE: DNA
<213> ORGANISM: Artificial Sequence
<220> FEATURE:
<223> OTHER INFORMATION: optimized sgRNA scaffold

<400> SEQUENCE: 11
gtctaaagga cagaattttt caacgggtgt gccaatggcc actttccagg tggcaaagcc      60
```

<210> SEQ ID NO 12
<211> LENGTH: 141
<212> TYPE: DNA
<213> ORGANISM: Artificial Sequence
<220> FEATURE:
<223> OTHER INFORMATION: optimized sgRNA scaffold

<400> SEQUENCE: 12

```
aactgtctaa aggacagaat ttttcaacgg gtgtgccaat ggccactttc caggtggcaa      60
agcccgttga acttctcaaa agaacgctcg ctcagtgttc tgacgtcgg atcactgagc      120
gagcgatctg agaagtggca c                                               141
```

<210> SEQ ID NO 13
<211> LENGTH: 139
<212> TYPE: DNA
<213> ORGANISM: Artificial Sequence
<220> FEATURE:
<223> OTHER INFORMATION: optimized sgRNA scaffold

<400> SEQUENCE: 13

```
ctgtctaaag gacagaattt ttcaacgggt gtgccaatgg ccactttcca ggtggcaaag      60
cccgttgaac ttctcaaaaa gaacgctcgc tcagtgttct gacgtcggat cactgagcga    120
gcgatctgag aagtggcac                                                  139
```

<210> SEQ ID NO 14
<211> LENGTH: 127
<212> TYPE: DNA
<213> ORGANISM: Artificial Sequence
<220> FEATURE:
<223> OTHER INFORMATION: optimized sgRNA scaffold

<400> SEQUENCE: 14

```
gtctaaagga cagaattttt caacgggtgt gccaatggcc actttccagg tggcaaagcc      60
cgttgaactt ctcaaaaaga cgctcgctc agtgttatca ctgagcgagc gatctgagaa    120
gtggcac                                                               127
```

<210> SEQ ID NO 15
<211> LENGTH: 99
<212> TYPE: DNA
<213> ORGANISM: Artificial Sequence
<220> FEATURE:
<223> OTHER INFORMATION: optimized sgRNA scaffold

<400> SEQUENCE: 15

```
gtctaaagga cagaattttt caacgggtgt gccaatggcc actttccagg tggcaaagcc      60
cgttgaactt ctcaaaaaga cgatctgag aagtggcac                             99
```

<210> SEQ ID NO 16
<211> LENGTH: 93
<212> TYPE: DNA
<213> ORGANISM: Artificial Sequence
<220> FEATURE:
<223> OTHER INFORMATION: optimized sgRNA scaffold

<400> SEQUENCE: 16

```
gtctaaagga cagaattttt caacgggtgt gccaatggcc actttccagg tggcaaagcc      60
```

```
cgttgaactt ctcaaaaagc tgagaagtgg cac                              93

<210> SEQ ID NO 17
<211> LENGTH: 91
<212> TYPE: DNA
<213> ORGANISM: Artificial Sequence
<220> FEATURE:
<223> OTHER INFORMATION: optimized sgRNA scaffold

<400> SEQUENCE: 17
gtctaaagga cagaattttt caacgggtgt gccaatggcc actttccagg tggcaaagcc    60
cgttgaactt ctcaaagctg agaagtggca c                                  91

<210> SEQ ID NO 18
<211> LENGTH: 91
<212> TYPE: DNA
<213> ORGANISM: Artificial Sequence
<220> FEATURE:
<223> OTHER INFORMATION: optimized sgRNA scaffold

<400> SEQUENCE: 18
gtctaaagga cagaattttt caacgggtgt gccaatggcc actttccagg tggcaaagcc    60
cgttgaactt ctcaaaactg agaagtggca c                                  91

<210> SEQ ID NO 19
<211> LENGTH: 89
<212> TYPE: DNA
<213> ORGANISM: Artificial Sequence
<220> FEATURE:
<223> OTHER INFORMATION: optimized sgRNA scaffold

<400> SEQUENCE: 19
gtctaaagga cagaattttt caacgggtgt gccaatggcc actttccagg tggcaaagcc    60
cgttgaactt ctcaagcgag aagtggcac                                     89

<210> SEQ ID NO 20
<211> LENGTH: 87
<212> TYPE: DNA
<213> ORGANISM: Artificial Sequence
<220> FEATURE:
<223> OTHER INFORMATION: optimized sgRNA scaffold

<400> SEQUENCE: 20
gtctaaagga cagaattttt caacgggtgt gccaatggcc actttccagg tggcaaagcc    60
cgttgaactt ctaagcagaa gtggcac                                       87

<210> SEQ ID NO 21
<211> LENGTH: 85
<212> TYPE: DNA
<213> ORGANISM: Artificial Sequence
<220> FEATURE:
<223> OTHER INFORMATION: optimized sgRNA scaffold

<400> SEQUENCE: 21
gtctaaagga cagaattttt caacgggtgt gccaatggcc actttccagg tggcaaagcc    60
cgttgaactt caagcgaagt ggcac                                         85

<210> SEQ ID NO 22
<211> LENGTH: 137
<212> TYPE: DNA
<213> ORGANISM: Artificial Sequence
<220> FEATURE:
<223> OTHER INFORMATION: AasgRNA_ scaffold
```

<400> SEQUENCE: 22
gtctaaagga cagaattttt caacgggtgt gccaatggcc actttccagg tggcaaagcc        60
cgttgaactt ctcaaaaaga acgctcgctc agtgttctga cgtcggatca ctgagcgagc       120
gatctgagaa gtggcac                                                      137

<210> SEQ ID NO 23
<211> LENGTH: 137
<212> TYPE: DNA
<213> ORGANISM: Artificial Sequence
<220> FEATURE:
<223> OTHER INFORMATION: AksgRNA1_ scaffold

<400> SEQUENCE: 23
tcgtctatag gacggcgagg acaacgggaa gtgccaatgt gctctttcca agagcaaaca        60
ccccgttggc ttcaagatga ccgctcgctc agcgatctga caacggatcg ctgagcgagc       120
ggtctgagaa gtggcac                                                      137

<210> SEQ ID NO 24
<211> LENGTH: 145
<212> TYPE: DNA
<213> ORGANISM: Artificial Sequence
<220> FEATURE:
<223> OTHER INFORMATION: AmsgRNA1_ scaffold

<400> SEQUENCE: 24
ggaattgccg atctatagga cggcagattc aacgggatgt gccaatgcac tctttccagg        60
agtgaacacc ccgttggctt caacatgatc gcccgctcaa cggtccgatg tcggatcgtt       120
gagcgggcga tctgagaagt ggcac                                             145

<210> SEQ ID NO 25
<211> LENGTH: 141
<212> TYPE: DNA
<213> ORGANISM: Artificial Sequence
<220> FEATURE:
<223> OTHER INFORMATION: BhsgRNA_ scaffold

<400> SEQUENCE: 25
gaggttctgt cttttggtca ggacaaccgt ctagctataa gtgctgcagg gtgtgagaaa        60
ctcctattgc tggacgatgt ctcttttatt tcttttttct tggatgtcca agaaaaaga        120 aatgatacga ggcattagca c                                                 141

<210> SEQ ID NO 26
<211> LENGTH: 132
<212> TYPE: DNA
<213> ORGANISM: Artificial Sequence
<220> FEATURE:
<223> OTHER INFORMATION: BssgRNA_ scaffold

<400> SEQUENCE: 26
ccataagtcg acttacatat ccgtgcgtgt gcattatggg cccatccaca ggtctattcc        60
cacggataat cacgactttc cactaagctt tcgaatgttc gaaagcttag tggaaagctt       120
cgtggttagc ac                                                           132

<210> SEQ ID NO 27
<211> LENGTH: 130
<212> TYPE: DNA
<213> ORGANISM: Artificial Sequence
<220> FEATURE:

<223> OTHER INFORMATION: Bs3sgRNA_ scaffold

<400> SEQUENCE: 27
ggtgacctat agggtcaatg aatctgtgcg tgtgccataa gtaattaaaa attacccacc    60
acaggattat cttatttctg ctaagtgttt agttgcctga atacttagca gaaataatga   120
tgattggcac                                                          130

<210> SEQ ID NO 28
<211> LENGTH: 118
<212> TYPE: DNA
<213> ORGANISM: Artificial Sequence
<220> FEATURE:
<223> OTHER INFORMATION: LssgRNA_ scaffold

<400> SEQUENCE: 28
ggcaaagaat actgtgcgtg tgctaaggat ggaaaaaatc cattcaacca caggattaca    60
ttatttatct aatcacttaa atctttaagt gattagatga attaaatgtg attagcac    118

<210> SEQ ID NO 29
<211> LENGTH: 126
<212> TYPE: DNA
<213> ORGANISM: Artificial Sequence
<220> FEATURE:
<223> OTHER INFORMATION: SbsgRNA_ scaffold

<400> SEQUENCE: 29
gtcttagggt atatcccaaa tttgtcttag tatgtgcatt gcttacagcg acaactaagg    60
tttgtttatc ttttttttac attgtaagat gttttacatt ataaaaagaa gataatctta   120
ttgcac                                                              126

<210> SEQ ID NO 30
<211> LENGTH: 86
<212> TYPE: DNA
<213> ORGANISM: Artificial Sequence
<220> FEATURE:
<223> OTHER INFORMATION: artsgRNA1 scaffold

<400> SEQUENCE: 30
ggtctaaagg acagaatttt tcaacgggtg tgccaatggc cactttccag gtggcaaagc    60
ccgttgaact tcaagcgaag tggcac                                        86

<210> SEQ ID NO 31
<211> LENGTH: 84
<212> TYPE: DNA
<213> ORGANISM: Artificial Sequence
<220> FEATURE:
<223> OTHER INFORMATION: artsgRNA2 scaffold

<400> SEQUENCE: 31
ggtctaaagg acagaagaca acgggaagtg ccaatgtgct ctttccaaga gcaaacaccc    60
cgttgacttc aagcgaagtg gcac                                          84

<210> SEQ ID NO 32
<211> LENGTH: 79
<212> TYPE: DNA
<213> ORGANISM: Artificial Sequence
<220> FEATURE:
<223> OTHER INFORMATION: artsgRNA3 scaffold

<400> SEQUENCE: 32
ggtctaaagg acagaaaatc tgtgcgtgtg ccataagtaa ttaaaaatta cccaccacag    60
acttcaagcg aagtggcac                                                    79

<210> SEQ ID NO 33
<211> LENGTH: 91
<212> TYPE: DNA
<213> ORGANISM: Artificial Sequence
<220> FEATURE:
<223> OTHER INFORMATION: artsgRNA4 scaffold

<400> SEQUENCE: 33
ggtcgtctat aggacggcga gttttcaac gggtgtgcca atggccactt tccaggtggc      60
aaagcccgtt gaacttcaag cgaagtggca c                                      91

<210> SEQ ID NO 34
<211> LENGTH: 89
<212> TYPE: DNA
<213> ORGANISM: Artificial Sequence
<220> FEATURE:
<223> OTHER INFORMATION: artsgRNA5 scaffold

<400> SEQUENCE: 34
ggtcgtctat aggacggcga ggacaacggg aagtgccaat gtgctctttc caagagcaaa      60
caccccgttg acttcaagcg aagtggcac                                         89

<210> SEQ ID NO 35
<211> LENGTH: 84
<212> TYPE: DNA
<213> ORGANISM: Artificial Sequence
<220> FEATURE:
<223> OTHER INFORMATION: artsgRNA6 scaffold

<400> SEQUENCE: 35
ggtcgtctat aggacggcga gaatctgtgc gtgtgccata agtaattaaa aattacccac      60
cacagacttc aagcgaagtg gcac                                              84

<210> SEQ ID NO 36
<211> LENGTH: 90
<212> TYPE: DNA
<213> ORGANISM: Artificial Sequence
<220> FEATURE:
<223> OTHER INFORMATION: artsgRNA7 scaffold

<400> SEQUENCE: 36
ggtgacctat agggtcaatg tttttcaacg ggtgtgccaa tggccacttt ccaggtggca      60
aagcccgttg aacttcaagc gaagtggcac                                        90

<210> SEQ ID NO 37
<211> LENGTH: 88
<212> TYPE: DNA
<213> ORGANISM: Artificial Sequence
<220> FEATURE:
<223> OTHER INFORMATION: artsgRNA8 scaffold

<400> SEQUENCE: 37
ggtgacctat agggtcaatg gacaacggga agtgccaatg tgctctttcc aagagcaaac      60
accccgttga cttcaagcga agtggcac                                          88

<210> SEQ ID NO 38
<211> LENGTH: 83
<212> TYPE: DNA
<213> ORGANISM: Artificial Sequence
<220> FEATURE:

<223> OTHER INFORMATION: artsgRNA9 scaffold

<400> SEQUENCE: 38
ggtgacctat agggtcaatg aatctgtgcg tgtgccataa gtaattaaaa attacccacc    60
acagacttca agcgaagtgg cac    83

<210> SEQ ID NO 39
<211> LENGTH: 85
<212> TYPE: DNA
<213> ORGANISM: Artificial Sequence
<220> FEATURE:
<223> OTHER INFORMATION: artsgRNA10 scaffold

<400> SEQUENCE: 39
ggtctaaagg acagaatttt tcaacgggtg tgccaatggc cactttccag gtggcaaagc    60
ccgttgagct tcaaagaagt ggcac    85

<210> SEQ ID NO 40
<211> LENGTH: 83
<212> TYPE: DNA
<213> ORGANISM: Artificial Sequence
<220> FEATURE:
<223> OTHER INFORMATION: artsgRNA11 scaffold

<400> SEQUENCE: 40
ggtctaaagg acagaagaca acgggaagtg ccaatgtgct ctttccaaga gcaaacaccc    60
cgttggcttc aaagaagtgg cac    83

<210> SEQ ID NO 41
<211> LENGTH: 78
<212> TYPE: DNA
<213> ORGANISM: Artificial Sequence
<220> FEATURE:
<223> OTHER INFORMATION: artsgRNA12 scaffold

<400> SEQUENCE: 41
ggtctaaagg acagaaaatc tgtgcgtgtg ccataagtaa ttaaaatta cccaccacag    60 gcttcaaaga agtggcac    78

<210> SEQ ID NO 42
<211> LENGTH: 90
<212> TYPE: DNA
<213> ORGANISM: Artificial Sequence
<220> FEATURE:
<223> OTHER INFORMATION: artsgRNA13 scaffold

<400> SEQUENCE: 42
ggtcgtctat aggacggcga gttttcaac gggtgtgcca atggccactt tccaggtggc    60
aaagcccgtt gagcttcaaa gaagtggcac    90

<210> SEQ ID NO 43
<211> LENGTH: 88
<212> TYPE: DNA
<213> ORGANISM: Artificial Sequence
<220> FEATURE:
<223> OTHER INFORMATION: artsgRNA14 scaffold

<400> SEQUENCE: 43
ggtcgtctat aggacggcga ggacaacggg aagtgccaat gtgctctttc aagagcaaa    60 caccccgttg gcttcaaaga agtggcac    88

```
<210> SEQ ID NO 44
<211> LENGTH: 83
<212> TYPE: DNA
<213> ORGANISM: Artificial Sequence
<220> FEATURE:
<223> OTHER INFORMATION: artsgRNA15 scaffold

<400> SEQUENCE: 44
ggtcgtctat aggacggcga gaatctgtgc gtgtgccata agtaattaaa aattacccac      60
cacaggcttc aaagaagtgg cac                                             83

<210> SEQ ID NO 45
<211> LENGTH: 89
<212> TYPE: DNA
<213> ORGANISM: Artificial Sequence
<220> FEATURE:
<223> OTHER INFORMATION: artsgRNA16 scaffold

<400> SEQUENCE: 45
ggtgacctat agggtcaatg tttttcaacg ggtgtgccaa tggccacttt ccaggtggca      60
aagcccgttg agcttcaaag aagtggcac                                       89

<210> SEQ ID NO 46
<211> LENGTH: 87
<212> TYPE: DNA
<213> ORGANISM: Artificial Sequence
<220> FEATURE:
<223> OTHER INFORMATION: artsgRNA17 scaffold

<400> SEQUENCE: 46
ggtgacctat agggtcaatg gacaacggga agtgccaatg tgctctttcc aagagcaaac      60
accccgttgg cttcaaagaa gtggcac                                         87

<210> SEQ ID NO 47
<211> LENGTH: 82
<212> TYPE: DNA
<213> ORGANISM: Artificial Sequence
<220> FEATURE:
<223> OTHER INFORMATION: artsgRNA18 scaffold

<400> SEQUENCE: 47
ggtgacctat agggtcaatg aatctgtgcg tgtgccataa gtaattaaaa attacccacc      60
acaggcttca agaagtggc ac                                               82

<210> SEQ ID NO 48
<211> LENGTH: 89
<212> TYPE: DNA
<213> ORGANISM: Artificial Sequence
<220> FEATURE:
<223> OTHER INFORMATION: artsgRNA19 scaffold

<400> SEQUENCE: 48
ggtctaaagg acagaatttt tcaacgggtg tgccaatggc cactttccag gtggcaaagc      60
ccgttgagat tatctatgat gattggcac                                       89

<210> SEQ ID NO 49
<211> LENGTH: 87
<212> TYPE: DNA
<213> ORGANISM: Artificial Sequence
<220> FEATURE:
<223> OTHER INFORMATION: artsgRNA20 scaffold

<400> SEQUENCE: 49
```

```
ggtctaaagg acagaagaca acgggaagtg ccaatgtgct ctttccaaga gcaaacaccc      60
cgttggatta tctatgatga ttggcac                                          87

<210> SEQ ID NO 50
<211> LENGTH: 82
<212> TYPE: DNA
<213> ORGANISM: Artificial Sequence
<220> FEATURE:
<223> OTHER INFORMATION: artsgRNA21 scaffold

<400> SEQUENCE: 50
ggtctaaagg acagaaaatc tgtgcgtgtg ccataagtaa ttaaaaatta cccaccacag      60
gattatctat gatgattggc ac                                               82

<210> SEQ ID NO 51
<211> LENGTH: 94
<212> TYPE: DNA
<213> ORGANISM: Artificial Sequence
<220> FEATURE:
<223> OTHER INFORMATION: artsgRNA22 scaffold

<400> SEQUENCE: 51
ggtcgtctat aggacggcga gttttcaac gggtgtgcca atggccactt tccaggtggc       60
aaagcccgtt gagattatct atgatgattg gcac                                  94

<210> SEQ ID NO 52
<211> LENGTH: 92
<212> TYPE: DNA
<213> ORGANISM: Artificial Sequence
<220> FEATURE:
<223> OTHER INFORMATION: artsgRNA23 scaffold

<400> SEQUENCE: 52
ggtcgtctat aggacggcga ggacaacggg aagtgccaat gtgctctttc caagagcaaa      60
caccccgttg gattatctat gatgattggc ac                                    92

<210> SEQ ID NO 53
<211> LENGTH: 87
<212> TYPE: DNA
<213> ORGANISM: Artificial Sequence
<220> FEATURE:
<223> OTHER INFORMATION: artsgRNA24 scaffold

<400> SEQUENCE: 53
ggtcgtctat aggacggcga gaatctgtgc gtgtgccata agtaattaaa aattacccac      60
cacaggatta tctatgatga ttggcac                                          87

<210> SEQ ID NO 54
<211> LENGTH: 93
<212> TYPE: DNA
<213> ORGANISM: Artificial Sequence
<220> FEATURE:
<223> OTHER INFORMATION: artsgRNA25 scaffold

<400> SEQUENCE: 54
ggtgacctat agggtcaatg tttttcaacg ggtgtgccaa tggccacttt ccaggtggca      60
aagcccgttg agattatcta tgatgattgg cac                                   93

<210> SEQ ID NO 55
<211> LENGTH: 91
<212> TYPE: DNA
<213> ORGANISM: Artificial Sequence
```

```
<220> FEATURE:
<223> OTHER INFORMATION: artsgRNA26 scaffold

<400> SEQUENCE: 55
ggtgacctat agggtcaatg acaacggga agtgccaatg tgctctttcc aagagcaaac     60
accccgttgg attatctatg atgattggca c                                  91

<210> SEQ ID NO 56
<211> LENGTH: 86
<212> TYPE: DNA
<213> ORGANISM: Artificial Sequence
<220> FEATURE:
<223> OTHER INFORMATION: artsgRNA27 scaffold

<400> SEQUENCE: 56
ggtgacctat agggtcaatg aatctgtgcg tgtgccataa gtaattaaaa attacccacc   60
acaggattat ctatgatgat tggcac                                        86

<210> SEQ ID NO 57
<211> LENGTH: 82
<212> TYPE: DNA
<213> ORGANISM: Artificial Sequence
<220> FEATURE:
<223> OTHER INFORMATION: artsgRNA28 scaffold

<400> SEQUENCE: 57
ggtctaaagg acagaacaac gggatgtgcc aatgcactct tccaggagt gaacaccccg    60 ttgacttcaa gcgaagtggc ac                                            82

<210> SEQ ID NO 58
<211> LENGTH: 87
<212> TYPE: DNA
<213> ORGANISM: Artificial Sequence
<220> FEATURE:
<223> OTHER INFORMATION: artsgRNA29 scaffold

<400> SEQUENCE: 58
ggtcgtctat aggacggcga gcaacgggat gtgccaatgc actctttcca ggagtgaaca  60
ccccgttgac ttcaagcgaa gtggcac                                       87

<210> SEQ ID NO 59
<211> LENGTH: 99
<212> TYPE: DNA
<213> ORGANISM: Artificial Sequence
<220> FEATURE:
<223> OTHER INFORMATION: artsgRNA30 scaffold

<400> SEQUENCE: 59
ggaattgccg atctatagga cggcagattt ttttcaacgg gtgtgccaat ggccactttc   60
caggtggcaa agcccgttga acttcaagcg aagtggcac                          99

<210> SEQ ID NO 60
<211> LENGTH: 97
<212> TYPE: DNA
<213> ORGANISM: Artificial Sequence
<220> FEATURE:
<223> OTHER INFORMATION: artsgRNA31 scaffold

<400> SEQUENCE: 60
ggaattgccg atctatagga cggcagattg acaacgggaa gtgccaatgt gctctttcca   60
agagcaaaca ccccgttgac ttcaagcgaa gtggcac                            97
```

<210> SEQ ID NO 61
<211> LENGTH: 95
<212> TYPE: DNA
<213> ORGANISM: Artificial Sequence
<220> FEATURE:
<223> OTHER INFORMATION: artsgRNA32 scaffold

<400> SEQUENCE: 61
ggaattgccg atctatagga cggcagattc aacgggatgt gccaatgcac tctttccagg      60
agtgaacacc ccgttgactt caagcgaagt ggcac                                 95

<210> SEQ ID NO 62
<211> LENGTH: 81
<212> TYPE: DNA
<213> ORGANISM: Artificial Sequence
<220> FEATURE:
<223> OTHER INFORMATION: artsgRNA33 scaffold

<400> SEQUENCE: 62
ggtctaaagg acagaacaac gggatgtgcc aatgcactct tccaggagt gaacaccccg       60 ttggcttcaa agaagtggca c                                                81

<210> SEQ ID NO 63
<211> LENGTH: 86
<212> TYPE: DNA
<213> ORGANISM: Artificial Sequence
<220> FEATURE:
<223> OTHER INFORMATION: artsgRNA34 scaffold

<400> SEQUENCE: 63
ggtcgtctat aggacggcga gcaacgggat gtgccaatgc actctttcca ggagtgaaca      60
ccccgttggc ttcaaagaag tggcac                                           86

<210> SEQ ID NO 64
<211> LENGTH: 98
<212> TYPE: DNA
<213> ORGANISM: Artificial Sequence
<220> FEATURE:
<223> OTHER INFORMATION: artsgRNA35 scaffold

<400> SEQUENCE: 64
ggaattgccg atctatagga cggcagattt ttttcaacgg gtgtgccaat ggccactttc      60
caggtggcaa agcccgttga gcttcaaaga agtggcac                              98

<210> SEQ ID NO 65
<211> LENGTH: 96
<212> TYPE: DNA
<213> ORGANISM: Artificial Sequence
<220> FEATURE:
<223> OTHER INFORMATION: artsgRNA36 scaffold

<400> SEQUENCE: 65
ggaattgccg atctatagga cggcagattg acaacgggaa gtgccaatgt gctctttcca      60
agagcaaaca ccccgttggc ttcaaagaag tggcac                                96

<210> SEQ ID NO 66
<211> LENGTH: 94
<212> TYPE: DNA
<213> ORGANISM: Artificial Sequence
<220> FEATURE:
<223> OTHER INFORMATION: artsgRNA37 scaffold

<400> SEQUENCE: 66

```
ggaattgccg atctatagga cggcagattc aacgggatgt gccaatgcac tctttccagg      60
agtgaacacc ccgttggctt caaagaagtg gcac                                  94
```

METHOD FOR DETECTING NUCLEIC ACID

CROSS REFERENCE TO RELATED APPLICATIONS

This is the U.S. National Stage of International Application No. PCT/CN2018/118457, filed Nov. 30, 2018, which in turn patent application claims the benefit of priority from China Patent Application No. 201811099146.0, filed on Sep. 20, 2018, the contents of each of which are incorporated herein by reference.

SEQUENCE

The Sequence Listing is submitted as an ASCII text file in the form of the file name "Updated-Sequence.txt" (~133,083 bytes), which was created on Jun. 23, 2025, and which is incorporated by reference herein.

TECHNICAL FIELD

The invention relates to the field of genetic engineering. In particular, the present invention relates to a novel nucleic acid detection method based on CRISPR system. More specifically, the present invention relates to a Cas12b-mediated DNA detection method and the related kits.

BACKGROUND

Rapid and portable detection of nucleic acids promises significant applications in clinical diagnostics and quarantine inspection. CRISPR nucleases Cas12a and Cas13 have been developed to rapid detect RNA and DNA with high sensitivity and specificity because of their ssDNA or ssRNA trans-cleavage activity. The CRISPR-Cas13-based RNA detection platform is called SHERLOCK, and the Cas12a-based DNA detection platform is called DETECTR.

The further development of nucleic acid detection platforms with higher sensitivity and higher specificity is of great significance in the field.

BRIEF DESCRIPTION OF THE INVENTION

The invention provides a Cas12b-based nucleic acid detection method, termed CDetection, which is able to detect DNA with higher specificity than Cas12a, and high sensitivity up to an attomolar magnitude. The invention also provides enhanced CDetection (eCDetection), which can distinguish two targets that differ by only a single nucleotide polymorphism. CRISPR-Cas12b-based CDetection technology will provide rapid and simple DNA detection method in a range of health and biotechnology applications.

BRIEF DESCRIPTION OF THE DRAWINGS

(FIG. 1A) Schematic illustrating Cas12b possesses the ability of canonical target recognition and cleavage of dsDNA, as well as non-canonical collateral cleavage of ssDNA. (FIG. 1B) M13mp18 ssDNA cleavage timecourses with purified AaCas12b, ArCas12a, HkCas12a, PrCas12a and SpCas9 coupled with an on-target guide RNA (OT-gRNA) complementary to M13 phage. (FIG. 1C) M13mp18 ssDNA cleavage timecourses with purified AaCas12b, ArCas12a, HkCas12a, PrCas12a and SpCas9 coupled with a non-target guide RNA (NT-gRNA) and complementary ssDNA activator with no sequence homology to M13 phage.

(FIGS. 2A-B) M13mp18 ssDNA substrate and pUC19 dsDNA cleavage timecourses with purified WT AaCas12b and RuvC catalytic mutants (R785A or D977A) coupled with on-target gRNA (OT-gRNA) or non-target gRNA (NT-gRNA) (FIG. 2A) or a NT-gRNA and complementary ssDNA activator with no sequence homology to M13 phage or pUC19 (FIG. 2B).

(FIG. 3A) Base preference of AaCas12b-mediated trans-cleavage of ssDNA reporters containing a homopolymer of A, T, G or C bases. AaCas12b is incubated with a sgRNA targeting a synthetic ssDNA target 1 or target 2. Error bars indicate standard errors of the mean (s.e.m.), n=3. RFU, Relative fluorescence unit. (FIG. 3B) A variety of buffers are tested for their effect on AaCas12b-mediated trans-cleavage activity. AaCas12b is incubated with a sgRNA targeting a synthetic ssDNA 1. Error bars indicate standard errors of the mean (s.e.m.), n=3. (FIG. 3C) Trans-cleavage activity analysis for AaCas12b using on-target-ssDNA (OT-ssDNA), non-target-ssDNA (NT-ssDNA), on-target-ssDNA (OT-dsDNA) and non-target-dsDNA (NT-dsDNA) as activator. AaCas12b is incubated with a sgRNA targeting a synthetic ssDNA 2. Error bars indicate s.e.m., n=3.

(FIG. 4A) Characterization of trans-cleavage activity of AaCas12b using ssDNA or dsDNA activator with indicated single mismatch. Error bars indicate standard errors of the mean (s.e.m.)., n=3. RFU, relative fluorescence units. PT, perfect target; mPAM, mutated PAM. (FIG. 4B) Characterization of trans-cleavage activity of AaCas12b using ssDNA or dsDNA activator with indicated continuous mismatches. Error bars indicate s.e.m., n=3. (FIG. 4C) Comparison of the specificity among AaCas12b, PrCas12a and LbCas12a in dsDNA distinguishability using synthetic HPV16 activator. Error bars indicate s.e.m., n=3. (FIG. 4D) Comparison of trans-cleavage activity and pre-amplification enhanced trans-cleavage activity (CDetection) for AaCas12b using dsDNA activator. AaCas12b is incubated with a sgRNA targeting a synthetic dsDNA 1. Error bars indicate s.e.m., n=3. RPA, recombinase polymerase amplification. (FIG. 4E) Maximum fluorescence signal obtained from AaCas12b-, PrCas12a- and LbCas12a-based DNA detection with RPA pre-amplification. Cas12 is incubated with a cognate gRNA targeting a synthetic HPV16 dsDNA mixed with background genome. Error bars indicate s.e.m., n=3. (FIG. 4F) Fluorescence timecourse kinetics obtained from AaCas12b- and LbCas12a-based DNA detection with RPA pre-amplification. Cas12 is incubated with a cognate guide RNA (gRNA) targeting a synthetic HPV16 dsDNA diluted in human plasma with a final concentration of $10^{-18}$ M. Error bars indicate s.e.m., n=3.

(FIG. 5A) Comparison of trans-cleavage activity for AaCas12b using ssDNA or dsDNA activator without pre-amplification. AaCas12b is incubated with a sgRNA targeting a synthetic ssDNA or dsDNA. Error bars indicate standard errors of the mean (s.e.m.), n=3. (FIG. 5B) Fluorescence timecourse kinetics showing AaCas12b-sgRNA detects the existence of CaMV DNA. (FIG. 5C) AaCas12b distinguishes two synthetic HPV sequences, which have six nucleotide polymorphisms. Error bars indicate s.e.m., n=3. (FIG. 5D) Comparison of the specificity among AaCas12b, PrCas12a and LbCas12a in dsDNA distinguishability using synthetic HPV18 activator. Error bars indicate s.e.m., n=3. (FIG. 5E) Comparison of trans-cleavage activity and pre-amplification enhanced trans-cleavage activity for AaCas12b using dsDNA activator. AaCas12b is incubated with a sgRNA targeting a synthetic ssDNA 2 or dsDNA 2. Error bars indicate s.e.m., n=3.

(FIG. 6A) CDetection achieves sub-attomolar (0.1 åM) sensitivity in detection of HPV16 and HPV18 dsDNAs mixed with background genome. Error bars indicate standard errors of the mean (s.e.m.), n=3. RFU, relative fluorescence units. (FIG. 6B) Fluorescence timecourse kinetics obtained from AaCas12b- and LbCas12a-based DNA detection with RPA pre-amplification. Cas12 is incubated with a cognate gRNA targeting a synthetic HPV18 dsDNA diluted in human plasma with a final concentration of $10^{-18}$ M. Error bars indicate s.e.m., n=3.

(FIG. 7A) Schematic showing the ABO blood genotyping detected by CDetection. Six common ABO alleles and three targeting sgRNAs are shown. Each sgRNA distinguishes an identical allele with detectable signal. If all three sgRNAs produce no signal, the allele is A101 or A201. (FIG. 7B) Fluorescence single obtained in ABO blood genotyping detection using CDetection. CDetection cannot distinguish two dsDNA activators differed by only one single-base polymorphism (on-B101 vs. off-B101, on-O01 vs. off-O01, on-O02/03 vs. off-O02/03). Error bars indicate standard errors of the mean (s.e.m.), n=3. RFU, relative fluorescence units. (FIG. 7C) Schematic showing the development of eCDetection by introducing tuned gRNA (tgRNA). CDetection using sgRNA cannot distinguish two dsDNA activators differed by a single mismatch, while eCDetection using tgRNA, which bears a mismatch within the spacer sequence, can achieve DNA detection with a single-base-resolution.

FIGS. 8A-8D: Broad applications for enhanced CDetection (eCDetection). (FIG. 8A) CDection combined with tgRNA achieve ABO blood genotyping detection with a single-nucleotide-resolution specificity. Error bars indicate standard errors of the mean (s.e.m.), n=3. RFU, relative fluorescence units; tgRNA, tuned guide RNA. (FIGS. 8B-8C) (Upper) Schematic showing the sequence variation within BRCA1 gene and targeting sgRNA and tgRNAs. (Lower) Maximum fluorescence signal showing the specificity of CDetection without RPA for human BRCA1 (FIG. 8b) 3232A>G and (FIG. 8C) 3537A>G mutation detection using sgRNA and tgRNA. Error bars indicate s.e.m., n=3. (FIG. 8D) Fluorescence time course kinetics showing the sensitivity and specificity of CDetection with RPA for human BRCA1 3232A>G mutation detection using tgRNA (3232-1). Wild-type BRCA1 or BRCA1 3232A>G dsDNAs are diluted in human plasma with a final concentration of $10^{-18}$ M. Error bars indicate s.e.m., n=3. The sequences are shown in SEQ ID NOs:93-100, respectively.

(FIG. 9A) (Upper) Schematic showing the sequence variation within TP53 gene and targeting sgRNA and tgRNAs. (Lower) Maximum fluorescence signal showing the sensitivity for human TP53 856G>A mutation detection using sgRNA and tgRNA. Error bars indicate standard errors of the mean (s.e.m.), n=3. RFU, relative fluorescence units; tgRNA, tuned guide RNA. (FIGS. 9B-C) (Upper) Schematic showing the sequence variation within BRCA1 gene and targeting sgRNA and tgRNAs. (Lower) Maximum fluorescence signal showing the sensitivity for human BRCA1 (FIG. 9b) 3232A>G and (FIG. 9C) 3537A>G mutation detection using sgRNA and tgRNAs. (FIG. 9D) Fluorescence timecourse kinetics showing the sensitivity and specificity of CDetection with RPA for human BRCA1 3232A>G mutation detection using tgRNA (3232-1). Wild-type BRCA1 or BRCA1 3232A>G dsDNAs are diluted in human plasma with a final concentration of $10^{-16}$ M. Error bars indicate s.e.m., n=3. The sequences are shown in SEQ ID NOs: 101-112, respectively.

FIGS. 11A-11B: Phylogenetic tree of non-redundant C2c1 orthologs and their loci chosen for genome-editing testing. (FIG. 11A) Neighbor Joining phylogenetic tree showing the evolutionary relationships of C2c1 orthologs tested in this study. (FIG. 11B) Maps of bacterial genomic loci corresponding to the 8 C2c1 proteins highlighted in (FIG. 11A). In silico co-folding of the crRNA DR and putative tracrRNA shows stable secondary structure. DR, direct repeat. The number of each bacterial genomic spacers is indicated above or below their CRISPR array. The sequences are shown in SEQ ID NOs: 22-29, respectively.

FIGS. 13A-13C: C2c1 orthologs mediated genome targeting in human 293T cells. (FIG. 13A) T7EI assay results indicating the genome targeting activity of the eight C2c1 proteins combined with their cognate sgRNAs in the human genome. Red triangles indicate the cleaved bands. (FIG. 13B) T7EI assay results indicating the simultaneous multiplex genome targeting mediated by Bs3C2c1 combined with its cognate sgRNAs (Bs3sgRNAs) in human 293T cells. (FIG. 13C) Sanger sequencing showing representative indels induced by Bs3C2c1 combined with Bs3sgRNAs. PAM and protospacer sequences are colored in red and blue, respectively. Indels and insertions are symbolled with purple dashes and green lowercases, respectively. The sequences in FIG. 13B are shown in SEQ ID NOs: 113-116, respectively. The sequences in FIG. 13C are shown in SEQ ID NOs: 117-137, respectively.

FIGS. 14A-14D: Orthogonal C2c1 proteins for RNA-guided genome editing. (FIG. 14A) Graphical overview of the 10 C2c1 orthologs tested in this study. Sizes (amino acids) are indicated. (FIG. 14B) T7EI assay results indicating the genome targeting activity of the eight C2c1 orthologs directed by their cognate sgRNAs in human 293T cells. Red triangles indicate the cleaved bands. (FIG. 14C-D) T7EI assay results indicating the genome targeting activity of the eight C2c1 orthologs directed by AasgRNA (FIG. 14C) and AksgRNA (FIG. 14D) in human 293T cells. Red triangles indicate the cleaved bands.

FIGS. 16A-16E: Interchangeability between C2c1 orthologs and their sgRNAs. T7EI assay results indicating the genome targeting activity of the eight C2c1 orthologs directed by AasgRNA (FIG. 16A), AksgRNA (FIG. 16B), AmsgRNA (FIG. 16C), Bs3sgRNA (FIG. 16D) and LssgRNA (FIG. 16E) in human 293T cells. Red triangles indicate the cleaved bands.

FIGS. 17A-17F: Artificial sgRNAs mediated multiplex genome targeting. (FIG. 17A) Maps pf bacterial genomic loci corresponding to DiC2c1 and TcC2c1. The two C2c1 loci have no CRISPR array. (FIGS. 17B-17C) T7EI assay results indicating the genome targeting activity of AaC2c1, DiC2c1 and TcC2c1 directed by AasgRNA (FIG. 17B) and AksgRNA (FIG. 17C) in the human 293T cells. Red triangles indicate the cleaved bands. (FIG. 17D) T7EI assay results indicating the simultaneous multiplex genome targeting mediated by TcC2c1 combined with AksgRNAs in human 293T cells. (FIG. 17E) Schematic illustrating the secondary structures of artificial sgRNA scaffold 13 (artsgRNA13). (FIG. 17F) T7EI assay results indicating the simultaneous multiplex genome targeting mediated by TcC2c1 combined with artsgRNA13s in human 293T cells. The sequences in FIG. 17D are shown in SEQ ID NOs:113 and 114, respectively. The sequence in FIG. 17E is shown in SEQ ID NO: 42.

(FIG. 19A) T7EI assay results indicating the simultaneous multiplex genome targeting mediated by TcC2c1 combined with AmsgRNAs in human 293T cells. (FIGS. 19B-Che) Sanger sequencing showing representative indels induced by TcC2c1 combined with AksgRNAs (FIG. 19B) and AmsgRNAs (FIG. 19C). PAM and protospacer sequences are colored in red and blue, respectively. Indels and insertions are symbolled with purple dashes and green lowercases, respectively. The sequences in FIG. 19A are shown in SEQ ID NOs:113 and 114, respectively. The sequences in FIG. 19B are shown in SEQ ID NOs: 138-159, respectively.

(FIG. 20A) Schematic illustrating the secondary structures of the 36 artificial sgRNA (artsgRNA) scaffolds (scaffold: 1-12 and 14-37). (FIG. 20B) T7EI assay results indicating the genome targeting activity of TcC2c1 directed by artsgRNAs in the human 293T cells. Red triangles indicate the cleaved bands. (FIG. 20C) T7EI assay results indicating the simultaneous multiplex genome targeting mediated by AaC2c1 combined with artsgRNA13s in human 293T cells. The sequences in FIG. 20A are shown in SEQ ID NOs:30-41 and 43-66, respectively. The sequences in FIG. 20B are shown in SEQ ID NOs:113-116, respectively.

DETAILED DESCRIPTION OF THE INVENTION

Figure 1A:
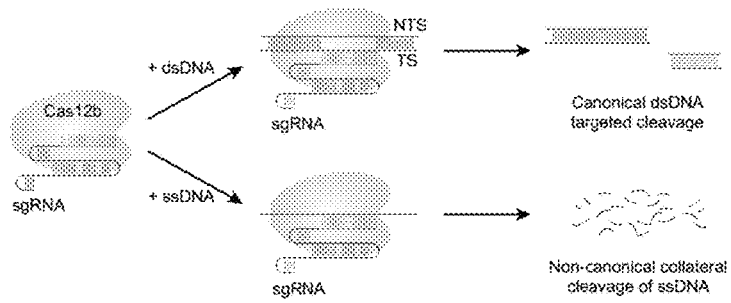
FIGS. 1A-1C: Non-specific single chain DNA (ssDNA) cleavage is activated by conserved target recognition of Cas12 proteins.

In the present invention, the scientific and technical terms used herein have the meaning as commonly understood by a person skilled in the art unless otherwise specified. Also, the protein and nucleic acid chemistry, molecular biology, cell and tissue culture, microbiology, immunology related terms, and laboratory procedures used herein are terms and routine steps that are widely used in the corresponding field. For example, standard recombinant DNA and molecular cloning techniques used in the present invention are well known to those skilled in the art and are more fully described in the following document: Sambrook, J., Fritsch, E. F. and Maniatis, T., Molecular Cloning: A Laboratory Manual; Cold Spring Harbor Laboratory Press: Cold Spring Harbor, 1989 (hereinafter referred to as "Sambrook"). In the meantime, in order to better understand the present invention, definitions and explanations of related terms are provided below.

In a first aspect, the invention provides a method of detecting the presence and/or amount of a target nucleic acid molecule in a biological sample, the method comprises the following steps:
(a) contacting the biological sample with i) a Cas12b protein, ii) a gRNA directed against a target sequence in the target nucleic acid molecule, and iii) a single-strand DNA reporter molecule which produces a detectable signal after being cleaved, thereby forming a reaction mixture;
(b) detecting the presence and/or level of the detectable signal produced in the reaction mixture,
wherein the presence and/or level of the detectable signal represents the presence and/or amount of the target nucleic acid molecule.

In some embodiments, the target nucleic acid molecule is a double-strand DNA molecule. In some embodiments, the target nucleic acid molecule is a single-strand DNA molecule. The target nucleic acid molecule may be genomic DNA, cDNA, viral DNA, or the like, or a fragment thereof.

"Cas12b", "Cas12b nuclease", "Cas12b protein", "C2c1", "C2c1 nuclease" and "C2c1 protein" are used interchangeably herein and refer to an RNA-directed sequence specific nuclease from a microbiological CRISPR system. Cas12b is capable of targeting and cleaving DNA target sequences under the guidance of a guide RNA to form a DNA double-strand break (DSB), also known as canonical dsDNA cleavage activity. More importantly, the complex of Cas12b and gRNA, after recognizing and binding to the corresponding target DNA sequence, is capable of activating its non-specific ssDNA cleavage activity, also known as non-canonical bypass ssDNA cleavage activity. Using non-canonical bypass ssDNA cleavage activity, cleavage of a single-stranded DNA reporter molecule that produces a detectable signal upon cleavage can reflect the presence and/or amount of target DNA. Herein, a DNA molecule that is recognized and bound by a complex of Cas12b and gRNA, which activates the non-specific single-strand DNA cleavage activity of Cas12b, is also referred to as an "activator."

In some embodiments, the Cas12b protein is AaCas12b derived from—*Alicyclobacillus acidiphilus*, AkCas12b derived from—*Alicyclobacillus kakegawensis*, AmCas12b derived from *Alicyclobacillus macrosporangiidus*, BhCas12b derived from *Bacillus hisashii*, BsCas12b derived from the genus *Bacillus*, Bs3Cas12b derived from the genus *Bacillus*, DiCas12b derived from *Desulfovibrio inopinatus*, LsCas12b derived from *Laceyella sediminis*, SbCas12b derived from *Spirochaetes bacterium*, or TcCas12b derived from *Tuberibacillus calidus*. In some preferred embodiments, the Cas12b protein is the Cas12b protein-derived from *Alicyclobacillus acidiphilus* (AaCas12b). Applicant has identified that these Cas12b proteins can be used for genome editing in mammals, as well as for nucleic acid detection methods of the invention.

For example, the Cas12b protein is the AaCas12b derived from *Alicyclobacillus acidiphilus* NBRC 100859, the AkCas12b derived from *Alicyclobacillus kakegawensis* NBRC 103104, the AmCas12b derived from *Alicyclobacillus macrosporangiidus* strain DSM 17980, the BhCas12b derived from *Bacillus hisashii* strain C4, and the BsCas12b derived from genus *Bacillus* NSP2.1, the Bs3Cas12b derived from *Bacillus* genus V3-13 contig_40, the DiCas12b derived from *Desulfovibrio inopinatus* DSM 10711, the LsCas12b derived from *Laceyella sediminis* strain RHA1, the SbCas12b derived from *Spirochaetes bacterium* GWB1_27_13, the TcCas12b derived from *Tuberibacillus callidus* DSM 17572. In some preferred embodiments, the Cas12b protein is a Cas12b protein derived from *Alicyclobacillus acidiphilus* NBRC 100859.

The Cas12b locus of *Alicyclobacillus acidiphilus* lacks a direct repeat (DR) array that has been sequenced, so those skilled in the art will recognize that it is unable to perform gene editing and will skip it in the CRISPR nuclease screen. However, the inventors have surprisingly found that the Cas12b protein from *Alicyclobacillus acidiphilus* also has canonical targeting dsDNA cleavage activity and non-canonical bypass ssDNA cleavage activity, which can be used for gene editing and nucleic acid detection. Similarly, some of the other Cas12b proteins identified, such as the DiCas12b or TcCas12b proteins, are unexpectedly useful in the present invention, although their natural locus does not have a CRISPR array.

In some embodiments of the invention, the Cas12b protein is a Cas12b protein whose natural locus does not have a CRISPR array. In some embodiments, the Cas12b protein whose natural locus does not have a CRISPR array is AaCas12b, DiCas12b or TcCas12b.

In some embodiments, the Cas12b protein comprises amino acid sequence having at least 80%, at least 85%, at least 90%, at least 95%, at least 96%, at least 97%, at least 98%, at least 99% sequence identity with any one of SEQ ID NOs: 1-10. In some embodiments, the Cas12b protein comprises an amino acid sequence in which one or more amino acid residues are substituted, deleted or added relative to any one of SEQ ID NOs: 1-10. For example, the Cas12b protein comprises amino acid sequences in which 1, 2, 3, 4, 5, 6, 7, 8, 9, 10 amino acid residue(s) are substituted, deleted or added relative to any one of SEQ ID NOs: 1-10. In some embodiments, the amino acid substitution is a conservative substitution. In some embodiments, the Cas12b protein comprises the amino acid sequence set forth in any one of SEQ ID NOs: 1-10. For example, the AaCas12b, AkCas12b, AmCas12b, BhCas12b, BsCas12b, Bs3Cas12b, DiCas12b, LsCas12b, SbCas12b, TcCas12b comprises the amino acid sequence set forth in any one of SEQ ID NOs: 1-10, respectively. In some preferred embodiments, the Cas12b protein comprises the amino acid sequence set forth in SEQ ID NO: 1.

The inventors have demonstrated that the RuvC domain of the Cas12b protein is critical for its non-canonical bypass ssDNA cleavage activity. In some embodiments, the Cas12b protein comprises a RuvC domain of a wild-type Cas12b protein, said wild-type Cas12b protein comprising, for example, the amino acid sequence set forth in any one of SEQ ID NOs: 1-10. One skilled in the art can readily identify the RuvC domain of the Cas12b protein, for example, by the tools provided by NCBI.

Sequence "identity" has recognized meaning in the art, and the percentage of sequence identity between two nucleic acids or polypeptide molecules or regions can be calculated using the disclosed techniques. Sequence identity can be measured along the entire length of a polynucleotide or polypeptide or along a region of the molecule. (See, for example, *Computational Molecular Biology*, Lesk, A. M., ed., Oxford University Press, New York, 1988; *Biocomputing: Informatics and Genome Projects*, Smith, D. W., ed., Academic Press, New York, 1993; *Computer Analysis of Sequence Data*, Part I, Griffin, A. M., and Griffin, H. G., eds., Humana Press, New Jersey, 1994; *Sequence Analysis in Molecular Biology*, von Heinje, G., Academic Press, 1987; and Sequence Analysis Primer, Gribskov, M. and Devereux, J., eds., M Stockton Press, New York, 1991). Although there are many methods for measuring the identity between two polynucleotides or polypeptides, the term "identity" is well known to the skilled person (Carrillo, H. & Lipman, D., *SIAM J Applied Math* 48:1073 (1988)).

Suitable conserved amino acid substitutions in peptides or proteins are known to those skilled in the art and can generally be carried out without altering the biological activity of the resulting molecule. In general, one skilled in the art recognizes that a single amino acid substitution in a non-essential region of a polypeptide does not substantially alter biological activity (See, for example, Watson et al., *Molecular Biology of the Gene*, 4th Edition, 1987, The Benjamin/Cummings Pub. co., p. 224).

In particular, one skilled in the art will appreciate that the Cas12b protein in different strains of the same bacterial species may have some differences in amino acid sequence but can achieve substantially the same function.

In some embodiments, the Cas12b protein is recombinantly produced. In some embodiments, the Cas12b protein further comprises a fusion tag, such as a tag for Cas12b protein isolation and/or purification. Methods for recombinant production of proteins are known in the art. A variety of labels, including but not limited to His tags, GST tags, and the like, are known in the art that can be used to isolate and/or purify proteins. Generally, these tags do not alter the activity of the protein of interest.

"guide RNA" and "gRNA" can be used interchangeably herein, typically composed of crRNA and tracrRNA molecules that are partially complementary to each other to form a complex, wherein the crRNA comprises a sequence that is sufficiently identical to the target sequence to hybridize to the complement of the target sequence and direct the CRISPR complex (CRISPR nuclease+crRNA+tracrRNA) to sequence specifically bind to the target sequence. However, single guide RNA (sgRNA) containing both crRNA and tracrRNA characteristics can be designed and used. Different CRISPR nucleases correspond to different gRNAs. For example, Cas9 and Cas12b typically require both crRNA and tracrRNA, however, Cas12a (Cpf1) requires only crRNA.

"gRNA against a target sequence of a target nucleic acid molecule" means that the gRNA is capable of specifically recognizing the target sequence. For example, in some embodiments (the target nucleic acid molecule is a double-strand DNA), the gRNA comprises a spacer capable of specifically hybridizing to the complementary sequence of the target sequence. In some embodiments (the target nucleic acid molecule is a single-strand DNA), the gRNA comprises a spacer sequence capable of specifically hybridizing to the target sequence.

There is no direct repeat (DR) array in the *A. acidiphilus* CRISPR locus. Therefore, AaCas12b does not have a corresponding crRNA. However, the inventors have found that AaCas12b can also adopt corresponding gRNAs derived from Cas12b proteins of other organisms. For example, AaCas12b can use its own tracrRNA and the crRNA sequence from the CRISPR locus of *A. acidoterrestris* as gRNA. The inventors optimized the gRNA available for AaCas12b.

In some embodiments of the methods of the invention, the guide RNA is a complex formed by a partial complement of crRNA and tracrRNA. In some embodiments, the tracrRNA is encoded by a nucleotide sequence selected from the group consisting of: 5'-GTCTAAAGGACAGAATTTTT-CAACGGGTGTGCCAATGGCCACTTTCCAGGTGGCAAAGCCCGTTGAACTTCT-CAAAAAGAACGCTCGCTCAGTGTTCTGAC-3' (SEQ ID NO:160). In some embodiments, the crRNA is encoded by a nucleotide sequence selected from the group consisting of: 5'-GTCGGATCACTGAGCGAGCGATCT-GAGAAGTGGCAC-N$_x$-3' (SEQ ID NO:161)., wherein Nx represents nucleotide sequence that consists of X consecutive nucleotides, N is independently selected from A, G, C and T; X is an integer of 18≤X≤35. Preferably, X=20. In some embodiments, Nx is spacer sequence capable of specifically hybridizing to the complement of the target sequence (target nucleic acid molecule is dsDNA). In some embodiments, Nx is spacer sequence capable of specifically hybridizing to the complement of the target sequence (target nucleic acid molecule is single-strand DNA).

In some embodiments of the invention, the guide RNA is a sgRNA. In some embodiments, the sgRNA comprises a 5'-end scaffold sequence and a 3'-end spacer sequence. The spacer sequence can specifically hybridize to the target sequence or the complement of the target sequence. The spacer sequence is typically 18 to 35 nucleotides in length, preferably 20 nucleotides.

In some particular embodiments, the sgRNA is encoded by a nucleotide sequence selected from the group consisting of:

```
                                            (SEQ ID NO: 11)
5'-GTCTAAAGGACAGAATTTTTCAACGGGTGTGCCAATGGC

CACTTTCCAGGTGGCAAAGCCCGTTGAACTTCTCAAAAAGAA

CGCTCGCTCAGTGTTCTGACGTCGGATCACTGAGCGAGCGAT

CTGAGAAGTGGCAC-N_X-3';

(SEQ ID NO: 12)
5'-AACTGTCTAAAGGACAGAATTTTTCAACGGGTGTGCCAA

TGGCCACTTTCCAGGTGGCAAAGCCCGTTGAACTTCTCAAAA

AGAACGCTCGCTCAGTGTTCTGACGTCGGATCACTGAGCGAG

CGATCTGAGAAGTGGCAC-N_X-3';

(SEQ ID NO: 13)
5'-CTGTCTAAAGGACAGAATTTTTCAACGGGTGTGCCAATG

GCCACTTTCCAGGTGGCAAAGCCCGTTGAACTTCTCAAAAAG

AACGCTCGCTCAGTGTTCTGACGTCGGATCACTGAGCGAGCG

ATCTGAGAAGTGGCAC-N_X-3';

(SEQ ID NO: 14)
5'-GTCTAAAGGACAGAATTTTTCAACGGGTGTGCCAATGGC

CACTTTCCAGGTGGCAAAGCCCGTTGAACTTCTCAAAAAGAA

CGCTCGCTCAGTGTTATCACTGAGCGAGCGATCTGAGAAGTG

GCAC-N_X-3';

(SEQ ID NO: 15)
5'-GTCTAAAGGACAGAATTTTTCAACGGGTGTGCCAATGGC

CACTTTCCAGGTGGCAAAGCCCGTTGAACTTCTCAAAAAGAA

CGATCTGAGAAGTGGCAC-N_X-3';

(SEQ ID NO: 16)
5'-GTCTAAAGGACAGAATTTTTCAACGGGTGTGCCAATGGC

CACTTTCCAGGTGGCAAAGCCCGTTGAACTTCTCAAAAAGCT

GAGAAGTGGCAC-N_X-3';

(SEQ ID NO: 17)
5'-GTCTAAAGGACAGAATTTTTCAACGGGTGTGCCAATGGC

CACTTTCCAGGTGGCAAAGCCCGTTGAACTTCTCAAAGCTGA

GAAGTGGCAC-N_X-3';

(SEQ ID NO: 18)
5'-GTCTAAAGGACAGAATTTTTCAACGGGTGTGCCAATGGC

CACTTTCCAGGTGGCAAAGCCCGTTGAACTTCTCAAAACTGA

GAAGTGGCAC-N_X-3';

(SEQ ID NO: 19)
5'-GTCTAAAGGACAGAATTTTTCAACGGGTGTGCCAATGGC

CACTTTCCAGGTGGCAAAGCCCGTTGAACTTCTCAAGCGAGA

AGTGGCAC-N_X-3';

(SEQ ID NO: 20)
5'-GTCTAAAGGACAGAATTTTTCAACGGGTGTGCCAATGGC

CACTTTCCAGGTGGCAAAGCCCGTTGAACTTCTAAGCAGAAG

TGGCAC-N_X-3';
and
                                            (SEQ ID NO: 21)
5'-GTCTAAAGGACAGAATTTTTCAACGGGTGTGCCAATGGC

CACTTTCCAGGTGGCAAAGCCCGTTGAACTTCAAGCGAAGTG

GCAC-N_X-3';
``` wherein Nx represents nucleotide sequence that consists of X consecutive nucleotides, N is independently selected from A, G, C and T; X is an integer of 18≤X≤35. Preferably, X=20. In some embodiments, Nx is spacer sequence capable of specifically hybridizing to the complement of the target sequence (target nucleic acid molecule is dsDNA). In some embodiments, Nx is spacer sequence capable of specifically hybridizing to the complement of the target sequence (target nucleic acid molecule is single-strand DNA). In some embodiments, the sgRNA comprises a scaffold sequence encoded by the nucleotide sequence of any one of SEQ ID NOs: 11-21.

In some particular embodiments, the sgRNA is encoded by a nucleotide sequence selected from the group consisting of:

```
5'-GTCTAAAGGACAGAATTTTTCAACGGGTGTGCCAATGGCCAC

TTTCCAGGTGGCAAAGCCCGTTGAACTTCTCAAAAAGAACGCTCG

CTCAGTGTTCTGACGTCGGATCACTGAGCGAGCGATCTGAGAAGT

GGCAC-N_X-3'
(AasgRNA; SEQ ID NO: 22);

5'-tcgtctataGGACGGCGAGGACAACGGGAAGTGCCAATGTGC

TCTTTCCAAGAGCAAACACCCCGTTGGCTTCAAGATGACCGCTCG

CTCAGCGATCTGACAACGGATCGCTGAGCGAGCGGTCTGAGAAGT
```

GGCAC-N$_X$-3'
(AksgRNA1 SEQ ID NO: 23);

5'-ggaattgccgatctaTAGGACGGCAGATTCAACGGGATGTGC
CAATGCACTCTTTCCAGGAGTGAACACCCCGTTGGCTTCAACATG
ATCGCCCGCTCAACGGTCCGATGTCGGATCGTTGAGCGGGCGATC
TGAGAAGTGGCAC-N$_X$-3'
(AmsgRNA1 SEQ ID NO: 24);

5'-GAGGTTCTGTCTTTTGGTCAGGACAACCGTCTAGCTATAAGT
GCTGCAGGGTGTGAGAAACTCCTATTGCTGGACGATGTCTCTTTT
ATTTCTTTTTTCTTGGATGTCCAAGAAAAAAGAAATGATACGAGG
CATTAGCAC-N$_X$-3'
(BhsgRNA SEQ ID NO: 25);

5'-CCATAAGTCGACTTACATATCCGTGCGTGTGCATTATGGGCC
CATCCACAGGTCTATTCCCACGGATAATCACGACTTTCCACTAAG
CTTTCGAATGTTCGAAAGCTTAGTGGAAAGCTTCGTGGTTAGCA
C-N$_X$-3'
(BssgRNA SEQ ID NO: 26);

5'-GGTGACCTATAGGGTCAATGAATCTGTGCGTGTGCCATAAGT
AATTAAAAATTACCCACCACAGGATTATCTTATTTCTGCTAAGTG
TTTAGTTGCCTGAATACTTAGCAGAAATAATGATGATTGGCA
C-N$_X$-3'
(Bs3sgRNA SEQ ID NO: 27);

5'-GGCAAAGAATACTGTGCGTGTGCTAAGGATGGAAAAAATCCA
TTCAACCACAGGATTACATTATTTATCTAATCACTTAAATCTTTA
AGTGATTAGATGAATTAAATGTGATTAGCAC-N$_X$-3'
(LssgRNA SEQ ID NO: 28);
or 5'-GTCTTAGGGTATATCCCAAATTTGTCTTAGTATGTGCATTGC
TTACAGCGACAACTAAGGTTTGTTTATCTTTTTTTTACATTGTAA
GATGTTTTACATTATAAAAGAAGATAATCTTATTGCAC-N$_X$-3'
(SbsgRNA SEQ ID NO: 29);

wherein Nx represents nucleotide sequence that consists of X consecutive nucleotides (spacer sequence), N is independently selected from A, G, C and T; X is an integer of 18≤X≤35. Preferably, X=20. In some embodiments, the sequence Nx (spacer sequence) is capable of specifically hybridizing to the complement of the target sequence. The sequence other than Nx in the sgRNA is a scaffold sequence of sgRNA. In some embodiments, the sgRNA comprises a scaffold sequence encoded by the nucleotide sequence of any one of SEQ ID NOs: 22-29.

The present inventors have surprisingly found that the Cas12b protein and the guide RNA in different Cas12b systems can be used interchangeably, thereby enabling the artificial design of universal guide RNAs.

Thus in some embodiments, the sgRNA is an artificial sgRNA selected from the group consisting of:

5'-GGTCTAAAGGACAGAATTTTTCAACGGGTGTGCCAATGGCCA
CTTTCCAGGTGGCAAAGCCCGTTGAACTTCAAGCGAAGTGGCAC-
N$_X$-3'
(artsgRNA1 SEQ ID NO: 30);

5'-GGTCTAAAGGACAGAAGACAACGGGAAGTGCCAATGTGCTCT
TTCCAAGAGCAAACACCCCGTTGACTTCAAGCGAAGTGGCA
C-N$_X$-3'
(artsgRNA2 SEQ ID NO: 31);

5'-GGTCTAAAGGACAGAAAATCTGTGCGTGTGCCATAAGTAAT
TAAAAATTACCCACCACAGACTTCAAGCGAAGTGGCAC-N$_X$-3'
(artsgRNA3 SEQ ID NO: 32);

5'-GGTCGTCTATAGGACGGCGAGTTTTTCAACGGGTGTGCCAA
TGGCCACTTTCCAGGTGGCAAAGCCCGTTGAACTTCAAGCGAAG
TGGCAC-N$_X$-3'
(artsgRNA4 SEQ ID NO: 33);

5'-GGTCGTCTATAGGACGGCGAGGACAACGGGAAGTGCCAATG
TGCTCTTTCCAAGAGCAAACACCCCGTTGACTTCAAGCGAAGTG
GCAC-N$_X$-3'
(artsgRNA5 SEQ ID NO: 34);

5'-GGTCGTCTATAGGACGGCGAGAATCTGTGCGTGTGCCATAA
GTAATTAAAAATTACCCACCACAGACTTCAAGCGAAGTGGCAC-
N$_X$-3'
(artsgRNA6 SEQ ID NO: 35);

5'-GGTGACCTATAGGGTCAATGTTTTCAACGGGTGTGCCAAT
GGCCACTTTCCAGGTGGCAAAGCCCGTTGAACTTCAAGCGAAGT
GGCAC-N$_X$-3'
(artsgRNA7 SEQ ID NO: 36);

5'-GGTGACCTATAGGGTCAATGGACAACGGGAAGTGCCAATGT
GCTCTTTCCAAGAGCAAACACCCCGTTGACTTCAAGCGAAGTGG
CAC-N$_X$-3'
(artsgRNA8 SEQ ID NO: 37);

5'-GGTGACCTATAGGGTCAATGAATCTGTGCGTGTGCCATAAG
TAATTAAAAATTACCCACCACAGACTTCAAGCGAAGTGGCAC-
N$_X$-3'
(artsgRNA9 SEQ ID NO: 38);

5'-GGTCTAAAGGACAGAATTTTTCAACGGGTGTGCCAATGCC
ACTTTCCAGGTGGCAAAGCCCGTTGAGCTTCAAAGAAGTGGCA
C-N$_X$-3'
(artsgRNA10 SEQ ID NO: 39);

5'-GGTCTAAAGGACAGAAGACAACGGGAAGTGCCAATGTGCTC
TTTCCAAGAGCAAACACCCCGTTGGCTTCAAAGAAGTGGCAC-
N$_X$-3'
(artsgRNA11 SEQ ID NO: 40);

5'-GGTCTAAAGGACAGAAAATCTGTGCGTGTGCCATAAGTAAT
TAAAAATTACCCACCACAGGCTTCAAAGAAGTGGCAC-N$_X$-3'
(artsgRNA12 SEQ ID NO: 41);

5'-GGTCGTCTATAGGACGGCGAGTTTTTCAACGGGTGTGCCAA
TGGCCACTTTCCAGGTGGCAAAGCCCGTTGAGCTTCAAAGAAGT

-continued

GGCAC-$N_X$-3'
(artsgRNA13 SEQ ID NO: 42);

5'-GGTCGTCTATAGGACGGCGAGGACAACGGGAAGTGCCAATG

TGCTCTTTCCAAGAGCAAACACCCCGTTGGCTTCAAAGAAGTGG

CAC-$N_X$-3'
(artsgRNA14 SEQ ID NO: 43);

5'-GGTCGTCTATAGGACGGCGAGAATCTGTGCGTGTGCCATAA

GTAATTAAAAATTACCCACCACAGGCTTCAAAGAAGTGGCAC- $N_X$-3'
(artsgRNA15 SEQ ID NO: 44);

5'-GGTGACCTATAGGGTCAATGTTTTTCAACGGGTGTGCCAAT

GGCCACTTTCCAGGTGGCAAAGCCCGTTGAGCTTCAAAGAAGTG

GCAC-$N_X$-3'
(artsgRNA16 SEQ ID NO: 44);

5'-GGTGACCTATAGGGTCAATGGACAACGGGAAGTGCCAATGT

GCTCTTTCCAAGAGCAAACACCCCGTTGGCTTCAAAGAAGTGGC

AC-$N_X$-3'
(artsgRNA17 SEQ ID NO: 46);

5'-GGTGACCTATAGGGTCAATGAATCTGTGCGTGTGCCATAAG

TAATTAAAAATTACCCACCACAGGCTTCAAAGAAGTGGCAC- $N_X$-3'
(artsgRNA18 SEQ ID NO: 47);

5'-GGTCTAAAGGACAGAATTTTTCAACGGGTGTGCCAATGGCC

ACTTTCCAGGTGGCAAAGCCCGTTGAGATTATCTATGATGATTG

GCAC-$N_X$-3'
(artsgRNA19 SEQ ID NO: 48);

5'-GGTCTAAAGGACAGAAGACAACGGGAAGTGCCAATGTGCTC

TTTCCAAGAGCAAACACCCCGTTGGATTATCTATGATGATTGGC

AC-$N_X$-3'
(artsgRNA20 SEQ ID NO: 49);

5'-GGTCTAAAGGACAGAAAATCTGTGCGTGTGCCATAAGTAAT

TAAAAATTACCCACCACAGGATTATCTATGATGATTGGCAC- $N_X$-3'
(artsgRNA21 SEQ ID NO: 50);

5'-GGTCGTCTATAGGACGGCGAGTTTTTCAACGGGTGTGCCAA

TGGCCACTTTCCAGGTGGCAAAGCCCGTTGAGATTATCTATGAT

GATTGGCAC-$N_X$-3'
(artsgRNA22 SEQ ID NO: 51);

5'-GGTCGTCTATAGGACGGCGAGGACAACGGGAAGTGCCAATG

TGCTCTTTCCAAGAGCAAACACCCCGTTGGATTATCTATGATGA

TTGGCAC-$N_X$-3'
(artsgRNA23 SEQ ID NO: 52);

5'-GGTCGTCTATAGGACGGCGAGAATCTGTGCGTGTGCCATAA

GTAATTAAAAATTACCCACCACAGGATTATCTATGATGATTGGC

-continued

AC-$N_X$-3'
(artsgRNA24 SEQ ID NO: 53);

5'-GGTGACCTATAGGGTCAATGTTTTTCAACGGGTGTGCCAAT

GGCCACTTTCCAGGTGGCAAAGCCCGTTGAGATTATCTATGATG

ATTGGCAC-$N_X$-3'
(artsgRNA25 SEQ ID NO: 54);

5'-GGTGACCTATAGGGTCAATGGACAACGGGAAGTGCCAATGT

GCTCTTTCCAAGAGCAAACACCCCGTTGGATTATCTATGATGAT

TGGCAC-$N_X$-3'
(artsgRNA26 SEQ ID NO: 55);

5'-GGTGACCTATAGGGTCAATGAATCTGTGCGTGTGCCATAAG

TAATTAAAAATTACCCACCACAGGATTATCTATGATGATTGGCA

C-$N_X$-3'
(artsgRNA27 SEQ ID NO: 56);

5'-GGTCTAAAGGACAGAACAACGGGATGTGCCAATGCACTCTT

TCCAGGAGTGAACACCCCGTTGACTTCAAGCGAAGTGGCAC- $N_X$-3'
(artsgRNA28 SEQ ID NO: 57);

5'-GGTCGTCTATAGGACGGCGAGCAACGGGATGTGCCAATGCA

CTCTTTCCAGGAGTGAACACCCCGTTGACTTCAAGCGAAGTGGC

AC-$N_X$-3'
(artsgRNA29 SEQ ID NO: 58);

5'-GGAATTGCCGATCTATAGGACGGCAGATTTTTTCAACGGG

TGTGCCAATGGCCACTTTCCAGGTGGCAAAGCCCGTTGAACTTC

AAGCGAAGTGGCAC-$N_X$-3'
(artsgRNA30 SEQ ID NO: 59);

5'-GGAATTGCCGATCTATAGGACGGCAGATTGACAACGGGAAG

TGCCAATGTGCTCTTTCCAAGAGCAAACACCCCGTTGACTTCAA

GCGAAGTGGCAC-$N_X$-3'
(artsgRNA31 SEQ ID NO: 60);

5'-GGAATTGCCGATCTATAGGACGGCAGATTCAACGGGATGTG

CCAATGCACTCTTTCCAGGAGTGAACACCCCGTTGACTTCAAGC

GAAGTGGCAC-$N_X$-3'
(artsgRNA32 SEQ ID NO: 61);

5'-GGTCTAAAGGACAGAACAACGGGATGTGCCAATGCACTCTT

TCCAGGAGTGAACACCCCGTTGGCTTCAAAGAAGTGGCAC- $N_X$-3'
(artsgRNA33 SEQ ID NO: 62);

5'-GGTCGTCTATAGGACGGCGAGCAACGGGATGTGCCAATGCA

CTCTTTCCAGGAGTGAACACCCCGTTGGCTTCAAAGAAGTGGCA

C-$N_X$-3'
(artsgRNA34 SEQ ID NO: 63);

5'-GGAATTGCCGATCTATAGGACGGCAGATTTTTTCAACGGG

TGTGCCAATGGCCACTTTCCAGGTGGCAAAGCCCGTTGAGCTTC

-continued

AAAGAAGTGGCAC-N$_X$-3'
(artsgRNA35 SEQ ID NO: 64);

5'-GGAATTGCCGATCTATAGGACGGCAGATTGACAACGGGAAG

TGCCAATGTGCTCTTTCCAAGAGCAAACACCCCGTTGGCTTCAA

AGAAGTGGCAC-N$_X$-3'
(artsgRN36A SEQ ID NO: 65);
or

5'-GGAATTGCCGATCTATAGGACGGCAGATTCAACGGGATGTG

CCAATGCACTCTTTCCAGGAGTGAACACCCCGTTGGCTTCAAAG

AAGTGGCAC-N$_X$-3'
(artsgRNA37 SEQ ID NO: 66), wherein Nx represents nucleotide sequence that consists of X consecutive nucleotides (spacer sequence), N is independently selected from A, G, C and T; X is an integer of 18≤X≤35, preferably, X=20. In some embodiments, the sequence Nx (spacer sequence) is capable of specifically hybridizing to the complement of the target sequence. The sequence other than Nx in the sgRNA is a scaffold sequence of sgRNA.

In some embodiments, the artificial sgRNA comprises a scaffold sequence encoded by the nucleotide sequence of any one of SEQ ID NOs: 30-66.

In some embodiments, the spacer sequence of the gRNA is designed to exactly match the target sequence or its complement. In some embodiments, the spacer sequence of the gRNA is designed to have at least one nucleotide mismatch, for example, one nucleotide mismatch, to the target sequence or its complement. Such gRNAs are also referred to as tuned gRNAs, the nucleotide mismatch is also referred to tuning sites. In view of the tolerance difference in Cas12b to different mismatches between sgRNA and target, gRNAs designed to have nucleotide mismatches with the target sequence or its complement are capable of distinguishing single nucleotide polymorphism variations in the target sequence. In some embodiments, the location of the at least one nucleotide mismatch is different from the location of the single nucleotide polymorphism variation. For example, a tuned sgRNA has a nucleotide mismatch with target sequence 1 at position 1, and target sequence 1 and target sequence 2 have a single nucleotide polymorphism at position 2, i.e., there are two nucleotide mismatches between a tuned sgRNA and target sequence 2. Due to the tolerance difference of Cas12b to the number of mismatches, it only produces a detectable signal (only 1 mismatch) in the presence of target sequence 1, while target sequence 2 has no detectable signal (due to the presence of two mismatches), thereby target sequence 1 and target sequence 2 comprising single nucleotide polymorphism can be distinguished. One skilled in the art can screen for suitable tuning sites based on the particular target sequence.

In the present invention, a sequence other than the spacer sequence in the gRNA is also referred to as a gRNA scaffold.

In some embodiments, the gRNA is produced by in vitro transcription. In some embodiments, the gRNA is produced by chemical synthesis.

In some embodiments of the invention, the target sequence is 18-35 nucleotides in length, preferably 20 nucleotides. In some embodiments of the invention, especially the detection related to double-strand DNA, the 5'-end flanking of the target sequence is a protospacer adjacent motif (PAM) sequence selected from 5'TTTN-3', 5' ATTN-3', 5'GTTN-3', 5'CTTN-3', 5'TTC-3', 5'TTG-3', 5'TTA-3', 5'TTT-3', 5' TAN-3', 5'TGN-3', 5'TCN-3' and 5' ATC-3', preferably 5'TTTN-3'.

The "single-strand DNA reporter molecule which produces a detectable signal after being cleaved" may, for example, comprise a fluorophore and a quenching group thereof at both ends of the single-stranded DNA, respectively. When the single-strand DNA is not cleaved, the fluorophore does not fluoresce due to the presence of the quenching group. When the Cas12b-gRNA complex is activated by the target nucleic acid molecule and the DNA single strand of the single-strand DNA reporter molecule is cleaved by its non-canonical bypass ssDNA cleavage activity, the fluorophore is released to fluoresce. Suitable fluorophores and their corresponding quenching groups, as well as methods for labeling nucleic acid molecules thereof, are known in the art. Suitable fluorophores include, but are not limited to, FAM, TEX, HEX, Cy3 or Cy5. Suitable quenching groups include, but are not limited to, BHQ1, BHQ2, BHQ3 or TAMRA. Suitable fluorophore-quenching pairs include, but are not limited to, FAM-BHQ1, TEX-BHQ2, Cy5-BHQ3, Cy3-BHQ1 or FAM-TAMRA. Thus, in some embodiments, the detectable signal is a fluorescent signal. In some embodiments, the fluorophore is FAM and the quencher group is BHQ1.

The length of the single-strand DNA in the single-strand DNA reporter molecule may be about 2 to 100 nucleotides, for example, 2-5, 2-10, 2-15, 2-20, 2-25, 2-30, 2-40 or 2 to more nucleotides. Single-strand DNA in the single-strand DNA reporter molecule can comprise any sequence, but in some embodiments, except for polyG (poly-guanylic acid). In some embodiments, the single-strand DNA in the single-strand DNA reporter molecule can be selected from the group consisting of poly A (polyadenosine), polyC (polycytidine), or polyT (polythymidine).

In some embodiments, the single-strand DNA reporter molecule is selected from the group consisting of 5'-FAM-AAAAA-BHQ1-3', 5'-FAM-TTTTT-BHQ1-3', and 5'-FAM-CCCCC-BHQ1-3'.

In some embodiments of the methods of the invention, a step of amplifying the nucleic acid molecule in the biological sample prior to step (a) is further included. Such amplification includes, but is not limited to, PCR amplification or Recombinase Polymerase Amplification (RPA). Preferably, the amplification is Recombinase Polymerase Amplification.

In some embodiments, the Recombinase Polymerase Amplification is performed for about 10 minutes to about 60 minutes.

In some embodiments, the Cas12b protein has been pre-combined with the gRNA to form a Cas12b-gRNA complex prior to contact with the biological sample.

In some embodiments, the reaction of step (a) is carried out for from about 20 minutes to about 180 minutes, such as about 20 minutes, about 30 minutes, about 40 minutes, about 50 minutes, about 60 minutes, about 90 minutes, about 120 minutes, or any period therebetween.

In some embodiments, step (a) is carried out in a suitable buffer. For example, the buffer is NEBuffer™ 2, NEBuffer™ 2.1 or Cutsmart® Buffer. In some embodiments, the buffer comprises a final concentration of 50 mM NaCl, 10 mM Tris-HCl, 10 mM MgCl$_2$, 1 mM DTT, pH 7.9. In some embodiments, the buffer comprises a final concentration of 50 mM NaCl, 10 mM Tris-HCl, 10 mM MgCl$_2$, 100 µg/ml BSA, pH 7.9. In some embodiments, the buffer comprises a final concentration of 50 mM potassium acetate, 20 mM Tris-acetic acid, 10 mM magnesium acetate, 100 µg/ml BSA, pH 7.9.

Biological samples that can be used in the method of the invention include, but are not limited to, whole blood, plasma, serum, cerebrospinal fluid, urine, feces, cell or tissue extracts, and the like. The biological sample encompasses a nucleic acid sample extracted from a cell or tissue.

The scope of the invention also includes a kit for use in the methods of the invention, the kit comprises reagents for carrying out the methods of the invention, and instructions for use. For example, the kit may comprise a Cas12b protein (e.g., a Cas12b protein of the invention), a gRNA (e.g., comprising a gRNA scaffold of the invention) or a reagent for producing a gRNA (e.g., comprising the gRNA scaffold of the invention), single-strand DNA reporter molecule (e.g., single-strand DNA reporter molecule of the invention), suitable buffers, and/or nucleic acid amplification reagents. The kit generally includes a label indicating the intended use and/or method of use of the contents of the kit. The term label includes any written or recorded material provided on or with the kit or otherwise provided with the kit.

The invention further provides the use of the Cas12b protein as defined above and/or a gRNA comprising the scaffold of the invention and/or an agent for producing a gRNA comprising the scaffold of the invention in the preparation of a kit for the method of the present invention.

EXAMPLE

Material and Method

Protein Expression and Purification

SpCas9 and LbCas12a proteins were commercially purchased (NEB). AaCas12b, ArCas12a, HkCas12a and PrCas12a proteins were purified according to previous report. Briefly, BPK2014-Cas12-His10 proteins were expression in *E. coli* strain BL21 (λDE3) and induced expression with 0.5 mM IPTG at 16° C. for 16 h. Cell pellets were harvested and lysed, following washing and elution using a Ni resin, His60 Ni Superflow™ (Takara). Purified Cas12 proteins were dialyzed, concentrated and finally quantitated using BCA Protein Assay Kit (Thermo Fisher).

Nucleic Acid Preparation

DNA oligos were commercially purchased (Genscript). Double-stranded DNA activators were obtained by PCR reaction and purified using a purification kit, Oligo Clean & Concentrator™ (ZYMO Research). Guide RNAs were transcribed in vitro using HiScribe™ T7 High Yield RNA Synthesis Kit (NEB) and purified using MicroElute™ (Omega), an RNA cleanup kit.

Background genomic DNAs used in indicated reactions were crudely purified from human embryonic kidney 293T cells using Mouse Direct PCR Kit (Bimake). To mimic the cell-free DNA (cfDNA), dsDNAs were diluted into human plasma (Thermo Fisher) at indicated concentrations.

Flurophore Quencher (FQ)-Labeled Reporter Assays.

Detection assays were performed with 30 nM Cas12, 36 nM gRNA, 40 nM activator (unless otherwise indicated) mixed in 40 ng background genomic DNAs (in indicated reaction), 200 nM custom synthesized homopolymer ssDNA FQ reporter (Table 1) and NEBuffer™ 2 (unless otherwise indicated) in a 20 μl reaction in a Corning 384-well Polystyrene NBS Microplate. Reactions were incubated at 37° C. for indicated timecourse in a fluorescence plate reader (BioTek Synergy 4) with fluorescent kinetics measured every 5 min ($\lambda$ex=485 nm; $\lambda$em=528 nm, transmission gain=61). The fluorescence results were analyzed by SigmaPlot software.

Recombinase Polymerase Amplification (RPA) Reactions.

Recombinase polymerase amplification (RPA) reactions were proceeded using TwistAmp Basic (TwistDx) according to the manufacturer's protocol. The 50 μl RPA reaction system containing varying amounts of DNA input was incubated in 37° C. for 10 minutes. 16 μl RPA product were directly transferred to the 20 μl detection assay as above mentioned.

Example 1. Characterization of the Trans-ssDNA Cleavage Activity of Cas12b

Figure 1B:
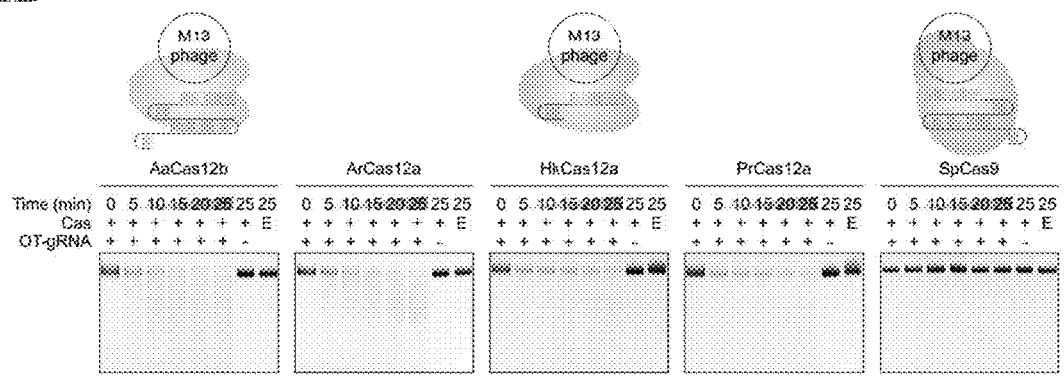
Figure 1C:
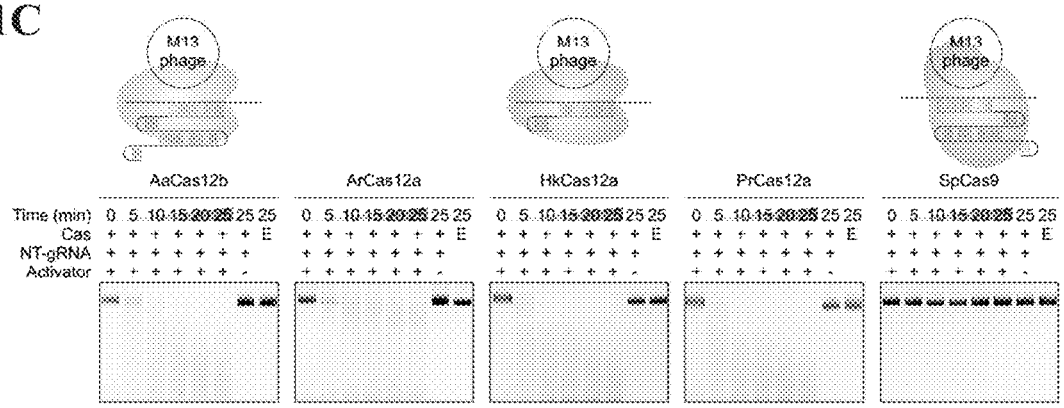
Figure 2A:
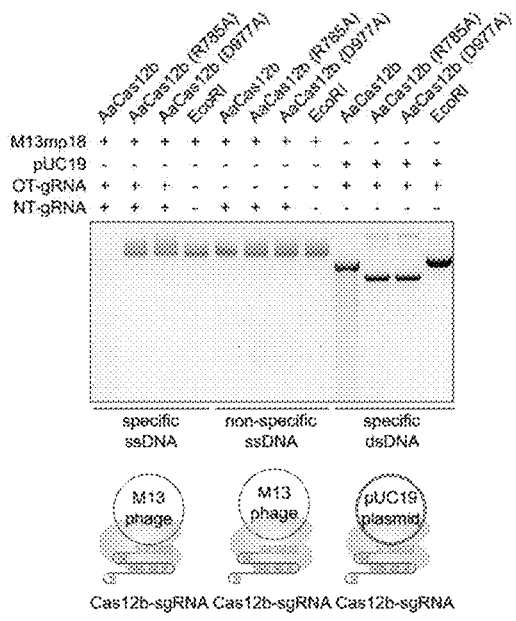
FIGS. 2A-2B: The RuvC domain of Cas12b is responsible for ssDNA trans-cleavage.
Figure 2B:
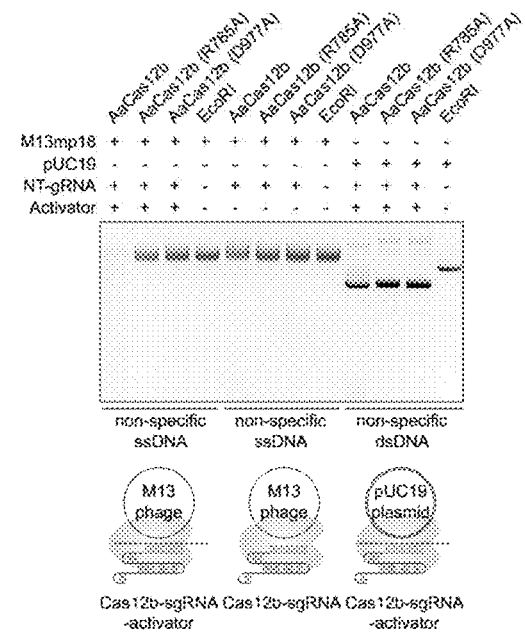

CRISPR-Cas12b nuclease derived from *Alicyclobacillus acidiphilus* NBRC 100859 (AaCas12b, amino acid sequence shown as SEQ ID NO:1) has recently been harnessed for mammalian genome editing for its canonical dsDNA targeted cleavage ability (FIG. 1A). To characterize the non-canonical trans-cleavage activity of Cas12b, we conducted in vitro ssDNA cleavage assay using Cas12b, Cas12a and Cas9 separately combined with their cognate guide RNA (gRNA). As the results indicated, AaCas12b and Cas12a (LbCas12a, ArCas12a, HkCas12a and PrCas12a) could induce rapid degradation of single-stranded M13 DNA phage, while SpCas9 could not (FIG. 1B). As well, AaCas12b and Cas12a also achieved M13 degradation in the presence of a non-target gRNA and its complementary ssDNA "activator" that has no sequence homology to the M13 phage genome (FIG. 1C). The non-canonical collateral ssDNA cleavage activity was abolished with catalytically inactive variants (R785A and D977A), indicating a RuvC domain-dependent mechanism (FIGS. 2A-2B). These results reveal that AaCas12b-sgRNA complex can acquire nonspecific ssDNA trans-cleavage activity once triggered by a guide-complementary ssDNA.

Example 2. Develop Cas12b-Mediated DNA Detection System

Figure 3A:
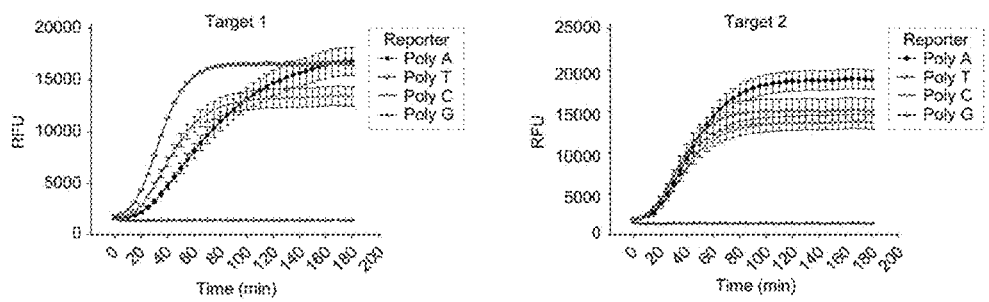
FIGS. 3A-3C: Preference for Cas12b-mediated trans-activated cleavage of non-specific ssDNA.
Figure 3B:
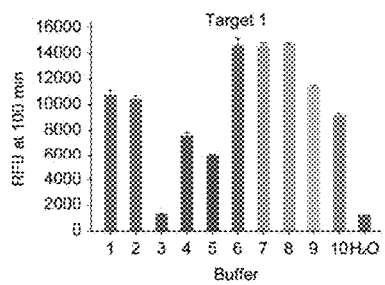
Figure 3C:
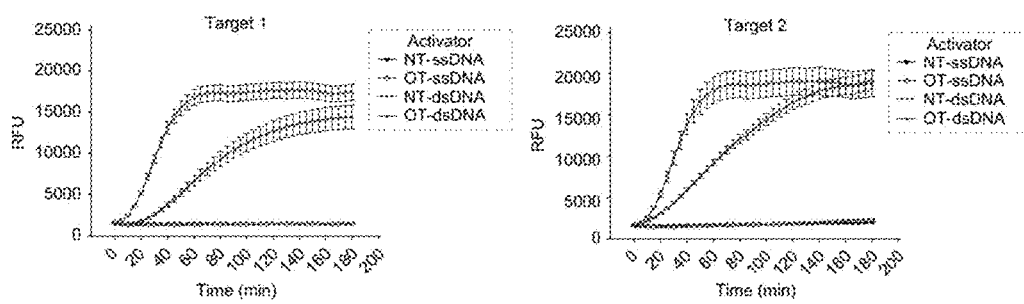

To develop the Cas12b-mediated DNA detection system, the inventors first profiled the cleavage preference of AaCas12b-sgRNA complex on fluorophore quencher (FQ)-labeled homopolymer reporters and found that AaCas12b preferred thymine polymer (ploy T) as well as poly A and poly C, whereas poly G could not work at all (FIG. 3A). Meanwhile, the cleavage efficiency could be optimized and achieved best in NEBuffer™ 2 (FIG. 3B). Afterwards, the inventors performed AaCas12b-mediated cleavage assay using poly T reporter in NEBuffer™ 2. Using sgRNA-complementary OT-ssDNA and OT-dsDNA (OT represents on target) or sgRNA-non-complementary NT-ssDNA and NT-dsDNA (NT represents non target) as activator, the inventors found OT-ssDNA and OT-dsDNA were able to trigger AaCas12b to cleave the FQ-reporter, though OT-dsDNA activator was less efficient (FIG. 3C).

Figure 4A:
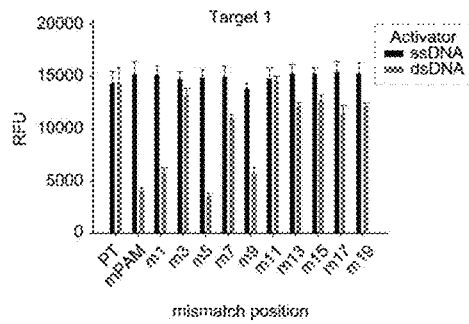
FIGS. 4A-4F: Specificity and sensitivity of Cas12b-mediated DNA detection.
Figure 4B:
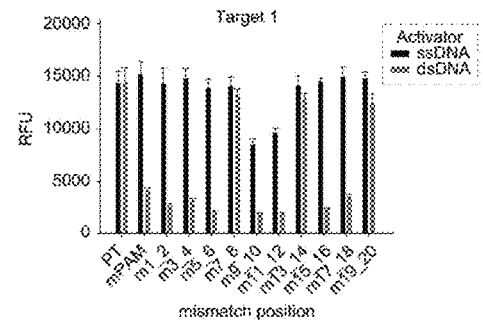

The inventors next tested the specificity of trans-cleavage activation using either a ssDNA or dsDNA activator bearing various mismatches, and found that the PAM sequence is critical for dsDNA activator-triggered trans-cleavage activity for AaCas12b and is dispensable for ssDNA activator (FIGS. 4A, 4B). Meanwhile, the inventors also found that mismatches between activator and sgRNA would impede or even abolish the trans-cleavage activity triggered by dsDNA activator only (FIGS. 4A, 4B).

Figure 5A:
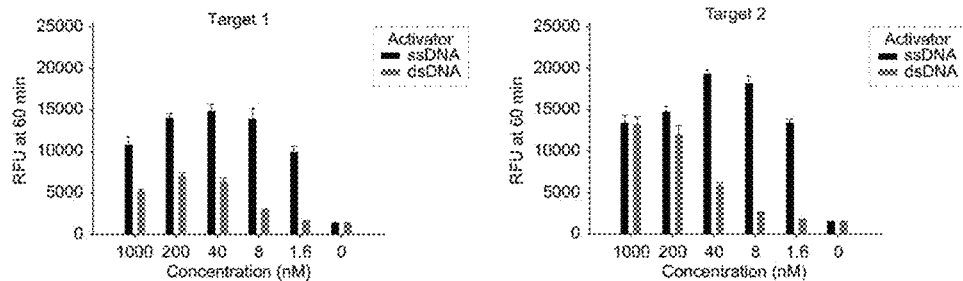
FIGS. 5A-5E: Sensitivity and specificity of AaCas12b-mediated DNA detection.

Then the inventors determined the sensitivity of AaCas12b-sgRNA-activator system, and found that without pre-amplification, AaCas12b did not produce a detectable signal at input concentrations <1.6 nM and 8 nM for ssDNA- and dsDNA-activator, respectively (FIG. 5A).

Figure 5B:
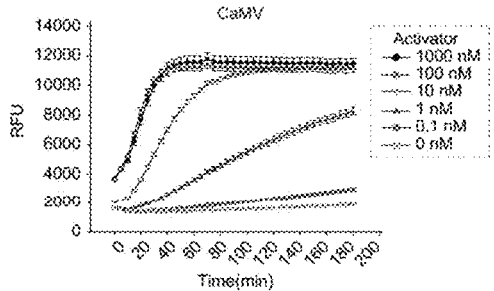
Figure 5C:
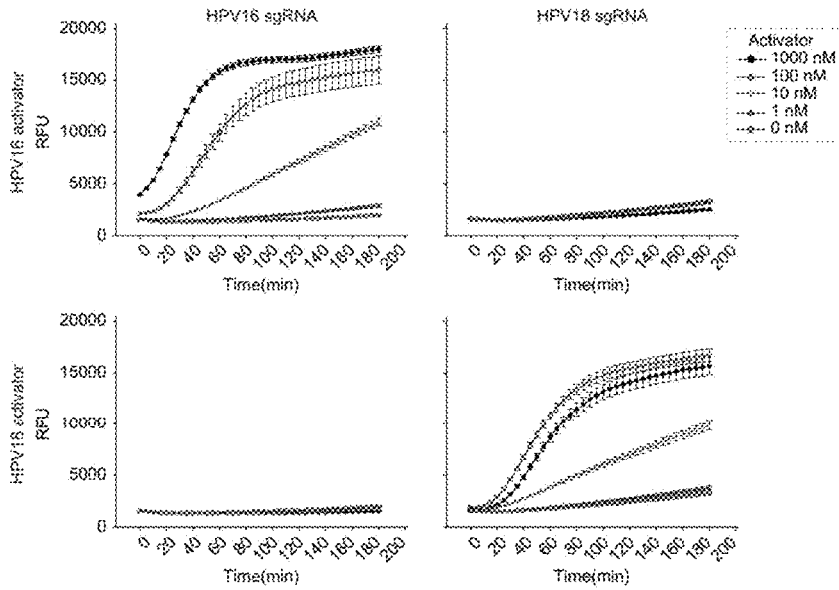

Since dsDNA activator possessed a higher specificity (FIGS. 4A, 4B), the inventors explored to engineer the AaCas12b-sgRNA-dsDNA-activator system to be a DNA detection platform (Cas12b-based DNA detection, CDetection). The inventors synthesized one Cauliflower mosaic virus (CaMV) dsDNA and two human papillomavirus (HPV) dsDNAs (HPV16 and HPV18) as activator in detection reaction. When input concentration of activator ≥10 nM, AaCas12b-sgRNA could not only produce detectable signal (FIGS. 5B, 5C), but also distinguish between two dsDNA viruses, HPV16 and HPV18 (FIG. 5C).

Figure 4C:
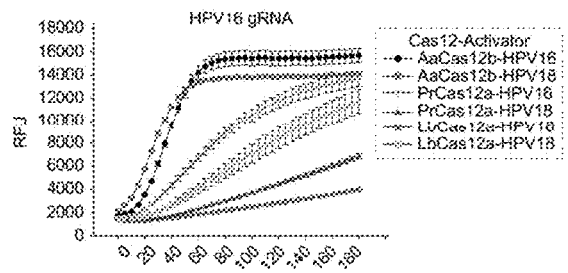
Figure 5D:
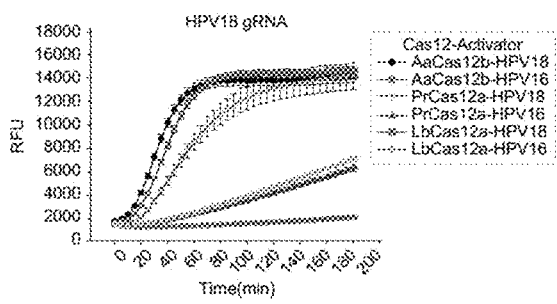

AaCas12b showed higher detection sensitivity at both detection sites than Cas12a-based DNA detection, so CDetection produced higher signal levels and lower background levels (FIGS. 4C and 5D).

Figure 4D:
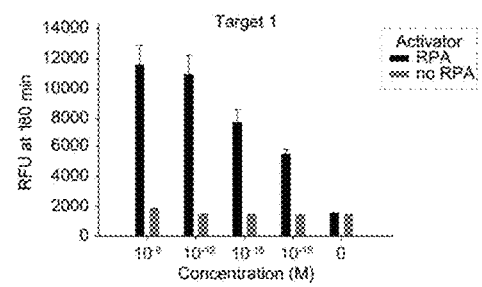
Figure 4E:
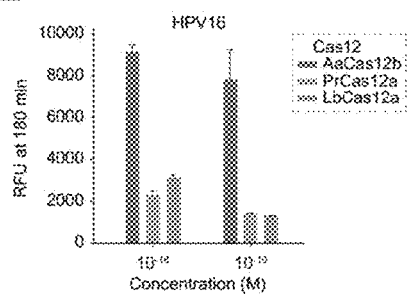
Figure 5E:
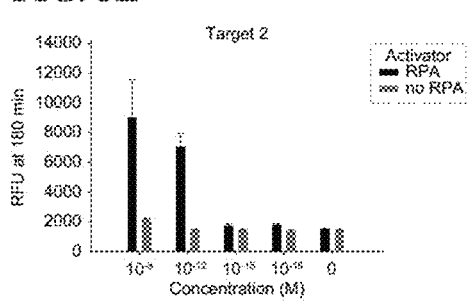

To enhance sensitivity, the inventors performed pre-amplification with recombinase polymerase amplification (RPA), and enabled single-molecule detection at 1 åM (FIGS. 4D and 5E). These results indicated that Cas12b-mediated DNA detection (CDetection) could achieve DNA detection with high specificity and attomolar sensitivity, higher than Cas12a-based detection platform (FIG. 4E).

Example 3. Development of Enhanced Cas12b-Mediated DNA Detection System

Figure 6A:
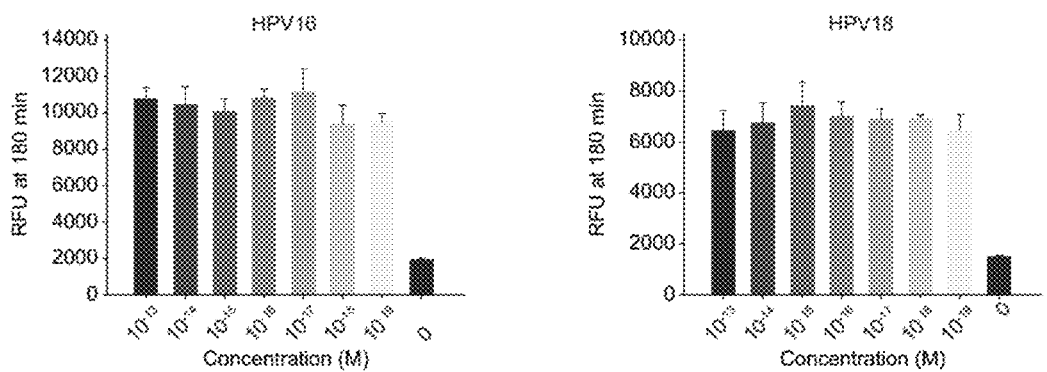
FIGS. 6A-6B: CDetection achieves sub-attomolar sensitivity in DNA detection.

To extend and mimic applications of CDetection in molecular diagnostic applications, the inventors diluted synthetic HPV dsDNAs into human genomic DNA. The results showed that CDetection could identify infectious virus target at sub-attomolar magnitude (0.1 åM) (FIG. 6A).

Figure 4F:
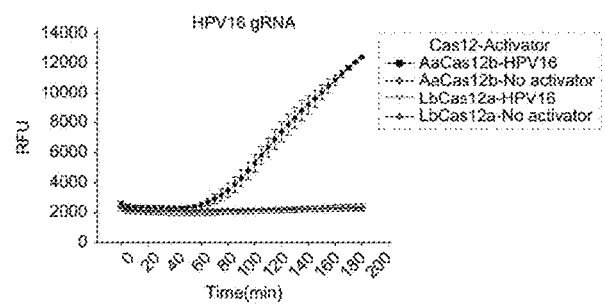
Figure 6B:
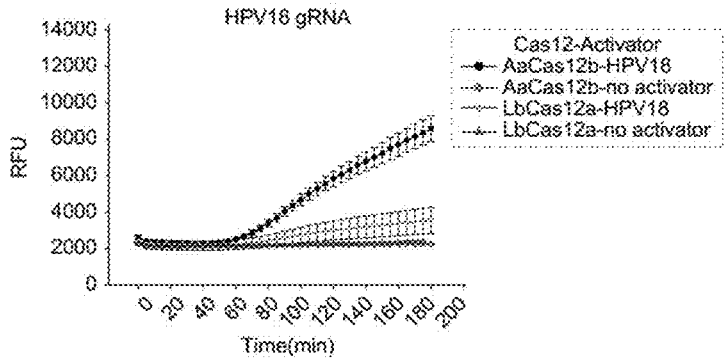

The high sensitivity of AaCas12b in human plasma urged us to test the application of CDetection in cfDNA-based non-invasive diagnoses. Though previously used cfDNA analyses have achieved a sensitivity of 1 in $10^8$, these methods require a relatively large amount of cfDNAs (5~10 ng/ml of plasma) and are time-consuming. To indicate the advantage of CDetection platform in cfDNA detection, the inventors diluted HPV dsDNAs into human plasma and examined the sensitivity of this newly-established method. The results showed that CDetection could detect the existence of HPV DNAs in human plasma at the concentration of 1 åM (FIGS. 4F and 6B), indicating the possibility to rapidly detect infectious viruses in only one drop of blood.

Figure 7A:
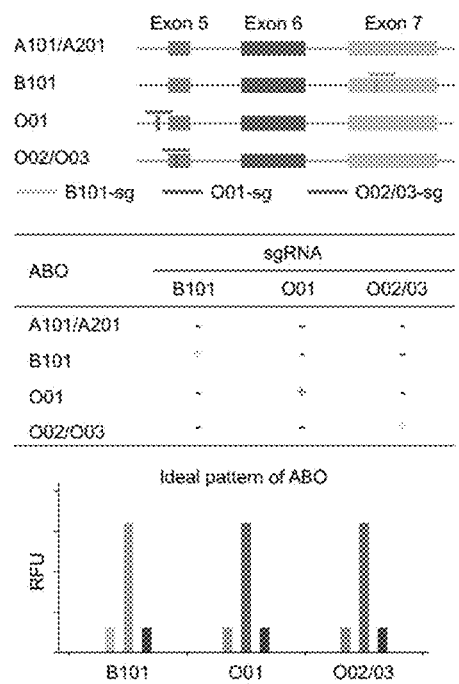
FIGS. 7A-7C: Application of CDetection platform.
Figure 7B:
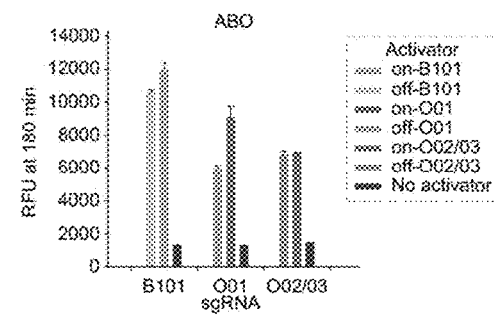

To expand the applications of CDetection in accurate diagnostics, the inventors designed experiments using three targeting sgRNA and corresponding dsDNA activators (on-versus off-activator) to identify six common human ABO alleles. Theoretically, CDetection carrying each of the three sgRNAs can identify O01, O02/O03 and B101, respectively. And if no fluorescent signal can be detected for all sgRNAs, the allele should be A101/A201 (FIG. 7A). The results showed that CDetection failed to distinguish different ABO alleles as it produced indistinguishable fluorescent signals between the on- and off dsDNA activator groups (FIG. 7B).

Figure 7C:
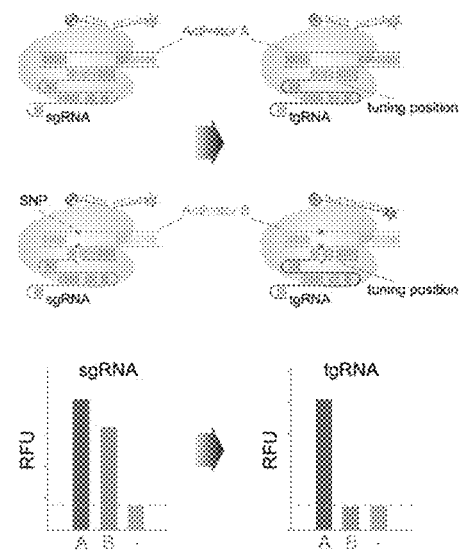

To improve the specificity of CDetection, the inventors introduced tuned guide RNA (tgRNA) containing a single-nucleotide mismatch in the spacer sequence, which transforms the undistinguishable state of two similar targets differed by a single base into the distinguishable state (FIG. 7C).

To elucidate the single-base-resolution sensitivity of enhanced CDetection (eCDetection), the inventors repeated the ABO blood genotyping test. As the results indicated, eCDetection could determine blood type with high accuracy, while CDetection could not (FIG. 8A).

Disease-associated point mutations were usually detected by sequencing and probe detection. However, sequencing is costly and time-consuming, and its sensitivity is dependent on sequencing depth. Probe-based methods perform poor sensitivity for single-nucleotide variation. Since the eCDetection method of the present invention has high specificity and sensitivity, the eCDetection can be used to detect low rate single-base mutations in the human genome.

Figure 9A:
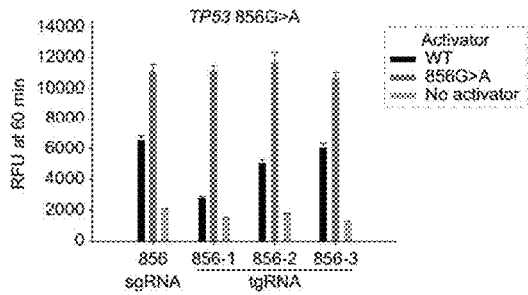
FIGS. 9A-9D: Accurate DNA detection using CDetection platform.
Figure 9C:
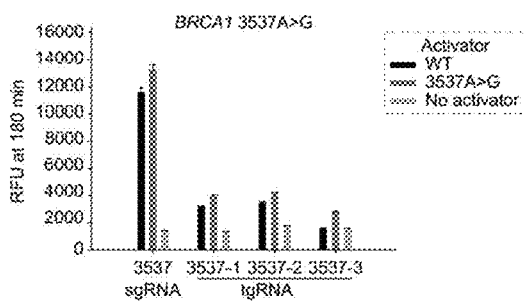
Figure 9B:
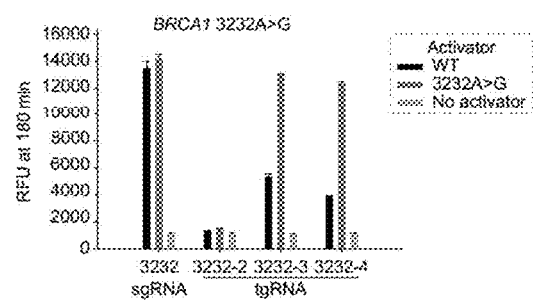

The inventors selected the cancer-related TP53 856G>A mutation to test the feasibility. The results showed that CDetection could accurately distinguish the point mutated allele from the wild-type allele using selected tgRNAs (FIG. 9A).

Furthermore, the inventors applied CDetection platform in detecting two hotspots in breast cancerrelated BRCA1 gene (3232A>G and 3537A>G). CDetection with selected tgRNAs (tgRNA-3232-1 and tgRNA-3537-4) performed excellently to discriminate point mutations while sgRNAs could hardly support point mutation detection (FIG. 8B, 8C, and FIGS. 9B, 9C).

Figure 9D:
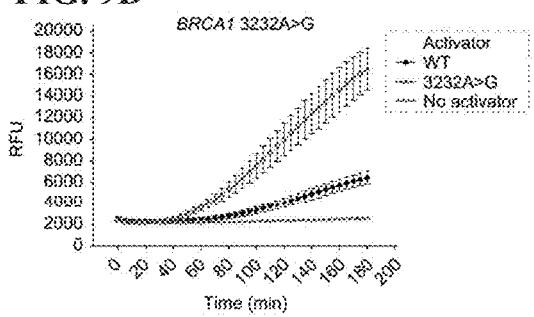

Furthermore, to mock the early clinical detection of primary diseases using cfDNA by CDetection, the inventors diluted BRCA1 3232A>G dsDNAs into human plasma. The results demonstrated that CDetection could achieve point mutation detection at the single-base resolution (FIG. 8D and FIG. 9D). eCDetection of the present invention is able to achieve rapid DNA detection at the single-base resolution in clinical research.

Figure 10:
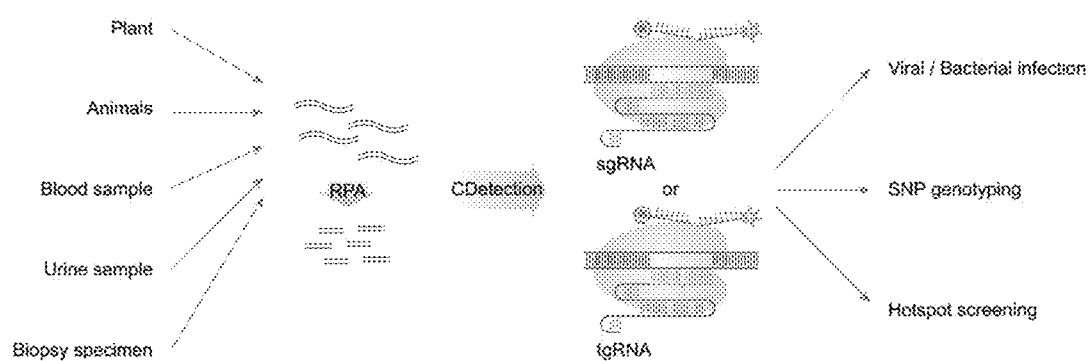
FIG. 10 Rapid and accurate diagnostic applications of CDetection. Genomic DNAs are obtained from various samples via directly lysed for clinical diagnostics and quarantine inspection. For different purposes, DNAs with or without RPA were applied for Cas12b-based detection combined with sgRNA or tgRNA.

Together, the present invention provides a CDetection platform based on the non-canonical collateral ssDNA cleavage properties of Cas12b nuclease, which enables to detect DNA molecules with attomolar sensitivity. Meanwhile, combined with tuned gRNA, the inventors develop an enhanced version (eCDetection) to achieve single-base-resolution sensitivity. The CDetection and eCDetection platform of the present invention will make it easier to detect the presence of nucleic acids in a wide range of molecular diagnostic applications, and genotypic assay in clinical research (FIG. 10).

Example 4. Other Cas12b Proteins Identification

Figure 12:
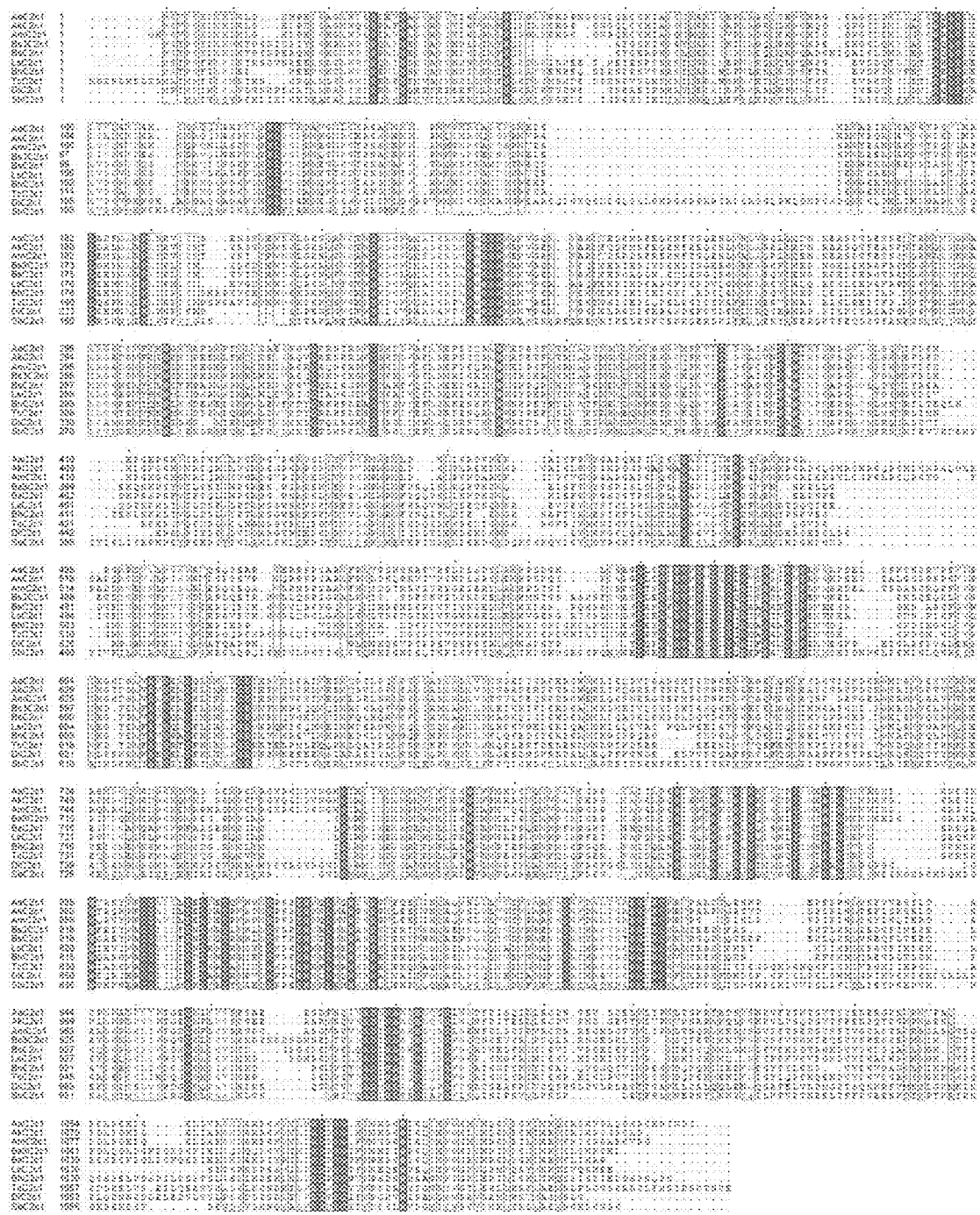
FIG. 12: Protein alignment of C2c1 orthologs. Multiple sequence alignment of the amino acid sequences the 10 C2c1 orthologs tested in this study. Residues that are conserved are highlighted with a red background and conserved mutations are highlighted with an outline and red font. The sequences are shown in SEQ ID NOs:1-10, respectively.

Six representative Cas12b proteins were selected and de novo synthesized from diverse bacteria to conduct genome editing in human embryonic kidney 293T cells as well as four previously reported Cas12b orthologs (FIGS. 11A-11B, FIG. 12, and SEQ ID NO:1-10). Among these ten Cas12b orthologs, Cas12b from *D. inopinatus* (DiCas12b) and *T. callidus* (TcCas12b) have neither predictable precursor CRISPR RNA (pre-crRNA) nor the anti-repeated trans-activating crRNA (tracrRNA) (FIG. 11B), suggesting that these two Cas12b proteins might be unsuitable for genome-editing applications.

To conduct mammalian genome editing, the inventors co-transfected 293T cells with individual Cas12b enzymes and their cognate chimeric single guide RNAs (sgRNAs) targeting human endogenous loci containing appropriate PAMs (FIGS. 11A-11B). Results of T7 Endonuclease (T7EI) assay showed that apart from previously reported AaCas12b, AkCas12b, AmCas12b, BhCas12b, Bs3Cas12b and LsCas12b could robustly edit the human genome, though their targeting efficiencies varied among different orthologs and at different targeting sites (FIG. 11B and FIG. 13A). The inventors also achieved multiplex genome engineering by programming Bs3Cas12b to simultaneously edit four sites in the human genome by simply using multiple sgRNAs (FIGS. 13B, 13C). These newly-identified Cas12b orthologs expand the options for Cas12b-based genome engineering.

Example 5. Exchangeability Between Different Cas12b and Dual-RNA

Figure 15:
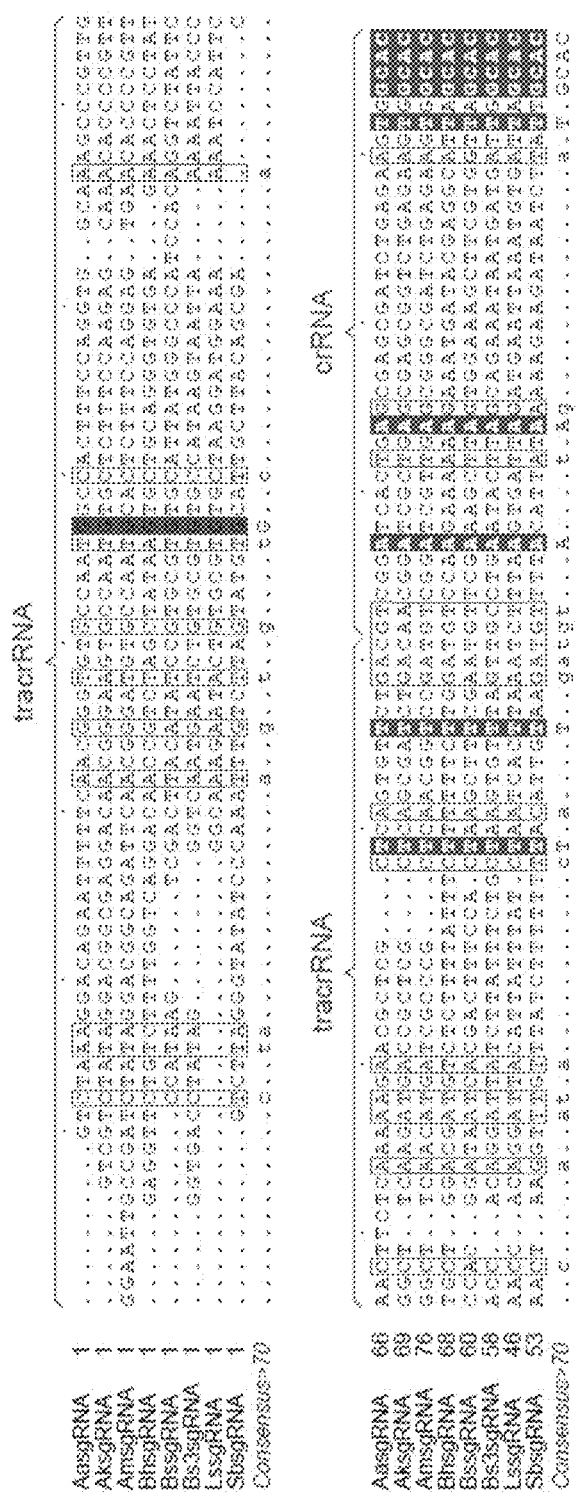
FIG. 15: DNA alignment of sgRNAs of C2c1. Multiple sequence alignment of the DNA sequences of the 8 sgRNAs derived from the 10 C2c1 loci tested in this study. The sequences are shown in SEQ ID NOs: 22-29, respectively.
Figure 16A:
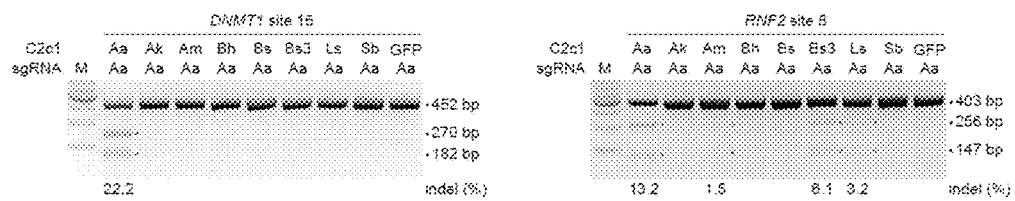
Figure 16B:
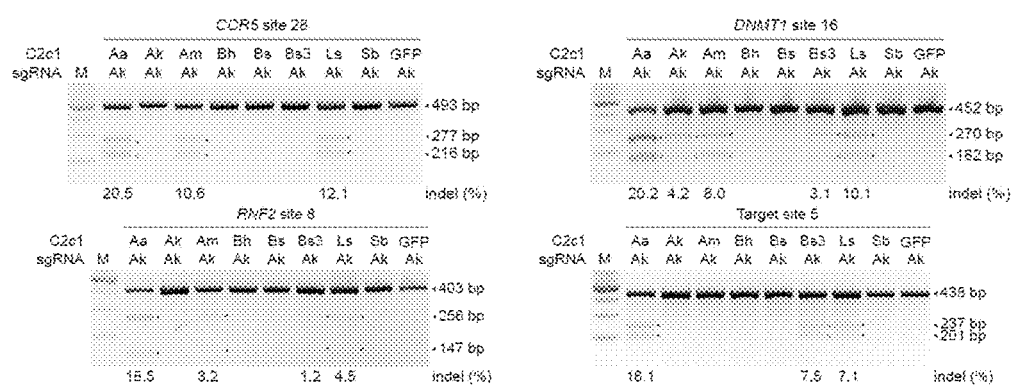
Figure 16C:
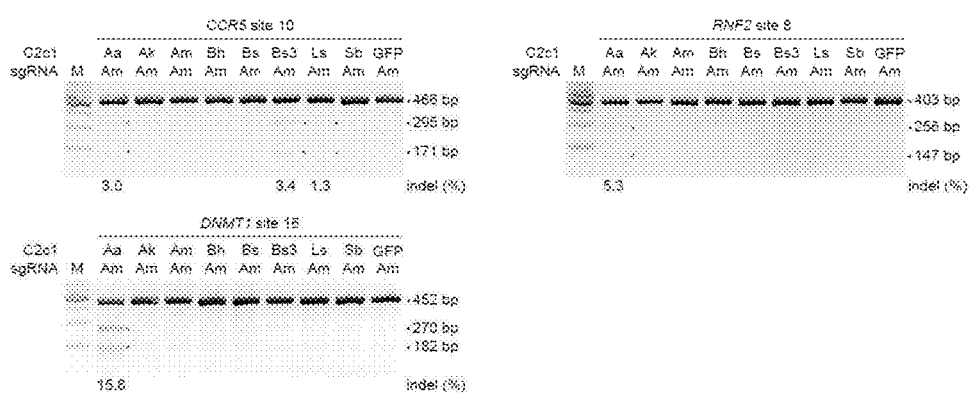
Figure 18A:
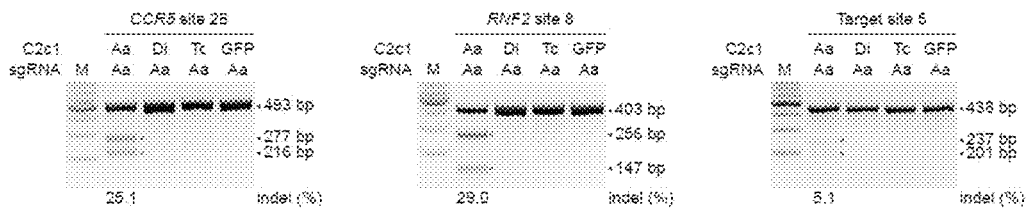
FIGS. 18A-18F: Orthogonal sgRNAs directed C2c1 for genome editing. T7EI assay results indicating the genome targeting activity of AaC2c1, DiC2c1 and TcC2c1 directed by AasgRNA (FIG. 18A), AksgRNA (FIG. 18B), AmsgRNA (FIG. 18C), Bs3sgRNA (FIG. 18D) and LssgRNA (FIG. 18E) in the human 293T cells. Red triangles indicate the cleaved bands.
Figure 18B:
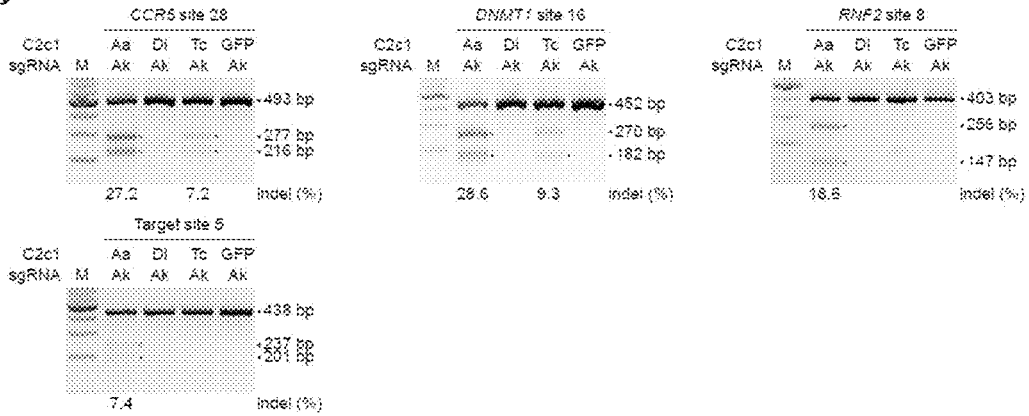
Figure 18C:
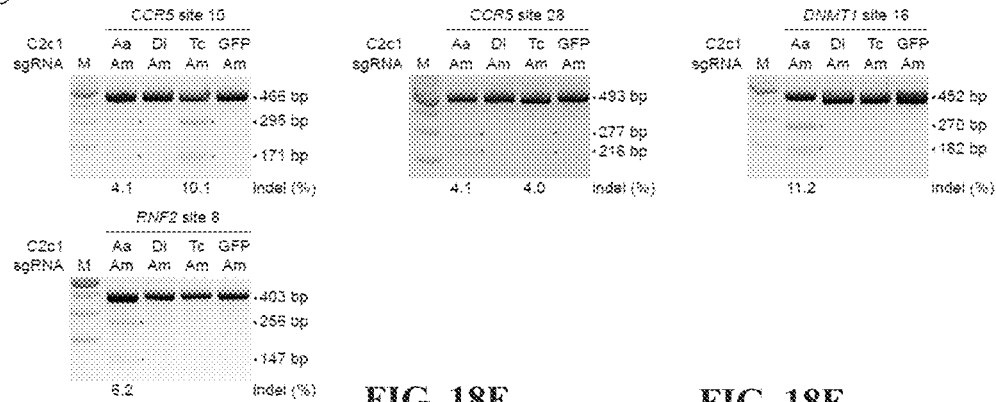
Figures 18D, 18E, 18F:
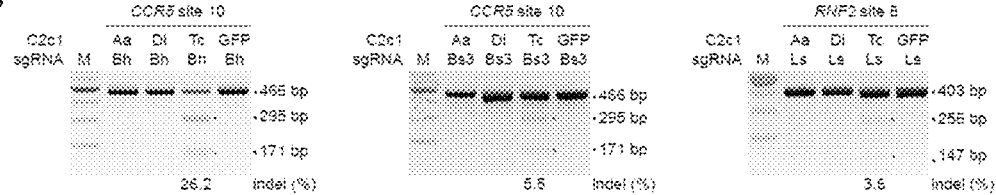
Figures 19A, 19B, 19C:
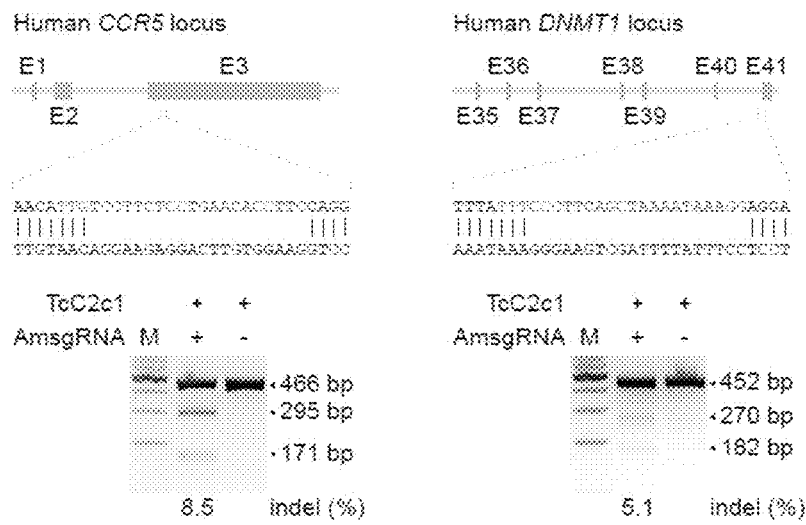
FIGS. 19A-19C: TcC2c1-mediated multiplex genome editing.

To investigate the interchangeability between the dual-RNA (crRNA 和 tracRRNA) and protein components in Cas12b systems, the inventors first analyzed the conservation of both Cas12b proteins and dual-RNAs. Besides the conserved amino acid sequences of Cas12b orthologs (FIG. 14A and FIG. 12), the DNA sequences of pre-crRNA: tracrRNA duplex and their secondary structures also exhibited high conservation (FIGS. 11B and 15). Next, the inventors conducted genome editing in 293T cells with the eight Cas12b orthologs complexed with respective sgRNAs from the eight Cas12b systems separately. As results of T7EI assay indicated, sgRNAs derived from AaCas12b, AkCas12b, AmCas12b, Bs3Cas12b and LsCas12b loci could substitute the original sgRNAs for mammalian genome editing, though their activities varied between different Cas12b orthologs and sgRNAs (FIGS. 14C, 14D and FIGS. 16A-16E). These results demonstrated the exchangeability between Cas12b and dual-RNA from different Cas12b loci.

Example 6. Using the Cas12b Ortholog with No CRISPR Array in Natural Loci for Genome Editing To further demonstrate our hypothesis, we chose two Cas12b orthologs (DiCas12b and TcCas12b) whose loci harbored no CRISPR array (FIG. 17A), making the sequences of their crRNA: tracrRNA duplex unpredictable, to conduct subsequent experiments. The inventors co-transfected DiCas12b and TcCas12b as well as AaCas12b combined with the sgRNAs derived from loci of other eight Cas12b orthologs targeting different genomic sites in 293T cells. T7EI assay results indicated that sgRNAs derived from AaCas12b, AkCas12b, AmCas12b, Bs3Cas12b and LsCas12b could enable TcCas12b to robustly edit the human genome (FIGS. 17B, 17C and FIGS. 18A-18F). Furthermore, TcCas12b could facilitate multiplex genome editing simultaneously directed by either AasgRNAs or AksgRNAs (FIG. 17D and FIGS. 19A-19C). These above results demonstrated that the interchangeability between Cas12b and dual-RNA from different systems could empower the Cas12b ortholog with no CRISPR array in natural loci to engineer the mammalian genomes.

Example 7. Design Artificial sgRNA for Cas12b-Mediated Genome Editing

Figure 20A:
FIGS. 20A-20C: Artificial sgRNAs directed TcC2c1 for genome editing.
Figure 20B:
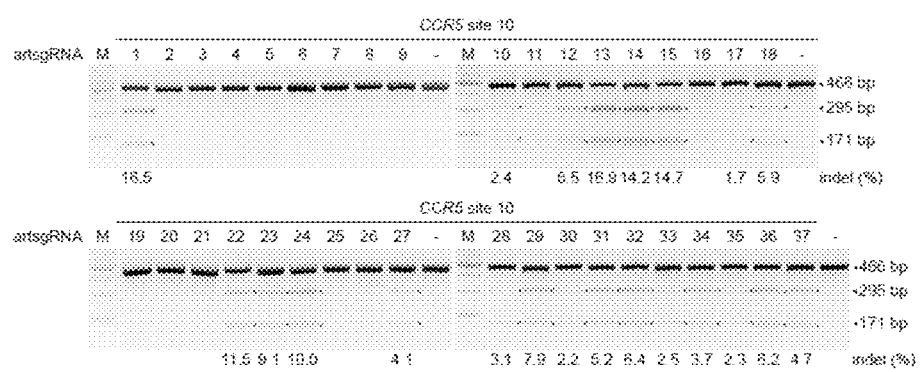
Figure 20C:
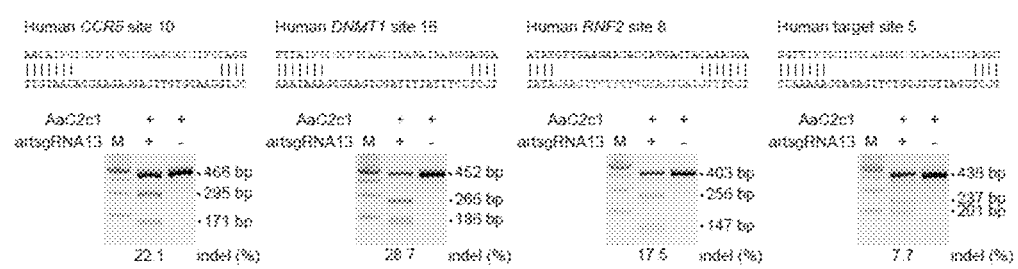

The exchangeability between Cas12b and dual-RNA in different Cas12b systems further promoted us to design novel artificial sgRNA (artsgRNA) scaffolds to facilitate Cas12b-mediated genome editing. Considering the conservation of DNA sequences and secondary structure among Cas12b orthologs (FIGS. 11B and 13A-13C), the inventors designed and de novo synthesized 37 sgRNA scaffolds targeting the human CCR5 locus (FIGS. 17E and 20A). The results of T7EI assay suggested that 22 artsgRNA scaffolds could work efficiently (FIG. 20B). To verify the generalization of our artsgRNAs, the inventors leveraged multiplex genome editing using TcCas12b or AaCas12b directed by artsgRNA13 (FIG. 20A). T7EI assay results indicated that artsgRNA13 could simultaneously facilitate multiplex genome engineering with both TcCas12b and AaCas12b (FIG. 17F and FIG. 20C). The results suggested that it is possible to design and synthesize artsgRNAs to facilitate Cas12b-mediated multiplex genome editing.

TABLE 1

Nucleic acids involved in the Examples.
(Spacer sequences are underlined, the mismatched nucleotides in tgRNA are bold italics.)

| RNA | |
|---|---|
| AasgRNA-M13mp18 SEQ ID NO: 67 | GUCUAAAGGACAGAAUUUUUCAACGGGUGUGCCAAUGGCCACUUUCC AGGUGGCAAAGCCCGUUGAACUUCAAGCGAAGUGGCACGAUCGUUAC GCUAACUAUGA |
| AasgRNA-Target 1 SEQ ID NO: 68 | GUCUAAAGGACAGAAUUUUUCAACGGGUGUGCCAAUGGCCACUUUCC AGGUGGCAAAGCCCGUUGAACUUCAAGCGAAGUGGCACCCUCCCAGU CCCUUGGCUAU |
| AasgRNA-Target 2 SEQ ID NO: 69 | GUCUAAAGGACAGAAUUUUUCAACGGGUGUGCCAAUGGCCACUUUCC AGGUGGCAAAGCCCGUUGAACUUCAAGCGAAGUGGCACUGGAGAGGA AUGGCUUCAGU |
| AasgRNA-CaMV SEQ ID NO: 70 | GUCUAAAGGACAGAAUUUUUCAACGGGUGUGCCAAUGGCCACUUUCC AGGUGGCAAAGCCCGUUGAACUUCAAGCGAAGUGGCACCUAUCUUCG CCGCGAAACCU |
| AasgRNA-HPV16 SEQ ID NO: 71 | GUCUAAAGGACAGAAUUUUUCAACGGGUGUGCCAAUGGCCACUUUCC AGGUGGCAAAGCCCGUUGAACUUCAAGCGAAGUGGCACUGAAGUAGA UAUGGCAGCAC |
| AasgRNA-HPV18 SEQ ID NO: 72 | GUCUAAAGGACAGAAUUUUUCAACGGGUGUGCCAAUGGCCACUUUCC AGGUGGCAAAGCCCGUUGAACUUCAAGCGAAGUGGCACACAAUAUGU GCUUCUACACA |
| AasgRNA-B101 SEQ ID NO: 73 | GUCUAAAGGACAGAAUUUUUCAACGGGUGUGCCAAUGGCCACUUUCC AGGUGGCAAAGCCCGUUGAACUUCAAGCGAAGUGGCACCGCGACCAU GUGGGCGUGGA |

TABLE 1-continued

Nucleic acids involved in the Examples.
(Spacer sequences are underlined, the
mismatched nucleotides in tgRNA are
bold italics.)

| | |
|---|---|
| AatgRNA-B101<br>SEQ ID NO: 74 | GUCUAAAGGACAGAAUUUUUCAACGGGUGUGCCAAUGGCCACUUUCC<br>AGGUGGCAAAGCCCGUUGAACUUCAAGCGAAGUGGCACCGCGACCAU<br>*A*UGGGCGUGGA |
| AasgRNA-001<br>SEQ ID NO: 75 | GUCUAAAGGACAGAAUUUUUCAACGGGUGUGCCAAUGGCCACUUUCC<br>AGGUGGCAAAGCCCGUUGAACUUCAAGCGAAGUGGCACCGCUUGCAG<br>GAUGGUCUACC |
| AatgRNA-001<br>SEQ ID NO: 76 | GUCUAAAGGACAGAAUUUUUCAACGGGUGUGCCAAUGGCCACUUUCC<br>AGGUGGCAAAGCCCGUUGAACUUCAAGCGAAGUGGCACC*A*CUUGCAG<br>GAUGGUCUACC |
| AasgRNA-002/03<br>SEQ ID NO: 77 | GUCUAAAGGACAGAAUUUUUCAACGGGUGUGCCAAUGGCCACUUUCC<br>AGGUGGCAAAGCCCGUUGAACUUCAAGCGAAGUGGCACACUGGGGU<br>AGACCAUCCUG |
| AatgRNA-002/03<br>SEQ ID NO: 78 | GUCUAAAGGACAGAAUUUUUCAACGGGUGUGCCAAUGGCCACUUUCC<br>AGGUGGCAAAGCCCGUUGAACUUCAAGCGAAGUGGCACA*A*UGGGGU<br>AGACCAUCCUG |
| AasgRNA-BRCA1_3232<br>SEQ ID NO: 79 | GUCUAAAGGACAGAAUUUUUCAACGGGUGUGCCAAUGGCCACUUUCC<br>AGGUGGCAAAGCCCGUUGAACUUCAAGCGAAGUGGCACAAGGAGCCA<br>GCUCAAGCAAU |
| AatgRNA-BRCA1_3232-1<br>SEQ ID NO: 80 | GUCUAAAGGACAGAAUUUUUCAACGGGUGUGCCAAUGGCCACUUUCC<br>AGGUGGCAAAGCCCGUUGAACUUCAAGCGAAGUGGCACU*U*AGGAGCCA<br>GCUCAAGCAAU |
| AatgRNA-BRCA1_3232-2<br>SEQ ID NO: 81 | GUCUAAAGGACAGAAUUUUUCAACGGGUGUGCCAAUGGCCACUUUCC<br>AGGUGGCAAAGCCCGUUGAACUUCAAGCGAAGUGGCACAAGGA*C*CCA<br>GCUCAAGCAAU |
| AatgRNA-BRCA1_3232-3<br>SEQ ID NO: 82 | GUCUAAAGGACAGAAUUUUUCAACGGGUGUGCCAAUGGCCACUUUCC<br>AGGUGGCAAAGCCCGUUGAACUUCAAGCGAAGUGGCACAAGGAGCCA<br>G*G*UCAAGCAAU |
| AatgRNA-BRCA1_3232-4<br>SEQ ID NO: 83 | GUCUAAAGGACAGAAUUUUUCAACGGGUGUGCCAAUGGCCACUUUCC<br>AGGUGGCAAAGCCCGUUGAACUUCAAGCGAAGUGGCACAAGGAGCCA<br>GCUCAA*C*CAAU |
| AasgRNA-BRCA1_3537<br>SEQ ID NO: 84 | GUCUAAAGGACAGAAUUUUUCAACGGGUGUGCCAAUGGCCACUUUCC<br>AGGUGGCAAAGCCCGUUGAACUUCAAGCGAAGUGGCACGAACAGCCU<br>AUGGGAAGUGG |
| AatgRNA-BRCA1_3537-1<br>SEQ ID NO: 85 | GUCUAAAGGACAGAAUUUUUCAACGGGUGUGCCAAUGGCCACUUUCC<br>AGGUGGCAAAGCCCGUUGAACUUCAAGCGAAGUGGCAC*C*AACAGCCU<br>AUGGGAAGUGG |
| AatgRNA-BRCA1_3537-2<br>SEQ ID NO: 86 | GUCUAAAGGACAGAAUUUUUCAACGGGUGUGCCAAUGGCCACUUUCC<br>AGGUGGCAAAGCCCGUUGAACUUCAAGCGAAGUGGCACGAACA*C*CU<br>AUGGGAAGUGG |
| AatgRNA-BRCA1_3537-3<br>SEQ ID NO: 87 | GUCUAAAGGACAGAAUUUUUCAACGGGUGUGCCAAUGGCCACUUUCC<br>AGGUGGCAAAGCCCGUUGAACUUCAAGCGAAGUGGCACGAACAGCCU<br>A*A*GGGAAGUGG |
| AatgRNA-BRCA1_3537-4<br>SEQ ID NO: 88 | GUCUAAAGGACAGAAUUUUUCAACGGGUGUGCCAAUGGCCACUUUCC<br>AGGUGGCAAAGCCCGUUGAACUUCAAGCGAAGUGGCACGAACAGCCU<br>AUGGGA*U*GUGG |
| crRNA-M13mp18<br>SEQ ID NO: 89 | AUUUCUACUAUUGUAGAUGAUCGUUACGCUAACUAUGAGGG |

TABLE 1-continued

Nucleic acids involved in the Examples.
(Spacer sequences are underlined, the
mismatched nucleotides in tgRNA are
bold italics.)

| | |
|---|---|
| crRNA-HPV16 SEQ ID NO: 90 | AUUUCUACUAAGUGUAGAUUGAAGUAGAUAUGGCAGCACAUA |
| crRNA-HPV18 SEQ ID NO: 91 | AUUUCUACUAAGUGUAGAUACAAUAUGUGCUUCUACACAGUC |
| sgRNA-M13mp18 SEQ ID NO: 92 | GAUCGUUACGCUAACUAUGAGUUUUAGAGCUAGAAAUAGCAAGUUAA AAUAAGGCUAGUCCGUUAUCAACUUGAAAAAGUGGCACCGAGUCGGU GCU |

FQ ssDNA reporter

| | |
|---|---|
| poly A | 5'-FAM-AAAAA-BHQ1-3' |
| poly T | 5'-FAM-TTTTT-BHQ1-3' |
| poly G | 5'-FAM-GGGGG-BHQ1-3' |
| poly C | 5'-FAM-CCCCC-BHQ1-3' |

TABLE 2

The components of buffers tested for Cas12b-mediated DNA detection. Buffer 1, 3, 4, 5 were derived from previous reports, and Buffer 2, 6, 7, 8 were derived from commercial buffers. 1: Nuclease Assay Buffer; 2: NEBuffer™ 3.1; 3: Cas12a Binding Buffer; 4: Cas13 Buffer; 5: Cas12a Buffer; 6: NEBuffer™ 2; 7: NEBuffer™ 2.1; 8: Cutsmart® Buffer.

| Buffer ID | 1x Components |
|---|---|
| 1 | 60 mM NaCl, 40 mM Tris-HCl, 6 mM MgCl$_2$, pH 7.5 |
| 2 | 100 mM NaCl, 50 mM Tris-HCl, 10 mM MgCl$_2$, 100 µg/ml BSA, pH 7.9 |
| 3 | 20 mM Tris-HCl, 5 mM MgCl$_2$, 100 mM KCl, 1 mM DTT, 5% Glycerol, 50 µg/mL Heparin |
| 4 | 60 mM NaCl, 20 mM HEPES, 6 mM MgCl$_2$, pH 6.8 |
| 5 | 150 mM KCl, 20 mM HEPES, 10 mM MgCl$_2$, 0.5 mM DTT, 1% Glycerol, pH 7.5 |
| 6 | 50 mM NaCl, 10 mM Tris-HCl, 10 mM MgCl$_2$, 1 mM DTT, pH 7.9 |
| 7 | 50 mM NaCl, 10 mM Tris-HCl, 10 mM MgCl$_2$, 100 µg/ml BSA, pH 7.9 |
| 8 | 50 mM Potassium Acetate, 20 mM Tris-acetate, 10 mM Magnesium Acetate, 100 µg/ml BSA, pH 7.9 |
| 9 | 50 mM Tris-HCl, 10 mM MgCl$_2$, 10 mM DTT, pH 7.5 |
| 10 | 66M Tris-HCl, 10 mM MgCl$_2$, 1 mM DTT, 7.5% PEG6000, pH 7.6 |

TABLE 3

Sequences and information involved in the present invention

| SEQ ID NO | Information |
|---|---|
| SEQ ID NO: 1 | AaCas12b amino acid sequence from *Alicyclobacillus acidiphilus* NBRC 100859 (GeneBank ID: NZ_BCQI01000053.1) |
| SEQ ID NO: 2 | AkCas12b amino acid sequence from *Alicyclobacillus kakegawensis* NBRC 103104 (GeneBank ID: NZ_BCRP01000027.1) |
| SEQ ID NO: 3 | AmCas12b amino acid sequence from *Alicyclobacillus macrosporangiidus* strain DSM 17980 (GeneBank ID: NZ_FPBV01000001.1) |
| SEQ ID NO: 4 | BhCas12b amino acid sequence from *Bacillus hisashii* strain C4 (GeneBank ID: NZ_NJGA01000060.1) |
| SEQ ID NO: 5 | BsCas12b amino acid sequence from *Bacillus* sp. NSP2.1 (GeneBank ID: NZ_KI301973.1) |
| SEQ ID NO: 6 | Bs3Cas12b amino acid sequence from *Bacillus* sp. V3-13 contig_40 (GeneBank ID: NZ_PGUZ01000040.1) |
| SEQ ID NO: 7 | DiCas12b amino acid sequence from *Desulfovibrio inopinatus* DSM 10711 (GeneBank: NZ_KE386879.1) |
| SEQ ID NO: 8 | LsCas12b amino acid sequence from *Laceyella sediminis* strain RHA1 (GeneBank ID: NZ_PVTZ01000002.1) |

TABLE 3-continued

Sequences and information involved in the present invention

| SEQ ID NO | Information |
|---|---|
| SEQ ID NO: 9 | SbCas12b amino acid sequence from *Spirochaetes bacterium* GWB1_27_13 (GeneBank ID: MIAN01000063.1) |
| SEQ ID NO: 10 | TcCas12b amino acid sequence from *Tuberibacillus calidus* DSM 17572 (GeneBank ID: NZ_KE387196.1) |
| SEQ ID NO: 11-21 | sgRNA scaffold optimized for AaCas12b |
| SEQ ID NO: 22 | AasgRNA_scaffold |
| SEQ ID NO: 23 | AksgRNA1_scaffold |
| SEQ ID NO: 24 | AmsgRNA1_scaffold |
| SEQ ID NO: 25 | BhsgRNA_scaffold |
| SEQ ID NO: 26 | BssgRNA_scaffold |
| SEQ ID NO: 27 | Bs3sgRNA_scaffold |
| SEQ ID NO: 28 | LssgRNA_scaffold |
| SEQ ID NO: 29 | SbsgRNA_scaffold |
| SEQ ID NO: 30 | artsgRNA1 scaffold |
| SEQ ID NO: 31 | artsgRNA2 scaffold |
| SEQ ID NO: 32 | artsgRNA3 scaffold |
| SEQ ID NO: 33 | artsgRNA4 scaffold |
| SEQ ID NO: 34 | artsgRNA5 scaffold |
| SEQ ID NO: 35 | artsgRNA6 scaffold |
| SEQ ID NO: 36 | artsgRNA7 scaffold |
| SEQ ID NO: 37 | artsgRNA8 scaffold |
| SEQ ID NO: 38 | artsgRNA9 scaffold |
| SEQ ID NO: 39 | artsgRNA10 scaffold |
| SEQ ID NO: 40 | artsgRNA11 scaffold |
| SEQ ID NO: 41 | artsgRNA12 scaffold |
| SEQ ID NO: 42 | artsgRNA13 scaffold |
| SEQ ID NO: 43 | artsgRNA14 scaffold |
| SEQ ID NO: 44 | artsgRNA15 scaffold |
| SEQ ID NO: 45 | artsgRNA16 scaffold |
| SEQ ID NO: 46 | artsgRNA17 scaffold |
| SEQ ID NO: 47 | artsgRNA18 scaffold |
| SEQ ID NO: 48 | artsgRNA19 scaffold |
| SEQ ID NO: 49 | artsgRNA20 scaffold |
| SEQ ID NO: 50 | artsgRNA21 scaffold |
| SEQ ID NO: 51 | artsgRNA22 scaffold |
| SEQ ID NO: 52 | artsgRNA23 scaffold |
| SEQ ID NO: 53 | artsgRNA24 scaffold |
| SEQ ID NO: 54 | artsgRNA25 scaffold |
| SEQ ID NO: 55 | artsgRNA26 scaffold |
| SEQ ID NO: 56 | artsgRNA27 scaffold |
| SEQ ID NO: 57 | artsgRNA28 scaffold |
| SEQ ID NO: 58 | artsgRNA29 scaffold |
| SEQ ID NO: 59 | artsgRNA30 scaffold |
| SEQ ID NO: 60 | artsgRNA31 scaffold |
| SEQ ID NO: 61 | artsgRNA32 scaffold |
| SEQ ID NO: 62 | artsgRNA33 scaffold |
| SEQ ID NO: 63 | artsgRNA34 scaffold |
| SEQ ID NO: 64 | artsgRNA35 scaffold |
| SEQ ID NO: 65 | artsgRNA36 scaffold |
| SEQ ID NO: 66 | artsgRNA37 scaffold |

The invention claimed is:

1. A method of detecting the presence and/or amount of a target nucleic acid molecule in a biological sample, the method comprising the following steps:
   (a) contacting the biological sample with: i) a Cas12b protein, ii) a gRNA directed against a target sequence in the target nucleic acid molecule, and iii) a single-strand DNA reporter molecule which produces a detectable signal after being cleaved, thereby forming a reaction mixture;
   (b) detecting the presence and/or level of the detectable signal produced in the reaction mixture,
   wherein the presence and/or level of the detectable signal indicates the presence and/or amount of the target nucleic acid molecule,
   wherein the Cas12b protein comprises an amino acid sequence having at least 95% sequence identity with SEQ ID NO: 1.

2. The method of claim 1, wherein the target nucleic acid molecule is a double-strand DNA molecule or a single-strand DNA molecule.

3. The method of claim 1, wherein the Cas12b protein is from *Alicyclobacillus acidiphilus*.

4. The method of claim 1, wherein the Cas12b protein comprises
   an amino acid sequence set forth in SEQ ID NO: 1.

5. The method of claim 1, wherein the guide RNA is sgRNA.

6. The method of claim 5, the sgRNA comprises a scaffold sequence encoded by a nucleic acid sequence selected from one of SEQ ID NOs: 11-66.

7. The method of claim 5, wherein the sgRNA comprises a spacer sequence at the 3'-end of the scaffold sequence that specifically hybridizes to the target sequence or the complement of the target sequence.

8. The method of claim 7, wherein the spacer sequence has at least one nucleotide mismatch with the target sequence.

9. The method of claim 1, wherein the single-strand DNA reporter molecule comprises a fluorophore at one end of the single-stranded DNA reporter molecule, and a quenching group at the other end of the single-strand DNA reporter molecule.

10. The method of claim 9, wherein the fluorophore is selected from FAM, TEX, HEX, Cy3 and Cy5, and the quenching group is selected from BHQ1, BHQ2, BHQ3 and TAMRA.

11. The method of claim 1, wherein the single-strand DNA reporter molecule is about 2 to about 100 nucleotides in length.

12. The method of claim 1, wherein the single-strand DNA reporter molecule is polyA, polyC, or polyT.

13. The method of claim 1, further comprising a step of amplifying the target nucleic acid molecule in the biological sample prior to step (a).

14. The method of claim 13, the amplification comprises PCR amplification or Recombinase Polymerase Amplification (RPA).

15. The method of claim 14, the Recombinase Polymerase Amplification is performed for about 10 minutes to about 60 minutes.

16. The method of claim 1, the Cas12b protein has been pre-combined with the gRNA to form a Cas12b-gRNA complex prior to the contact with the biological sample.

17. The method of claim 1, the reaction of step (a) is carried out for from about 20 minutes to about 180 minutes.

18. The method of claim 1, wherein step (a) is carried out in a buffer comprising
   (i) a final concentration of 50 mM NaCl, 10 mM Tris-HCl, 10 mM $MgCl_2$, 1 mM DTT, pH 7.9;
   (ii) a final concentration of 50 mM NaCl, 10 mM Tris-HCl, 10 mM $MgCl_2$, 100 µg/ml BSA, pH 7.9; or
   (iii) a final concentration of 50 mM potassium acetate, 20 mM Tris-acetic acid, 10 mM magnesium acetate, 100 µg/ml BSA, pH 7.9.

19. The method of claim 1, wherein the biological sample is selected from whole blood, plasma, serum, cerebrospinal fluid, urine, feces, cell and tissue extracts.

* * * * *